(12) United States Patent
O'Neil et al.

(10) Patent No.: US 7,289,971 B1
(45) Date of Patent: Oct. 30, 2007

(54) PERSONAL INFORMATION SECURITY AND EXCHANGE TOOL

(76) Inventors: Kevin P. O'Neil, 3540 Seahorn Cir., San Diego, CA (US) 92130; Glenn R. Seidman, 830 W. California Way, Woodside, CA (US) 94062

( * ) Notice: Subject to any disclaimer, the term of this patent is extended or adjusted under 35 U.S.C. 154(b) by 0 days.

(21) Appl. No.: 09/354,287

(22) Filed: Jul. 15, 1999

Related U.S. Application Data

(63) Continuation of application No. 08/898,160, filed on Jul. 22, 1997, now Pat. No. 5,987,440.

(60) Provisional application No. 60/022,035, filed on Jul. 22, 1996.

(51) Int. Cl.
*G06Q 30/00* (2006.01)
(52) U.S. Cl. .............. 705/44; 705/39; 380/23
(58) Field of Classification Search .......... 705/39, 705/44, 51, 64; 361/91; 380/23; 707/9
See application file for complete search history.

(56) References Cited

U.S. PATENT DOCUMENTS

| | | | |
|---|---|---|---|
| 4,137,556 A | 1/1979 | Sessa | |
| 4,799,156 A | 1/1989 | Shavit et al. | |
| 5,280,529 A | 1/1994 | Nost | |
| 5,483,596 A | 1/1996 | Rosenow et al. | 380/25 |
| 5,502,766 A | 3/1996 | Boebert et al. | |
| 5,757,917 A | 5/1998 | Rose et al. | |
| 5,794,210 A | 8/1998 | Goldhaber et al. | 705/14 |
| 5,845,281 A * | 12/1998 | Benson et al. | 707/9 |
| 5,855,008 A | 12/1998 | Goldhaber et al. | 705/14 |
| 5,862,325 A | 1/1999 | Reed et al. | 395/200.31 |
| 5,887,171 A * | 3/1999 | Tada et al. | 719/317 |

FOREIGN PATENT DOCUMENTS

| | | |
|---|---|---|
| EP | 0649121 | 10/1994 |
| EP | 0 715 245 A1 | 5/1996 |

OTHER PUBLICATIONS

Blazie, et al., "A tool for support of key distribution and validity certificate check in global Directory service" *Elsevier Science B.V.* (1996) ABSTRACT XP000555878.

(Continued)

*Primary Examiner*—Raquel Alvarez
(74) *Attorney, Agent, or Firm*—Gavrilovich, Dodd & Lindsey LLP

(57) ABSTRACT

Utilization of the E-Metro Community and Personal Information Agents assure an effective and comprehensive agent-rule based command and control of informational assets in a networked computer environment. The concerns of informational privacy and informational self-determination are addressed squarely by the invention affording persons and entities a trusted means to author, secure, search, process, and exchange personal and/or confidential information in a networked computer environment. The formation of trusted electronic communities wherein members command and control their digital persona, exchanging or brokering for value the trusted utility of their informational assets is made possible by the invention. The present invention provides for the trusted utilization of personal data in electronic markets, providing both communities and individuals aggregate and individual rule-based control of the processing of their personal data.

13 Claims, 34 Drawing Sheets

OTHER PUBLICATIONS

Chess, et al., "Itinerant Agents for Mobile Computing," *IEEE Personal Communications*, pp. 34-49 (1995).

Jaeger, T. et al. "Implementation of a discretionary access control model for script-based systems," Computer Security Foundation Workshop, Proceedings, Eighth IEEE, 1995.

Roscheisen, et al., "Beyond browing: shared comments, SOAPs, trails and on-line communities," *Elsier Science B.V.* (1995) Abstract XP000565174.

K. Decker et al., "Matchmaking and Brokering", BNSDOCID: XP002921052, May 16, 1996, pp. 1-19.

A. Chavez et al., "Kasbah: An Agent Marketplace for Buying and Selling Goods", Int'l Conf. on the Practical Application of Intelligent Agents and Multi-Agent Tech, Apr. 1996.

Partial European Search Report, EPO, Feb. 21, 2005, pp. 5.

European Patent Office, European Search Report in application No. EP 06111061, Jul. 18, 2006, 2 pages.

Andreoli, Jean-Marc et al., "Constraint Agents for the Information Age", Dec. 1995, J.UCS vol. 1, No. 12 pp. 761-789, XP002075155.

\* cited by examiner

11A

11B

11C

11D

15A

15B

THE BASIC BOOCH SYMBOLS EMPLOYED IN THE VISUAL DESCRIPTIONS WITHIN THIS DOCUMENT. (1A) A CLASS, (1B) AN OBJECT, (1C) AN INSTANCE VARIABLE, (1D) USES FOR IMPLEMENTATION, (1E) INHERITS

FIG. 31

PERSONAL INFORMATION SECURITY AND EXCHANGE TOOL

RELATED APPLICATION INFORMATION

This application is a continuation of application Ser. No. 08/898,160, filed on Jul. 22, 1997 now U.S. Pat. No. 5,987,440, which is a continuing application of U.S. Provisional Application Ser. No. 60/022,035, filed on Jul. 22, 1996, both of which are hereby incorporated by reference as if set forth fully herein.

FIELD OF INVENTION

The present invention relates to the software management of information within a network computing environment. More specifically, the present invention relates to a software system operating on the Internet that creates a virtual private network where a user may author, secure, search, exchange and process personal information in a trusted and controlled manner. This software system encapsulates trusted communities and their members, where a trusted authority certifies the identity and the informational-self of community members. Once a user is registered with a trusted community, the user can author and secure at will the hypermedia content, command and control the rule-based presentation and processing of their personal information.

BACKGROUND OF THE INVENTION

The introduction and accelerating use of the Internet has resulted in an explosion of both the quantity and availability of personal information. Unfortunately, since the Internet is largely unregulated, there is no assurance that all this information is accurate or reliable, and often the source of the data is not even ascertainable. Additionally, unless particular precautions are taken, anything sent via the Internet is subject to interception and misuse. These joint concerns for data reliability and data protection can be combined into a multifaceted concept of a trusted information utility. Data reliability or trustworthiness is present if the data is accurate and can be authenticated and/or corroborated. Trusted utilization is when data is available for access or processing only by those approved by the owner of the data, and assurance of continued command and control according to rules established by the owner is present. Trusted utilization or trusted processing is especially critical when dealing with personal data. Personal information, such as an individual's credit worthiness, medical history, employment background, or lifestyle is now finding its way on to the Internet. It is likely that law enforcement agencies, credit bureaus, landlords, and others will be using this information to assist in making decisions. Since all these groups make decisions that dramatically impact an individual's life, using incorrect data, or information that they shouldn't even have, can be devastating.

Thus, people realize that something must be done to protect a person's personal information and as more individuals join the Internet, there will be more pressure to collect, use, and market the available personal information, and the individual will want to participate in, command, and control this activity. Collectively, these ideas cannot be properly implemented with the Internet tools presently available, and no tool can efficiently incorporate these ideas. Thus, there is a need to provide an Internet utility or tool for the security and exchange of personal information.

It is therefore an object of the present invention to assist in the trusted utilization of personal information on the Internet by 1) providing a mechanism for individuals or entities securely author and encapsulate personal data and processing rules governing the presentation and processing of personal information, while 2) empowering the individual or entity, at will, command and control of their personal information within network computing environments.

SUMMARY OF THE INVENTION

The present invention is a software system for operating on network servers, with supporting applications operating on an individual user's personal computer system, inclusive of wire-line and wireless tele-computing devices. This invention is directed to a system for allowing an individual or entity to protect, command, control, and process personal information on a computer network, including the Internet. Specifically, this invention facilitates the formation and use of networked Trusted Electronic Communities, hereafter referred to as E-Metro Communities, where each E-Metro Community comprises several members meeting common admission requirements. Preferably, it is the E-Metro Community that sets registration rules and verifies member identity itself or facilitates the use of other trusted Certificate Authorities. The informational identity of each member is encapsulated within the E-Metro Community as electronic personal information agents, hereafter referred to as E-PIAs, with each E-PIA representing a member's information and behavior, with some of the information supplied by each member and some of the information coming from trusted sources external to the member's E-Metro Community. By establishing and enforcing registration rules and performing accountable and audited verifications of member identity, and if so chosen, personal information certification, the E-Metro Community builds a community wherein each of its members can belong and participate in a electronic domain where the rights and responsibilities of privacy and informational self-determination are realized. Thus, it is through the association and certification by a trusted E-Metro Community that a member becomes trusted and reliable in other transactions, but more importantly gains control of their data.

Once a user is a member of an E-Metro Community, the member can assign access rules to each piece of personal information. These access rules set the requirements that must be met before an individual piece of information can be processed. Additionally, the E-Metro Community may get minimum standards for all transactions which must be met. When a request for a particular piece of information is received, E-Metro Community standards and the rule attached to that piece of information is checked by a processes specific to the E-Metro Community, hereafter referred to as the E-Metro Community's E-Broker. The E-Broker is the actual process that checks to see if the requester and the situation meet the requirement of the rule. If so, the E-Broker allows the requested information to be processed; if not, the E-Broker does not allow the information to be processed. Additionally, the information may be transport packaged with transitive privilege rules attached, that is, rules that define the requirements for processing by anyone other than the original member. Using these transitive privilege rules, a member can maintain command and control on third party dissemination and processing of their personal information.

A member may also create an agent, hereafter referred to as an E-AutoPIA, to interact with other members in any E-Metro Community, or even with data external to any E-Metro Community. This agent contains a subset of the personal information on the member, plus contains an itinerary that directs the activity of the agent. Thus, the agent is able to interact with the personal information of other members as directed in its itinerary.

BRIEF DESCRIPTION OF THE DRAWINGS

The foregoing and other objects, features, and advantages of the invention will become more readily apparent upon reference to the following detailed description of a presently preferred embodiment, when taken in conjunction with the accompanying drawings in which:

FIG. 31 is the user interface to the preferred embodiment presenting additional personal information indicating attributes with disclosed and undisclosed access-processing rules.

DETAILED DESCRIPTION OF THE INVENTION

Figure 1:
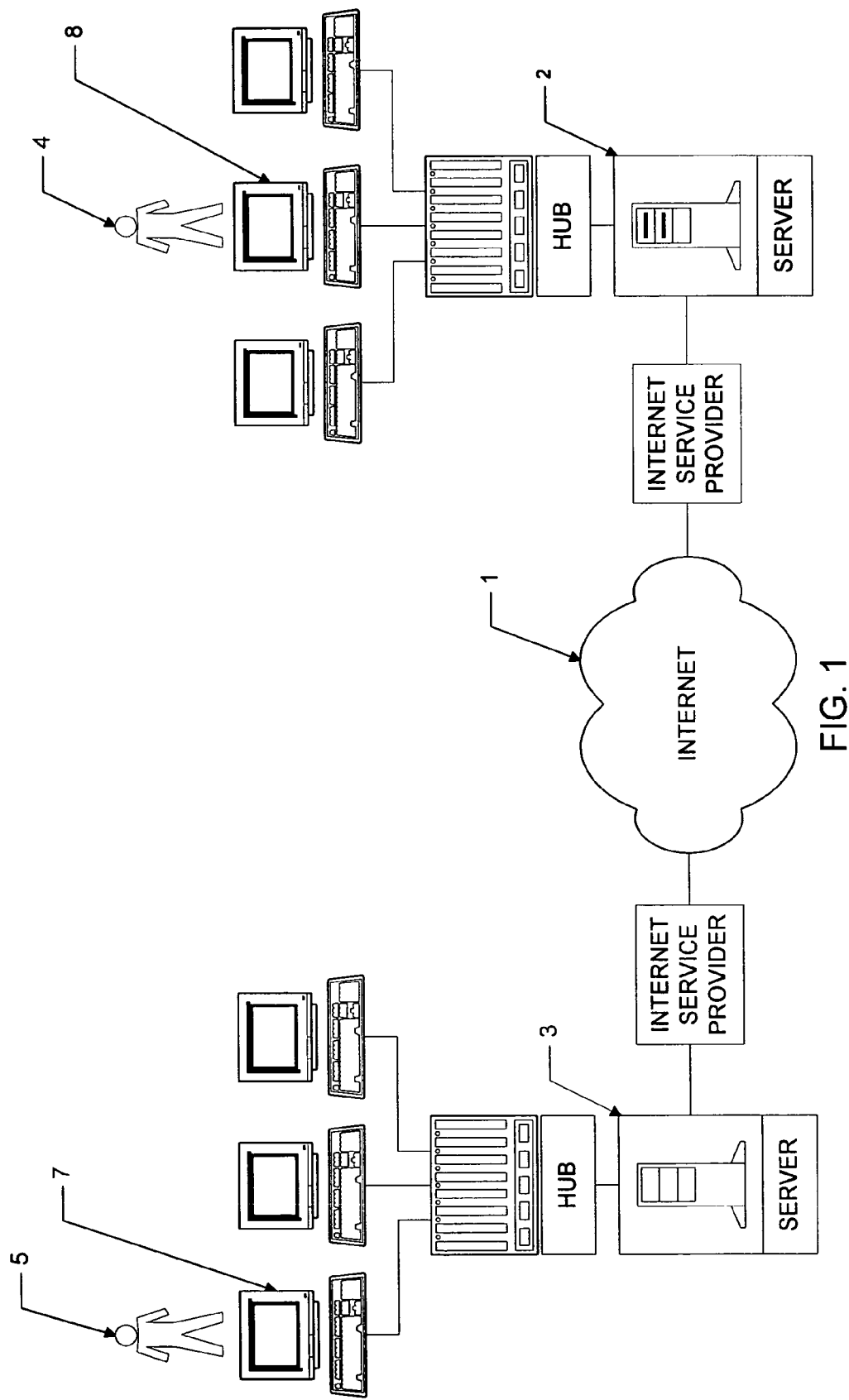
FIG. 1 shows users connected to network servers accessing the Internet.

The preferred embodiment of the invention primarily operates on a network server, with supporting applications operating on the individual's personal computer system. To a user, the preferred embodiment appears as a Web site, so it may be accessed simply by knowing its Web site address, but it is a Web site with comprehensive security safeguards: firewalls, proxy servers, SSL enabled Web servers and clients, digital certificates, hardware tokens, security policies and procedures. Not only will the Web site typically require certificate-based identification for access, but all communications between E-Metro Communities and members and other E-Metro Communities will be encrypted. For additional assurance of user identification, an optional hardware token or secure card security system may be implemented. This security system will be discussed in a later section.

As discussed earlier, trusted processing of information has two components: reliability of content and controlled processing, and each is addressed by the preferred embodiment of the invention. It is easiest and most clear to discuss the preferred embodiment using a metropolis analogy. Just as in a city, the Internet provides an individual a place to meet others, share information, seek entertainment, do work, and shop. Likewise, every individual on the Internet has an address where correspondence may be sent. In the city, caution must be used when meeting someone for the first time as it may be unwise to give too much information to someone who is untrustworthy. Also, business transactions with a new person must be done carefully as the quality of goods, standard of support, or origin of the product is not known. These same concerns appear with new encounters and transactions on the Internet.

In the city, people use an unfamiliar person's associations to lower the risk of these new encounters and transactions. For example, if someone is wearing a police uniform, we will typically be more likely to give them our drivers license number, home address, and other personal information. If someone is seated in an attorney's office and hands us a business card with the title of "Attorney," we are more likely to expose confidential information. Also, if someone lives in our same community, maybe even our neighbor, we too will be more likely to share information and feel safe conducting a transaction. On the Internet, if a person has an address that ends in .gov, we may feel safer doing business with them, as some government agency has allowed them access to the Internet from a government network server, thus giving that user an air of trustworthiness. If that user conducts a bad transaction, the agency that allowed their access to the Internet can be contacted, and the agency is likely to sanction that user. However, the vast majority of users on the Internet will be from network servers that provide no hint as to their trustworthiness. Therefore, the preferred embodiment of the present invention provides a method to reduce the risk in new interactions, and increase the probability that the other user is who they say they are: the preferred embodiment creates agent-rule based trusted electronic communities.

In the city, citizens belong to several communities. Some communities are defined by geography, ethnic background, religion, alma mater, employment, or hobbies. Commonly, people get a great deal of self-identification and satisfaction from choosing the communities to which they belong. It is quite common for someone to refer to themselves as an employee of a company, as a member of a religion, or as an expert at a hobby. Belonging to a community is not only personally satisfying to the member, but allows the reputation of the E-Metro Community to lower the risk of dealing with any one of its members.

Figure 2:
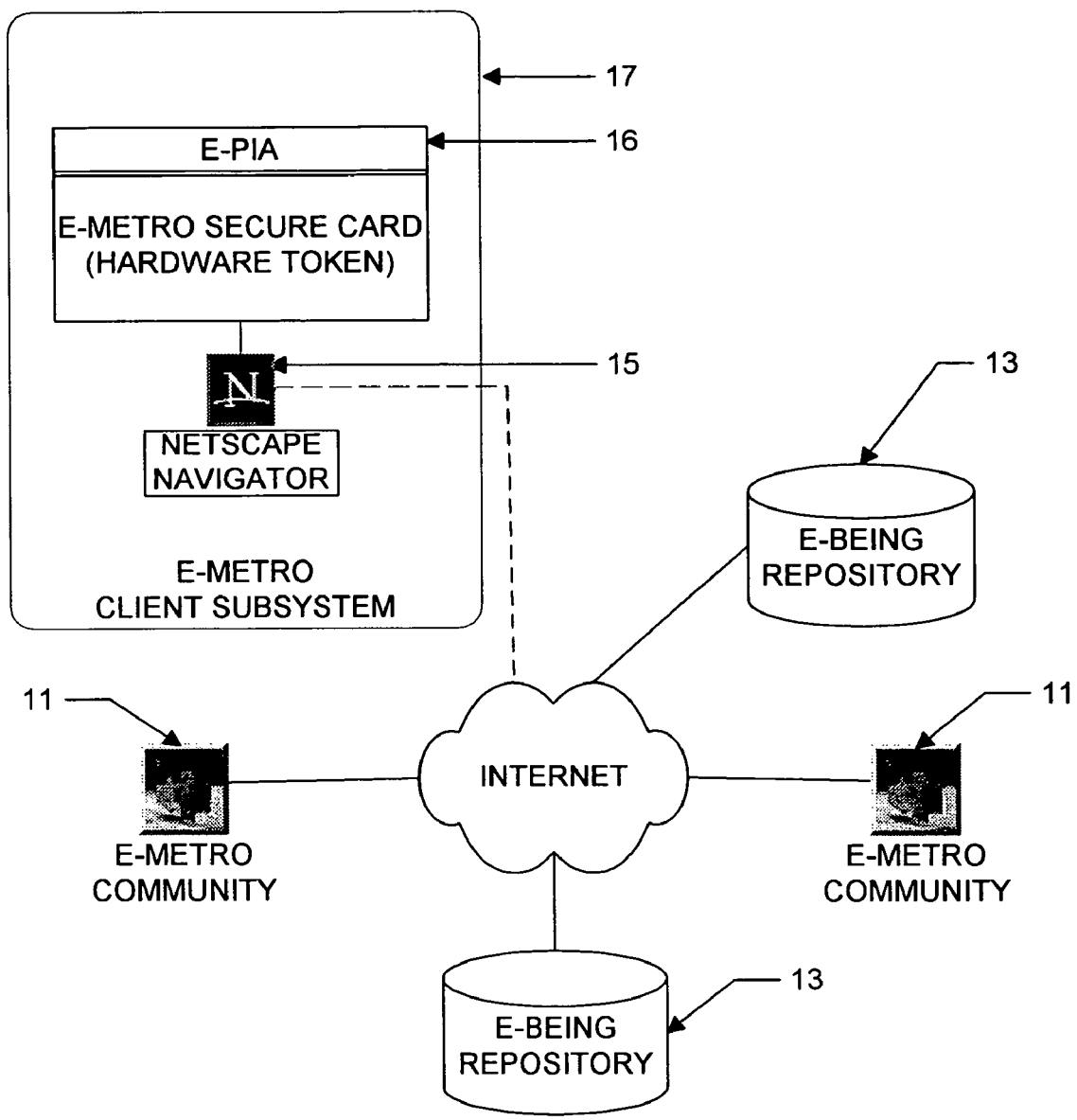
FIG. 2 shows how a user of the preferred embodiment views other E-Communities on the Internet.

In the preferred embodiment, a user may join one or more E-Metro Communities. Each of these E-Metro Communities is independently operated by an administrator that sets admission requirements, authenticates membership, issues digital certificates, and sets the services available to members. The E-Metro Communities are actually implemented as Web sites on the Internet, but are special Web sites as they have a great deal of intelligence and utility. FIG. 2 diagrams a user's view of the Internet using the preferred embodiment. The user will be a member of one or more E-Metro Communities 11 and be aware there are several other E-Metro Communities 11 on the Internet. The user will use a Web Browser such as Netscape Navigator 15 running on their personal computer to access the Internet and attempt to become a member of one or more E-Metro Communities. When desiring to become a member of an E-Metro Community, it is possible to retrieve an unregistered or empty E-Being object from the E-Metro Community or from a public E-Being repository 13 that will need to be initialized with identity information and certified in order to become a member. An unregistered E-Being may be retrieved prior to visiting the E-Metro Community desired to be joined. Once a user is authorized to join an E-Metro Community, the user becomes a member of that E-Metro Community and can use the services the E-Metro Community administrator has provided. Services may include links to other E-Metro Communities, shopping, or access to information. Besides the standard Netscape Navigator 15, the member will also need some additional support programs at their local computer, the client subsystem 17. These client subsystem 17 support programs are processes that allow the Netscape Navigator to have specific functionality in support of specific E-Metro Communities. These programs will be provided as part of the preferred embodiment, but will be configurable by the E-Metro Community administrator or even the user to provide specific functionality. These programs could be created in any language, but Java is presently preferred. It should be a goal of each E-Metro Community, however, to not require additional software besides standards based browsers, as this maintains a much easier to support client software subsystem. Additionally, the member may desire to gain privilege or access to specific E-Metro Community services to which it does not have rights. The E-Metro Community may require further information to be filled out in forms that must be submitted for approval. These forms are stored in an E-Being repository 13, and can be set up as an independent Web site, an FTP site, or any other storage mechanism allowed on the Internet.

Remembering that trusted processing comprises reliability and controlled processing, in the preferred embodiment, trusted processing of personal data is improved by two means. First, the personal information that is processed is authored and monitored by the individual. The information can also be verified by third parties who issue digital certificates which corroborate the facts claimed by the individual. The information stored is transparent to the individual. Additionally, the users themselves can request trusted certificate authorities to verify and assert the reliability of the personal information. The Certificate Authorities issue digital certificates asserting the reliability of the data. An example would be a credit union, which will certify personal financial or loan data. As an E-Metro Community's reputation for reliability and user-centric control of personal information processing increases, the informational value and mutual trust of its users will also increase.

The other aspect of trusted processing, protection of data, is improved in two ways by the preferred embodiment of the present invention. First, the preferred embodiment uses state-of-the-art techniques, such as public-key cryptography, to securely store and transmit information. Public-key cryptography is discussed in more detail in a later section. These techniques assure that the data can not be deciphered if intercepted during transmission, and only the intended reader can decrypt and understand the information. The second security feature of the preferred embodiment is designed to place controls on the amount of information processed and to limit the utilization of data to recipients meeting criteria established by the user. This security feature allows the user to set rules that govern the processing and utilization of personal information. For example, one rule may state that it is acceptable to release legal history information to a user that is from the American Bar Association E-Metro Community. Another rule may state it is acceptable to utilize a home phone number by a user that is single, from a particular geographic area, and also agrees to have their home number utilized in a controlled manor. By setting sufficient rules, an individual can control the utilization of personal information by only trusted users. Additionally, the user may set transitive rules that attach to information that control electronic distributed processing of the information. Thus, when a user authorizes trusted remote processing of personal information, the information is utilized in a manner that allows the user to maintain command and control of how the information is subsequently utilized.

The preferred embodiment additionally allows an individual to set rules for processing personal information for money or other value. An individual's preferences, physical characteristics, and buying habits have value to those selling products. Traditionally, marketing firms would collect and organize such information and sell those mailing lists to businesses that had a product that may appeal to those on the list. Using the preferred embodiment, an individual can "license" their own personal information to a business directly or to a marketing firm, thus sharing in the value created by the trusted processing of reliable personal information.

Figure 25:
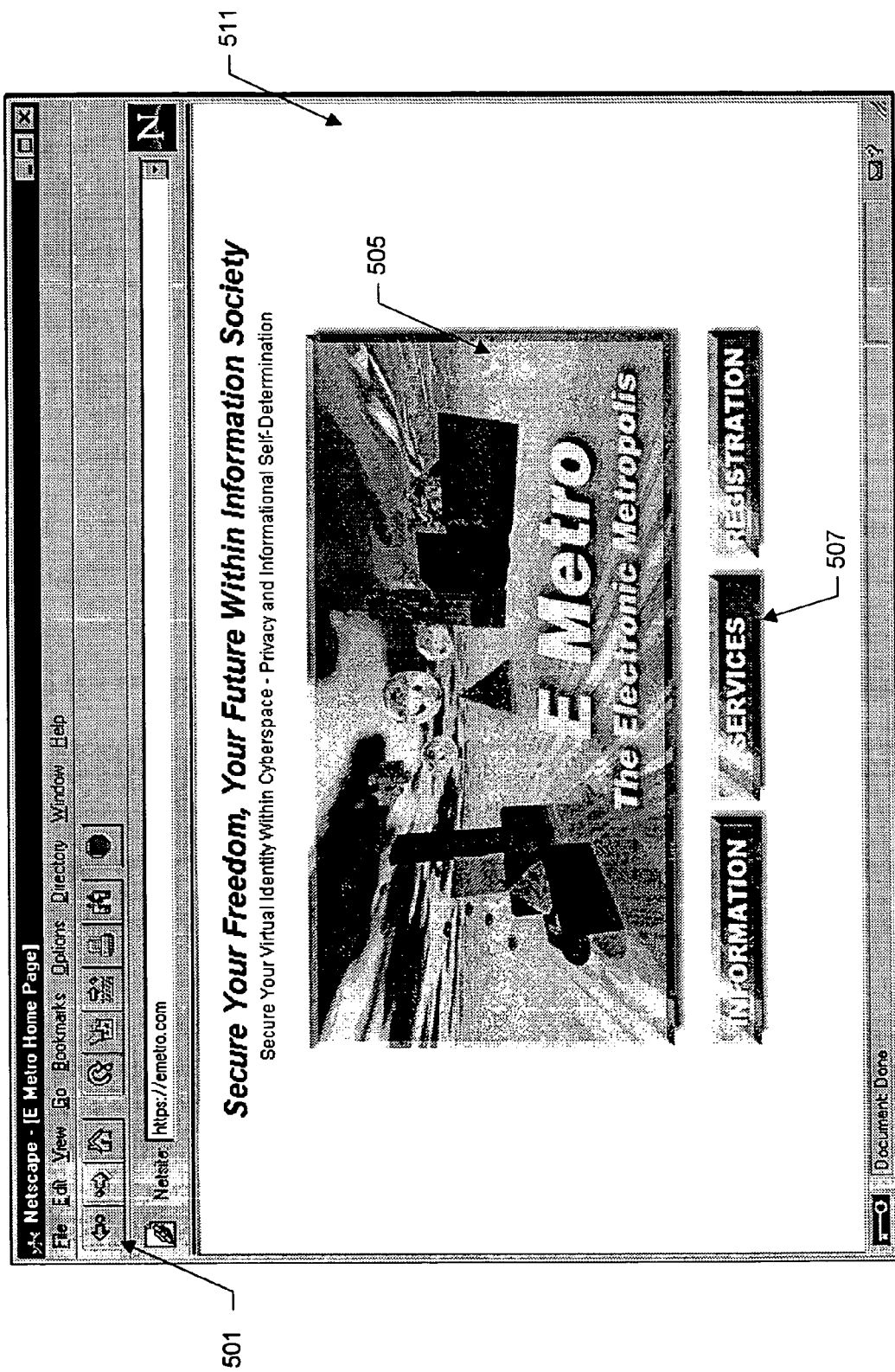
FIG. 25 is the user interface to the preferred embodiment showing the initial screen.

Referring now to FIG. 25, an example of what a user may see when accessing an E-Metro Community Web site is shown. Here, the computer user is running Netscape Navigator on their personal computer, and the standard Netscape Navigator menu items 501 can be seen. To get to this point, the user had to tell the Netscape Navigator the address of the E-Metro Community Web site, and the Netscape Navigator, through the user's network server, connected to the remote network server where this E-Metro Community Web site is located. Once accessed, the E-Metro Community Web site sends this introductory screen 511 to the user, which contains a graphical logo 505 and title 503 specific to this E-Metro Community. The user can select one of three option buttons 507: get more information on this E-Metro Community, go to the services available in this E-Metro Community (will require a security check-in), or, if a new user, register for admission to this E-Metro Community. If the user selects to register, the registration objects will be supplied by the E-Metro Community or retrieved from a E-Being repository and the user will author their E-Being, similar to filling out a standardized form.

Figure 26:
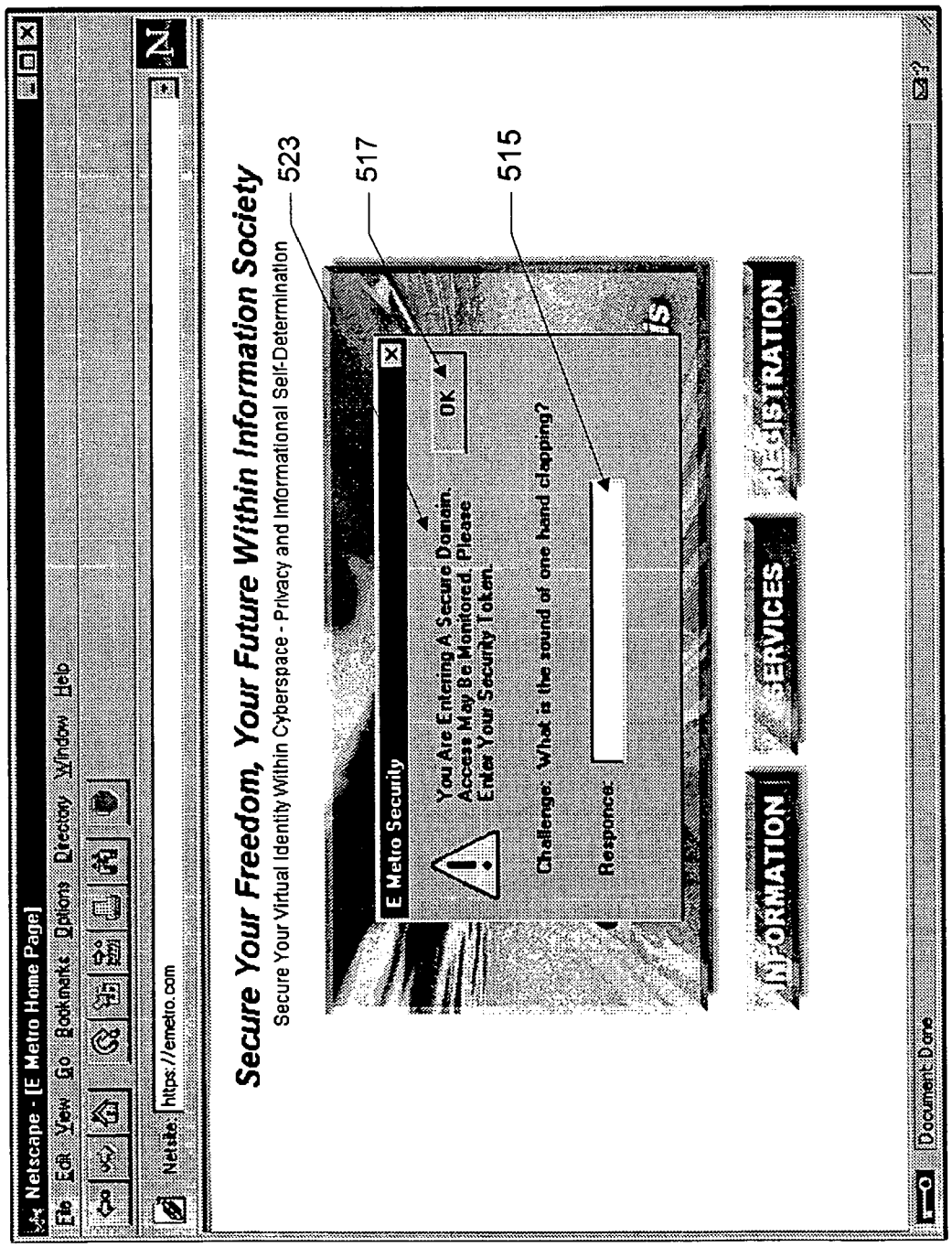
FIG. 26 is the user interface to the preferred embodiment showing the log-in screen.
Figure 27:
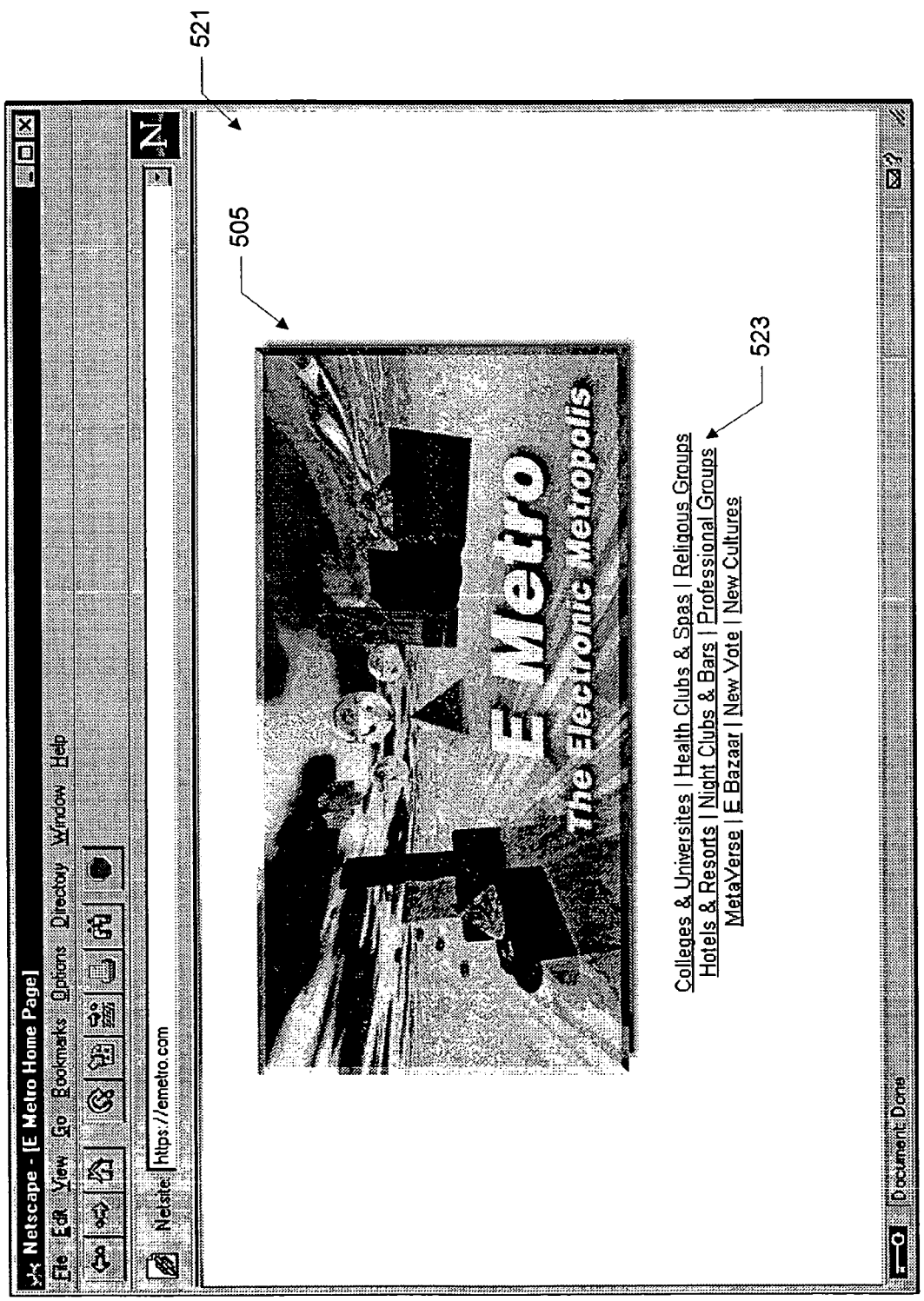
FIG. 27 is the user interface to the preferred embodiment showing the community listings screen.
Figure 28:
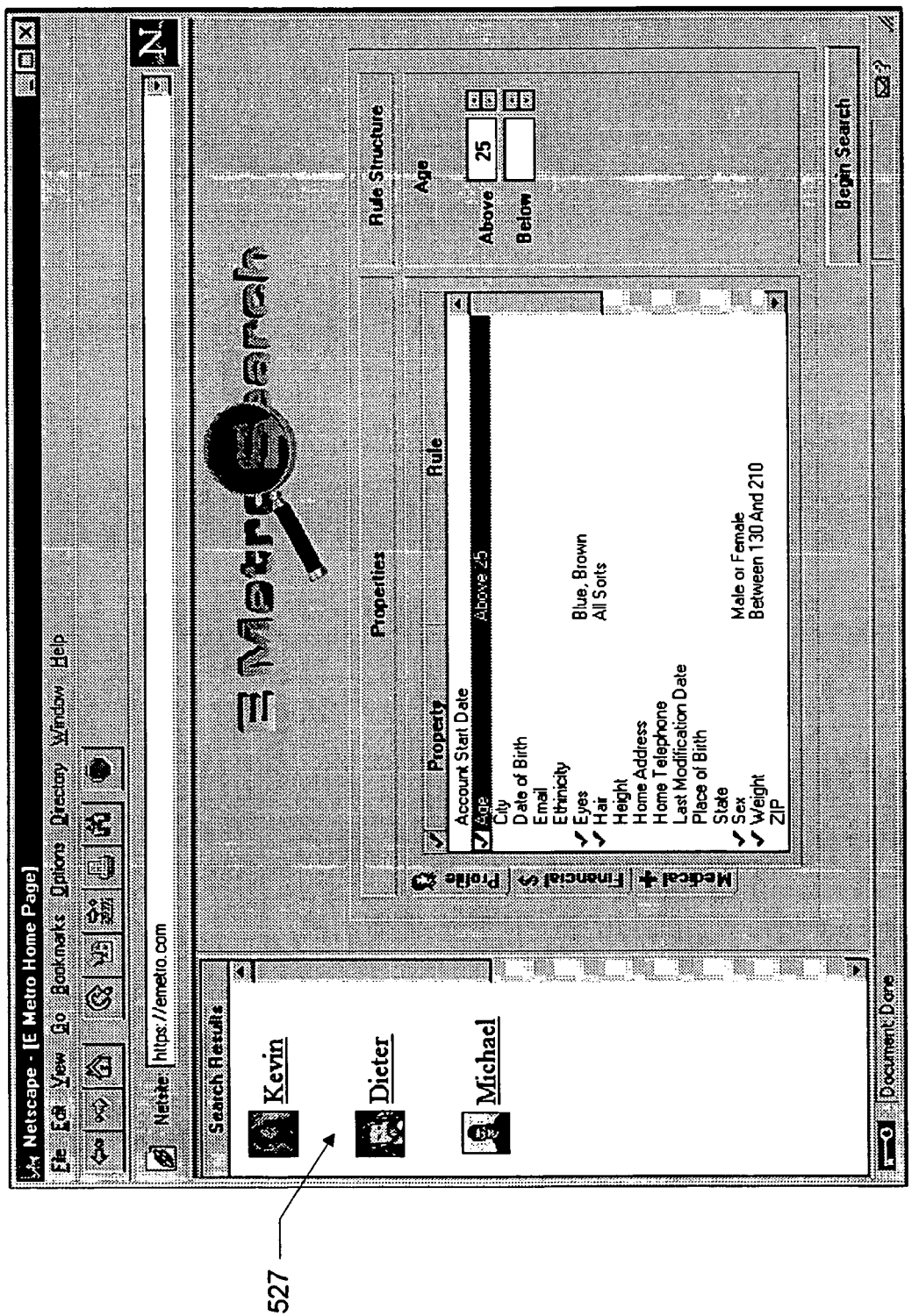
FIG. 28 is the user interface to the preferred embodiment showing how E-Metro Community members construct and execute searches displaying search results.

If the user selects the services option, the user will be asked for security information and/or hardware tokens. In FIG. 26, the E-Metro Community only asks for a certificate-based identification 523 and a security code or challenge response 515. Once the user selects "OK" 517, and the user is allowed into the E-Metro Community, the user can utilize the available services. In this example, the member is presented with the communities available screen 521 shown in FIG. 27, which is made of the graphical logo 505 and the community links 523. Services available in this E-Metro Community include search and selection, registration updates, advertising, shopping, customer support and other services selected by the E-Metro Community administrator. Search services provided in this E-Metro Community is the availability to perform parametric queries. FIG. 28 shows a partial view of the members who met a specific search request in this E-Metro Community, allowing the searching member to select particular E-PIAs by selecting a picture-link 527. Provided the requesting member has the proper qualifications as set by the interrogated member, the interrogated member's information can be seen by the requester.

The preferred embodiment is premised on a user's membership in at least one E-Metro Community, with the E-Metro Community defining the member's duties and rights. In the preferred embodiment, the E-Metro Community has three primary responsibilities. First, the E-Metro Community sets admission requirements that produces a high probability that the applicant for admission is who they say they are. Second, the E-Metro Community has security measures in place to reasonably assure that a member's identity can't be appropriated by someone else. Third, the E-Metro Community sets standards that place a high probability that the member is transacting business and disclosing accurately and in good faith.

The first responsibility for assuring the applicant is who they say they are is met in the preferred embodiment in a two step process. In the first step, an applicant, using the Netscape Navigator 15 accesses the Web site for the E-Metro Community 11 they wish to join. This user selects the registration object from an E-Being repository 13, fills it out and submits it to the E-Metro Community administrator. The E-Metro Community administrator reviews the application to assure that the applicant meets the E-Metro Community qualifications. If the applicant meets the qualifications, the application process moves to step two. In step two, the applicant/user appears in-person to the E-Metro Community administrator or another trusted authority or entity, such as a Certificate Authority or notary, to verify the user's identification. The applicant can present one or more pieces of identification, such as birth certificates, drivers' licenses, passport, social security card or other reliable means of identification. Once the applicant is personally identified and a key pair generated, they are issued a digital certificate binding the public key and both member and E-Metro Community information. A security code or challenge response access method is chosen and hardware token if requested. At a minimum the member will have a digital certificate and access method to fully use the selected and approved E-Metro Community services. The E-Metro Community is now reasonably assured that the person is who they say they are and has accounted for the processing of the registrant's application.

The second responsibility of the E-Metro Community is to assure that only the original applicant can use that member's identity. The digital certificate and security code or challenge response described above will assist in assuring the security of an individual's identity, but new technology allows for even greater security. For this advanced security, the E-Metro Community may issue the user a hardware token or secure-card, such as those sold commercially by Gemplus, Schlumberger, and Spyrus corporation. Although the LYNKS secure card from Spyrus has several options as to what information it can hold, three particularly useful items are 1) the basic information about the user, 2) a digital certificate, and 3) E-Metro Community digital certificate digitally signed by the certifying E-Metro Community. The first item may contain several pieces of information, including passwords, security codes, and particular challenges or code phases that can be used by the preferred embodiment to verify the identity of the user. For this challenge security, the user loads the security card with challenge response pairs that only the user will know. When the user wants to access an E-Metro Community, the security card "challenges" the user by presenting a challenge phrase that must be answered precisely. The second item, the digital signature, is an advanced security mechanism that allows the sender to attach a digital signature to a document that gives an assurance that a specific document was actually originated by that sender. The digital signature will be discussed in more detail in a later section. Those skilled in the art will recognize other alternatives to assure on-going security of a user's identity such as biometrics. The third item possibly held in the card stores information on the authority that certified this particular member. This authority could be the government, an E-Metro Community administrator or surrogate, or a commercial business. The more accountable, diligent and exhaustive the security policy and procedures are of the certifying agency, the higher the assurance that the member is also trustworthy.

The third responsibility for the E-Metro Community is to assure that the member properly transacts business and discloses personal information accurately and in good faith. This is mostly a policing process for the E-Metro Community, where those who violate the interaction policies for ethical interaction are removed from the E-Metro Community. Stricter enforcement of the rules will lead to a better E-Metro Community reputation for trustworthiness and accuracy.

Once there is assurance of the member's identity, the next level of security is to assure that the member can communicate with the E-Metro Community without messages and information being intercepted and interpreted by unauthorized individuals. This security level has two main components. First, the preferred embodiment uses security protocols approved by Netscape for commerce transactions, including purchases made on the Internet with a credit card. Second, the Netscape Navigator web browser has built in cryptography techniques, called public-key cryptography, that can assure the communication from the member to the E-Metro Community is secure from outside interception and interpretation. The preferred embodiment uses the public-key cryptography techniques supplied by RSA Data Security, Inc, but those skilled in the art will recognize alternatives.

Figure 3:
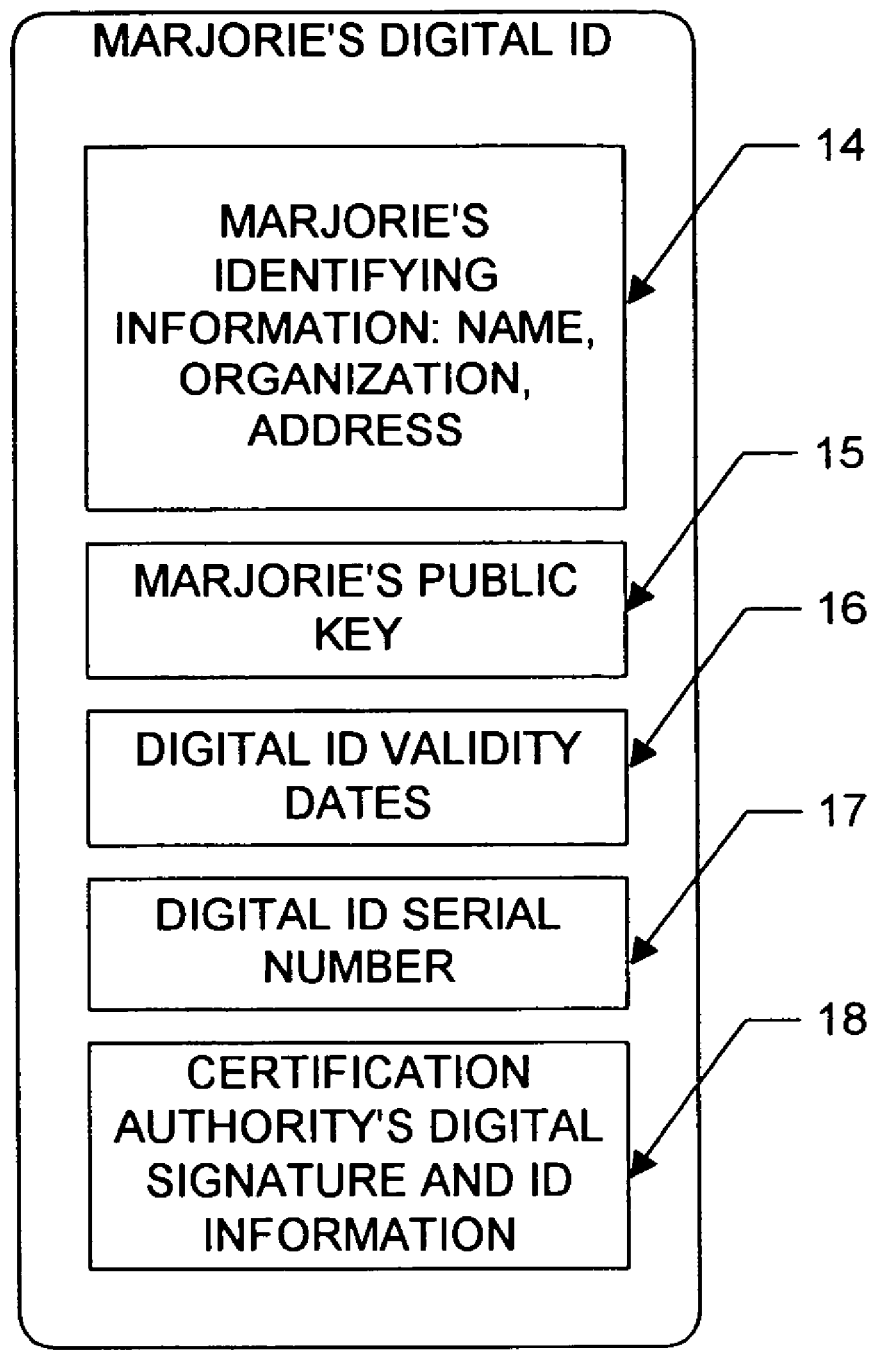
FIG. 3 shows the components of a digital certificate, e.g., VeriSign's Digital ID.

Public-key cryptography is one method currently known for secure transfer of information. A diagram on the operation of public-key cryptography is shown in FIG. 3. In this method, each user has a code pair, where one code is public and one is private. These codes are commonly called keys, so each user has a public key and a private key. The public key list 25 is widely distributed to anyone that may need to send the user information. However, the private key is kept secret by the user. For example, if "A" wants to securely send a file to a "B," A will encrypt the file using the Bs public key 19. This key is publicized and available to anyone who wants it. After encryption, the file 21 can be deciphered only by using Bs private key 23, which is known only to B. Thus, if B has properly secured the private key, only B will be able to receive and interpret the encrypted file. It doesn't matter if the file is sent via an unsecured transmission method such as the mail, Internet, or phone lines, since no one that intercepts the message can interpret it, unless they have somehow appropriated Bs private key 23.

Figure 4:
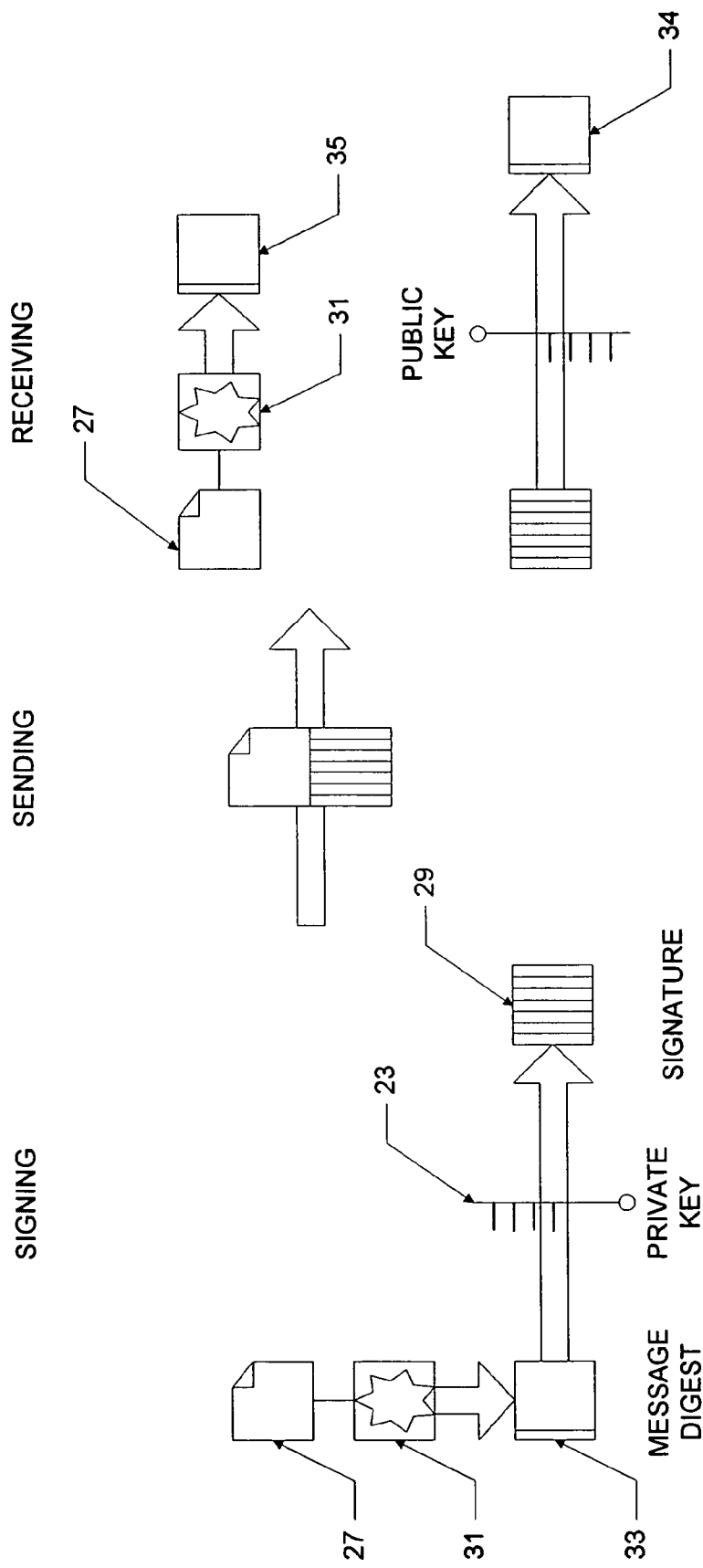
FIG. 4 shows how RSA Public-key cryptography works and how a digital signature is created and attached to a document to assure authorship.

A second security mechanism is the previously introduced digital signature, and assures the receiver that the message was actually sent by the stated sender. As briefly discussed above, a member can use a digital signature to "sign" files so to give a high degree of assurance that it was the owner of the signature that sent the message. FIG. 4 will assist in explaining the use of the digital signature. To add a digital signature to a file, the member passes the file 27 through a mathematical formula 31 that produces a digital pattern, or message digest 33, that is unique to that file. This message digest 33 is then encrypted using the members private key 23 as discussed above, creating the digital signature 29. This digital signature, then, can tie a particular file to a particular owner of a private key. The member then attaches the digital signature 29 to the file 27 and sends both to the receiver. In this example, the file 27 is sent unencrypted, but if the file must be securely sent, the member can use the method describe in the previous paragraph to encrypt the file with the receivers public key. When the file and signature are received, the receiver deciphers the digital signature 29 using the senders public key 19, revealing the digital pattern 33 unique to the file 27. The public key, as before, is available from a published public key list 25. If the digital signature 29 was made using any other user's private key, the resulting pattern will not match the file, and the receiver will know the file was not sent by the named sender. Using this digital signature technique, the preferred embodiment can place a high assurance that a particular file was sent by a specific member.

Using the techniques described above, there is a high level of assurance that information and business transactions will be made securely and accurately. However, security is only one part of a successful Internet interaction. Presently, interaction on the Internet is an impersonal and often random experience. A common critique of using the Internet is that interacting on-line doesn't allow us to locate, understand and know with assurance the person behind the e-mail ID or message—to hear the voice, to see the face, to know a little about the senders personality, characteristics, and trustworthiness. Without these, the interaction is not only personally unsatisfying, but frustrating and useless.

Virtual communities are forming but people have little assertive control over their digital persona or interactions and much of the rationale behind these virtual communities is data gathering. This data gathering is performed by commercial entities seeking to track consumers, performing continuous and subtle surveillance of community members. Overwhelmingly consumers want control of their personal information and are demanding change as a backlash is mounting seeking legislation to circumvent this unbridled gathering, trafficking and processing of personal information. The present invention creates a trusted virtual community enforcing informational privacy and informational self-determination, wherein people can individually and corporately demand value in exchange for accessing and processing personal information controlling the many attributes which make up their informational existence.

A digital persona or Internet personality is determined by the personal information available for an individual. The more complete and reliable the information, the more accurately the Internet personality will reflect the real-life personality. This personal information is valuable not only to accurately define an on-line presence, but, as discussed earlier, has commercial value to others. Personal information may take many forms, including health, financial and legal records, school transcripts, employment history, or buying preferences. Each of these pieces of information, if accurate, is an asset that can make interacting on the Internet more effectual and enjoyable. In the preferred embodiment, these information assets are compiled and made available to others according to the desires of the individual E-Metro member. All the personal information, taken as a whole, makes up the electronic presence or digital persona of an individual. For purposes of clarity and ease of explanation, it is useful to think of this electronic presence in a Web site E-Metro Community as an electronic personal information agent or E-PIA, as introduced earlier.

Some of the informational assets of an E-PIA are created and held by others, but can be dispatched or processed in accordance with the rules embedded in the E-PIA, such as medical records and school transcripts. Other assets are those that can be authored by E-Metro Community members. The preferred embodiment allows a member to self-assure or collaboratively assure the information encapsulated within the E-PIA is accurate and reliable.

Figure 29:
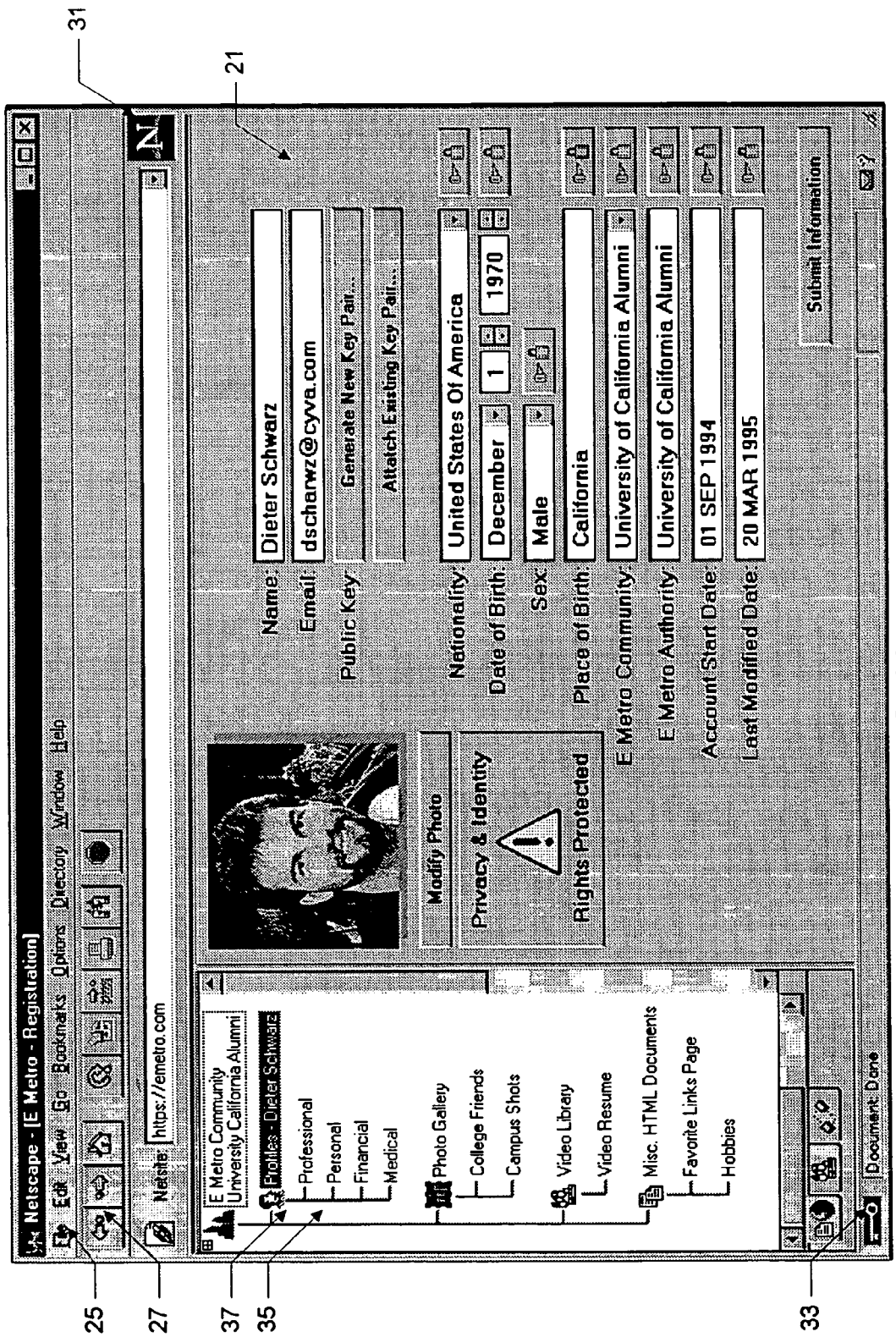
FIG. 29 is the user interface to the preferred embodiment showing the initial page of an E-Metro Community registration object being authored.

In FIG. 29 a user has accessed an E-Metro Community Web site using Netscape Navigator and is displaying the initial registration application 21. The standard Netscape interface 25 is near the top of the figure. Specifically, the user interface includes a menu bar 25, control buttons 27, quick access tree structure 37, and a communication activity indicator 31. Additionally, the key graphic 33 near the bottom of FIG. 29 tells us that security is in operation, so all communications with the E-Metro Community Web site are encrypted.

The registrant can navigate to other data subject areas (professional, financial, medical) within the notebook shown in the left most scrollable window. If the user selects the professional data area 37, the user will see the professional profile and begin data entry or update the information.

Figure 30:
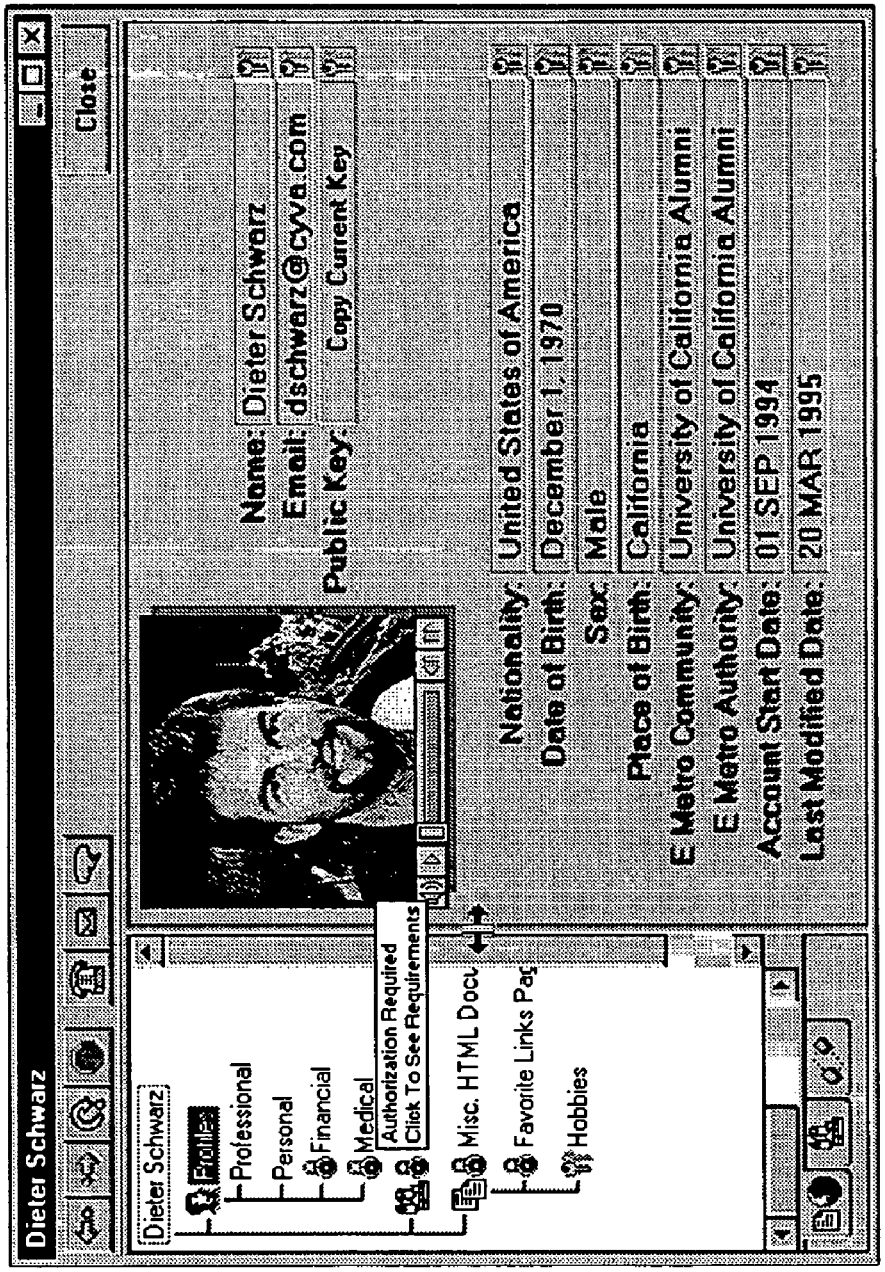
FIG. 30 is the user interface to the preferred embodiment showing the selected E-Being performing a trusted presentation of their personal information, with certain components and their attributes indicating secured or locked status because the requesting viewer does not meet the requirements set by the E-Metro Community and E-Metro Community member.
Figure 31:
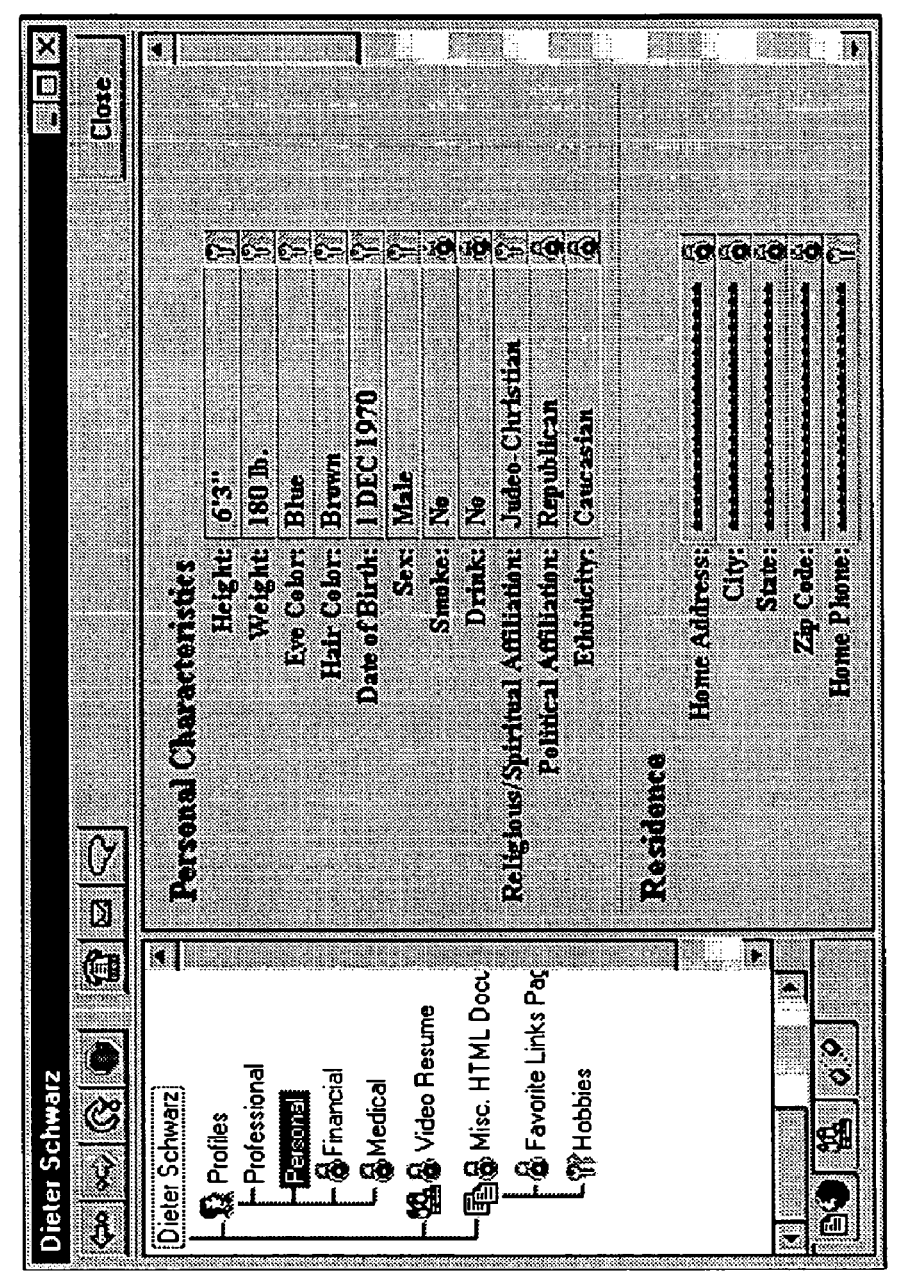

FIG. 30 is a dispatched E-PIA, which is displaying a portion of the personal profile. In FIG. 31 which is the continuation of Dieter's E-PIA the Home Address is not displayed and a closed lock icon accompanies the data attribute to the right. This indicates the person requesting to access this information did not meet his rules for access-processing and Dieter is unwilling to disclose what the rule is governing access-processing. When Dieter completed this personal profile, he authored rules FIG. 32 that determine who gets access to each item of information. The user accessing this personal profile does not satisfy these rules, so Home Address and other information is not available. In the preferred embodiment, if access to information is denied, there may be opportunity to see what the rule is and respond as indicated by the open key icon to the right of Home Phone, FIG. 31.

In this example Dieter has several options for rule processing depending upon Dieter's anticipation of rule interactions and the level of hands-on control he'd like to maintain or entrust to the E-PIA. Dieter may simply wish this requesting user to provide, in exchange, their Home Phone number and so a simple rule interaction will begin. Either processing of this rule will be done at the requesting client site confirming rule satisfaction or the messaging system will be activated with a message sent back to Dieter's Home E-PIA requesting his Home Phone be provided or a signal to his dispatched E-PIA be sent authorizing decryption and display of the encapsulated Home Phone data.

An automated rule-based response can be executed on the client-side given rule interactions are pre-defined and can continue the user-agent dialog or delayed interactions supported by the messaging system will continue the rule interactions. Dieter's Home E-PIA may already have a response established by a rule which says if your show me yours I'll show you mine and so the message response is semi-automatic.

In the case where Dieter has already defined a rule for processing his Home Phone data at the requesting client site the interaction is carried out and triggers a client-side message to Dieter's E-PIA. So, within the requesting user's E-Metro client-side application Dieter's dispatched E-PIA receives a signal to decrypt his Home Phone number for controlled access. The rule interaction Broker within the E-Metro client-side application checks to see if the Home Phone has been properly provided.

In the above case the E-Metro Community E-Broker has dispatched an already loaded E-PIA with encrypted data encapsulated which will save the messaging sending, rule-processing, and hands-on response some overhead by processing the rule right at the client-side. Dieter will decide how trusting he wishes to be in that he can rely upon the system to fetch data in return prior to releasing his data over E-Metro's virtual private network or have the data and rules dispatched within this E-PIA for processing right at the client station.

Rule response dialog boxes display rules and give the requesting person the option to respond. The rule may specify a financial transaction to occur. In this case the user authorizes a debit from their E-Metro wallet for the amount required by the rule.

Figure 32:
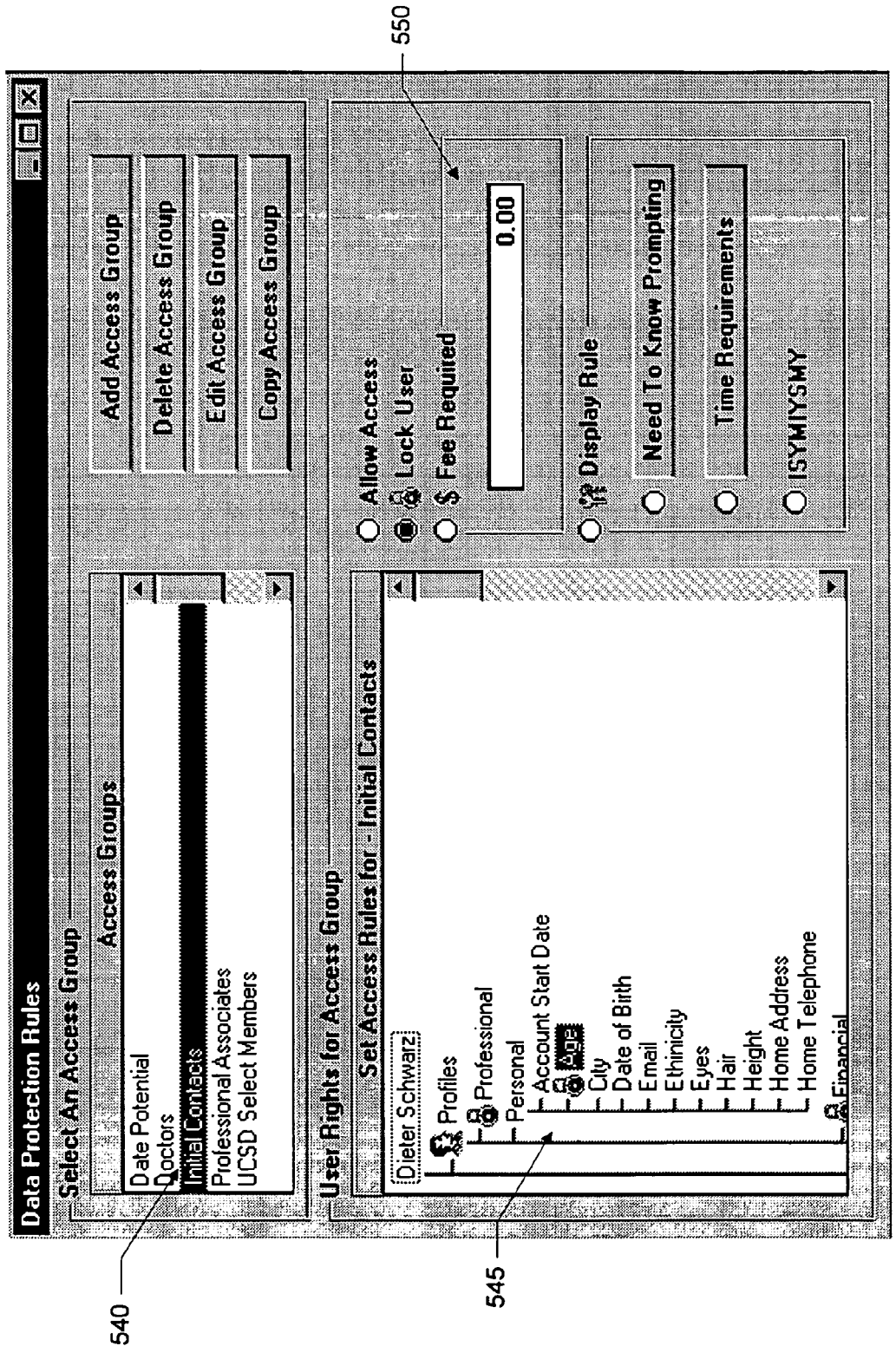
FIG. 32 is the user interface to the preferred embodiment presenting rule authoring and assignment of rules to both particular personal information attributes and particular groups or sub-communities of a community.

Rule specifications are authored in FIG. 32. The figure depicts a dialog screen wherein Dieter navigates on the left his PIA's data attributes 545, specifying what kind of rules will govern that attribute or group of attributes. Access groups are a means to group rules by particular communities or sub-communities 540. Initial Contacts is a group Dieter has specified as a sub-community in which his Age attribute rule is not disclosed and this attribute in locked 550 i.e. not revealed in an initial contact scenario.

His other attributes: City, Date of Birth etc. are open and will be displayed upon processing. With this screen Dieter can create a "Need To Know" Prompting where in the requesting user is prompted for a need to know. Dieter will have to process this response himself via E-Metro's messaging system. Some message interactions will be automated by pre-built rule responses such as "I'll Show You Mine If You Show Me Yours rules." So Dieter's Home E-PIA can react to rule messages automatically.

Some data attributes will have Time Requirements in that the E-PIA will only allow so much time to pass for viewing or processing the E-PIA's data. A case in point is that Dieter will only allow 24 hours to pass and then his E-PIA locks itself up (encrypts) in order to prevent further processing.

Figure 33:
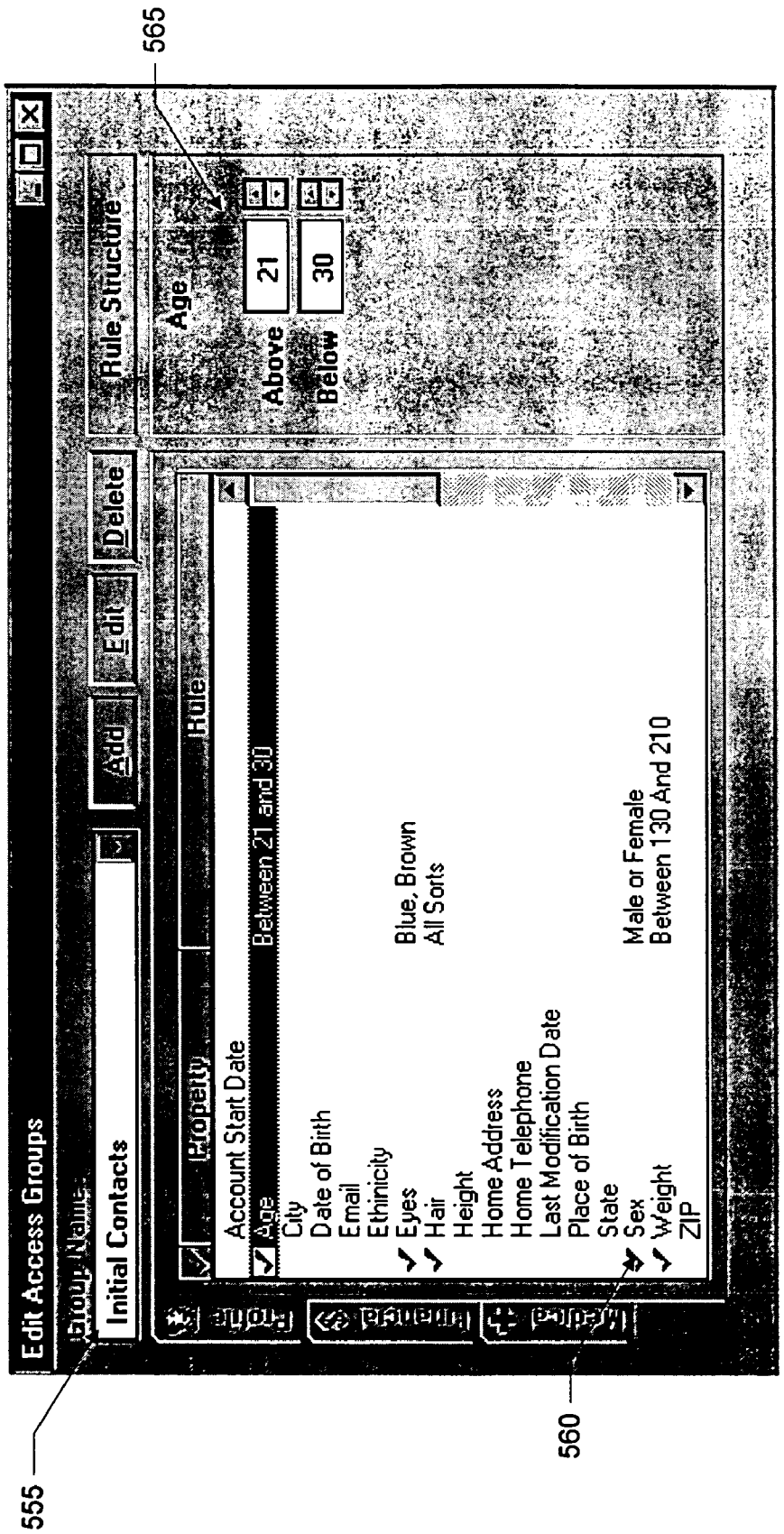
FIG. 33 is the user interface to the preferred embodiment presenting rule authoring governing what criteria a processor of information must meet to access-process the user's information.

As shown in FIG. 33 the sub-community Initial Contacts 555 must meet the above rules 565 and 560 in order to process Dieter's E-PIA. So Dieter is specifying the criteria other persons must meet prior to processing his E-PIA.

So community members will send queries to the E-Metro for processing and although a query may have several matches the decision to dispatch the E-PIA which meets the query requirements may not be sent due to the fact the requesting person may not meet the person's rule requirements. In the prior case Dieter's E-PIA was dispatched as the person requesting his E-PIA met the above criteria.

As shown in FIG. 2, the E-Being repository 13 may be anywhere on the Internet, that is, it may be on the same server where the E-Metro Community resides, or the E-Metro Community may use a E-Being repository residing somewhere else on the Internet. When a member joins an E-Metro Community, one of the first tasks will be to author, according to the users discretion, the personal profiles. These profiles, plus any information from outside sources, comprise the E-PIA representing an individual on the Internet.

A user can belong to several E-Metro Communities in the preferred embodiment. The user must, however, select one of the E-Metro Communities to be the home E-Metro Community. The selected E-Metro Community houses an E-PIA designated to be the "Home E-PIA" which keeps track of all the other E-Communities where the member resides. In this way, a change in the home E-PIA can be used to update the information in all the other E-Communities, if necessary. Once a member has joined an E-Metro Community and designated the E-Metro Community as its home, the member can join another E-Metro Community by simply meeting the admission requirements for the next E-Metro Community and then copying the E-PIA to the new E-Metro Community. As will be discussed in a later section, when a member desires to create a special E-PIA, called an E-AutoPIA, that is capable of moving to other E-Metro Communities and perform requested tasks, the E-AutoPIA can only be spawned from the home E-PIA. The E-AutoPIA, then, has a subset of the information contained in the parent home being, thus assuring anyone encountering the E-AutoPIA that the information it carries is related to a home E-PIA.

A member defines rules for the access-processing of their personal information to assure the information is processed appropriately. When a user tries to access the personal information of a member, the preferred embodiment checks to see if the user meets the requirements for trusted processing of the information. The preferred embodiment only dispatches an E-PIA to the requesting user containing information, which the user is authorized and qualified to process. These rules define the limitations on information processing and form the basis for interaction between E-PIAs in the E-Metro Communities. That is, when a member, represented by an E-PIA, contacts another member's E-PIA, the two E-PIAs can determine what, if any, information can be exchanged without any concurrent input from the represented humans. The specifics of this rule checking is described in a later section.

To this point the E-PIA in the E-Metro Community has been described as simply a storage repository for personal information with the ability to selectively release information according to rules, and acting only within one E-Metro Community. In the preferred embodiment, however, the E-PIA may also take the form of a more active entity, called an E-AutoPIA, capable of substantial unsupervised activity with other E-Metro Communities and E-PIAs in other E-Metro Communities on the Internet in general. The E-AutoPIA contains a subset of the personal information and rules of the full E-PIA, plus an itinerary that directs its activities. The itinerary tells the E-AutoPIA what E-Metro Communities to visit, what information to collect, and, in conjunction with the rules, what information may be processed. Using an itinerary, then, an E-AutoPIA will "move" about the Internet, visiting other E-Metro Communities where it can interact with the E-PIAs in each E-Metro Community.

In the preferred embodiment, the E-AutoPIA does not directly interact with other E-PIAs. Instead, each E-Metro Community has at least one process that acts as a brokering agent between an E-AutoPIA and the E-PIA members of the E-Metro Community. This brokering agent is the E-Broker presented earlier. When two E-PIAs or an E-PIA and an E-AutoPIA desire to interact, both present the E-Broker with their respective rules, and the E-Broker determines what, if any, information may be exchanged. Additionally, the E-Metro Community administrator may set minimum rules that apply to all the E-Broker mediated transactions to occur in that E-Metro Community, assuring that only transactions that meet minimum E-Metro Community standards will occur.

As alluded to, there are two modes of E-PIA Interaction. A user, electronically represented by his member E-PIA within an E-Metro Community, may invoke a single Interaction for an E-Metro Community via his Netscape Browser and the appropriate HTML document. This is known as Online Interaction Mode. When an E-AutoPIA invokes Interactions within an E-Metro Community, this is called Batch Interaction Mode.

Figure 5:
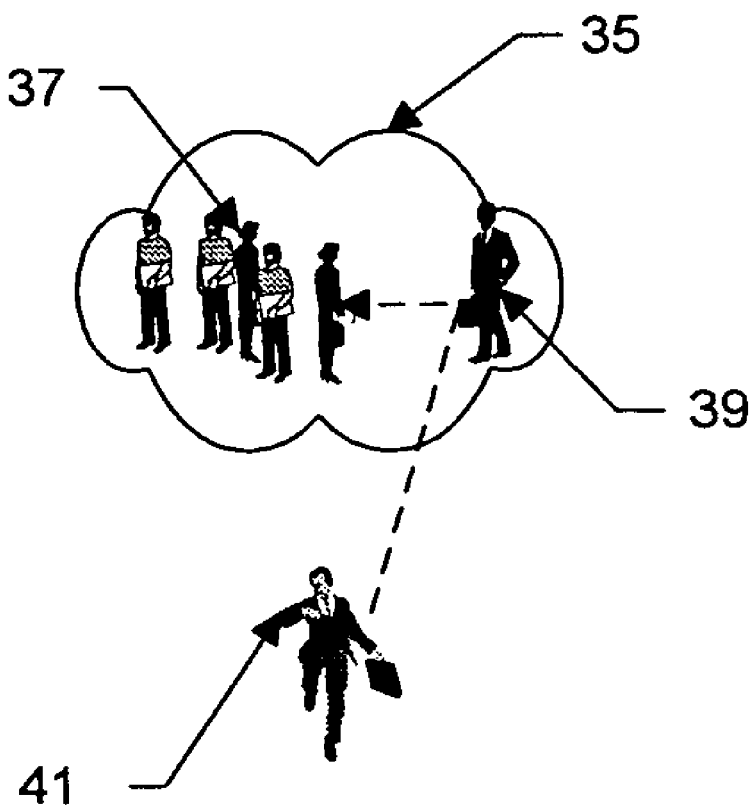
FIG. 5 shows an E-AutoPIA operating outside the E-Metro Community.
Figure 6:
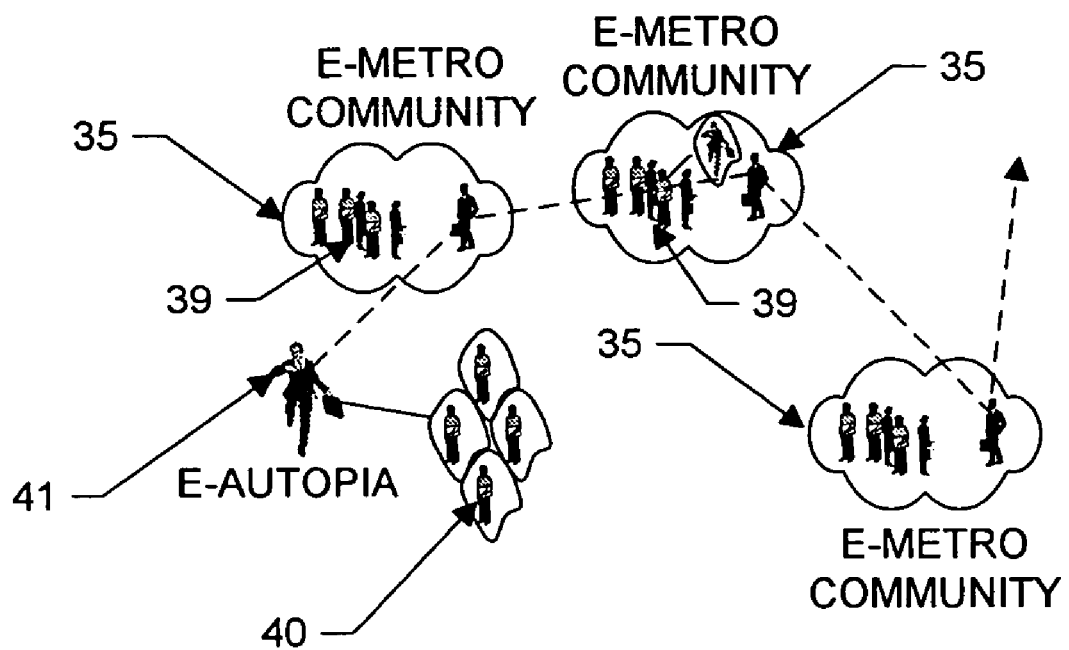
FIG. 6 shows an E-AutoPIA that has collected several informational E-PIAs from several E-Metro Communities.

FIG. 5 conceptually shows a Web site E-Metro Community 35 containing several E-PIAs (members) 37. For any interaction, the members 37 must use the services of an E-Broker 39. The E-AutoPIA 41 can operate external to the E-Metro Community, and as shown in FIG. 6, the E-AutoPIA 41 can have an itinerary that directs it to interact with the E-Brokers 39 in several other Web site E-Communities 35.

The E-Broker has three main functions within the E-Metro Community. First, the E-Broker has been defined by the E-Metro Community administrator to check the credentials of any E-PIA that wants to enter an E-Metro Community. In this policing role, the E-Broker checks certification, verifies identity, and inquires into the purpose of any approaching E-PIA. After applying the rules set by the E-Metro Community administrator, the E-Broker will either deny access to the E-PIA or allow it into the E-Metro Community. Second, the E-Broker acts to search for members that meet the criteria designated by an E-PIA during its request for interaction. For example, if an E-PIA enters an E-Metro Community to find members who are interested in purchasing a car, the request is given to the E-Broker. The E-Broker, using several subsystems available in the preferred embodiment, then searches all the members to find those that have expressed an interest in purchasing a car and creates a list of all members meeting the necessary criteria. Third, the E-Broker acts as an intermediary between the E-AutoPIA and the E-Metro Community E-PIAs. In the above example, even after the E-Broker has created the list of members that express an interest in purchasing a new car, the E-Broker still acts as a mediator. The E-AutoPIA presents its rules for collecting information, and each member E-PIA presents its rules for disclosure, and the E-Broker determines what information, if any, will be exchanged. Of course, even if the two beings agree to exchange information, the E-Metro Community administrator may have set a more stringent rule that will not allow the E-Broker to finish the transaction.

One of the possible tasks that an E-Broker may negotiate is the controlled processing of a member's personal information. Provided both the E-Metro Community administrator and the user want to process personal information, the E-Broker can be instructed to collect money from a visiting E-PIA that wants personal information. In the preferred embodiment, the money collected may go to the E-Metro Community, the member, or split between them. An E-Metro Community with a substantial membership may find this an attractive way to finance other E-Metro Community services.

The E-Metro Community may provide several services to its members. Services may include intra-community functions such as collaboration groups, consensus building or voting systems, capital disbursement systems to manage the community revenues generated from services, on-line customer satisfaction databases to protect consumers promoting accountability and just resolution of customer complaints, or community subsidized provision of advanced wireless communicators to promote 'equal access' policy objectives. The E-Metro Community may also provide extra-community services, such as access to cross-community mobilization efforts for philanthropic or political purposes, joint electronic commerce services, sharing of communication infrastructure costs to facilitate cross-community advanced or newly introduced wireless networks and technology for all community members.

Figure 7:
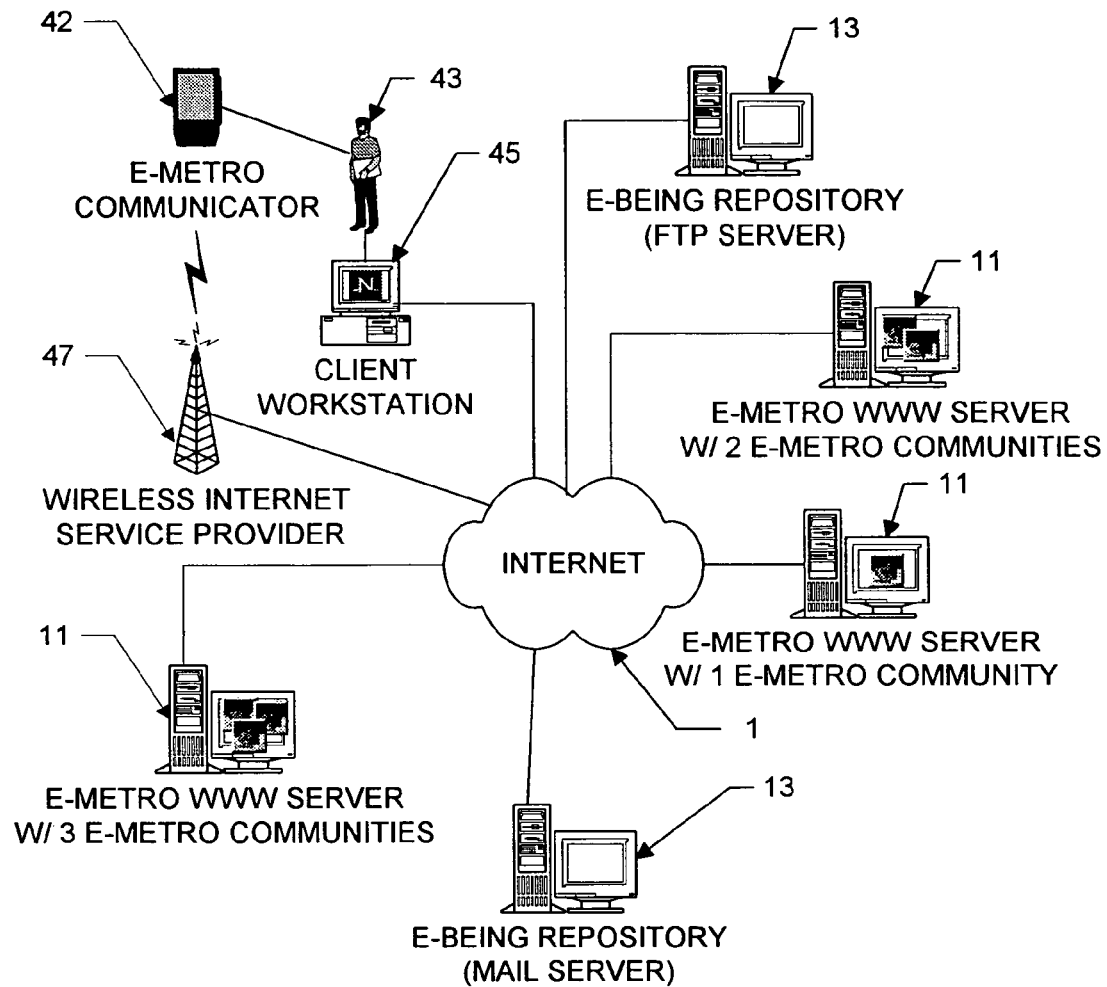
FIG. 7 shows several network servers, a user's personal computer connected into the Internet plus a wireless communicator.

A typical physical arrangement for the preferred embodiment is shown in FIG. 7 where a user 43 accesses the Internet 1 by using a personal computer 45 to connect to a network server 11, and the network server 11 makes the connection to the Internet 1. Both wire-line and wireless connections will be supported with where more than one E-Metro Community can reside on one network server 11, and E-Metro Communities may even form a hierarchical relationship. That is, an E-Metro Community may contain not only members, but may contain other sub-communities as well. FIG. 7 shows network servers 11 with one, two, or three E-Metro Communities on each server. Additionally, E-Being objects for authoring member information for the particular E-Metro Communities may be requested from the E-Metro Community E-Broker or, if made available publicly, in the E-Being repositories 13. The preferred embodiment allows any public storage subsystem for E-Being objects. Two possible storage subsystems are an FTP site or a Mail server which is simply a file storage and communication system holding assorted file types and is available off the shelf from Netscape or other vendors. These E-Being repositories may be on any server 11 or 13, or the E-Being objects may even be held by user at their personal computer 45 or a wireless Communicator device 42.

Figure 8:
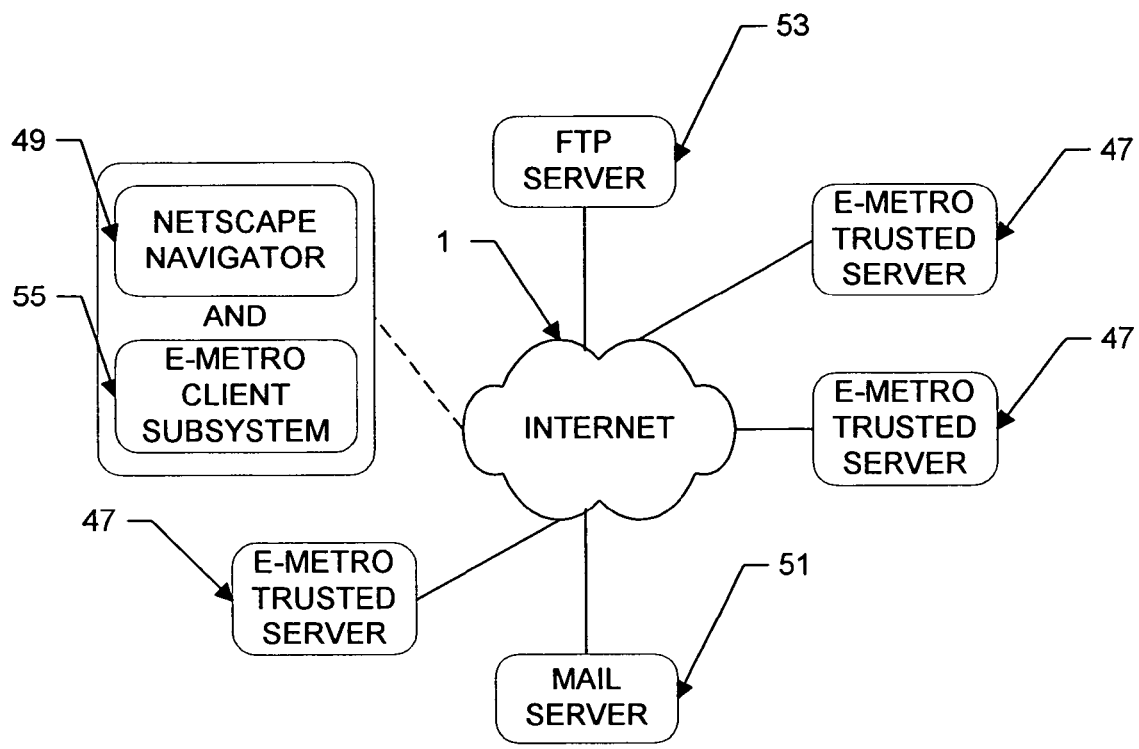
FIG. 8 shows several E-Metro Community systems along with other resources interconnected by the Internet.

We now turn to the specific software implementation for the preferred embodiment. The preferred embodiment is a modularized application, that is, the application is divided into several parts, with each part, or module, assigned specific functions. Some of these modules are designed to operate on one or more network servers, while other modules are designed to operate on a user's local computer system. The user and server processes necessary to the preferred embodiment are shown in FIG. 8, and are associated with the physical devices shown in FIG. 7. Referring to both diagrams, the user 43, from their personal computer 45, runs the Netscape Navigator Web Browser 49, a commercially available application. The Netscape Navigator 49 allows the user to conveniently access any E-Metro Community Web site. Also, the Netscape Navigator provides compatibility with other Netscape products that bring specific tools to the preferred embodiment. Besides the Netscape Navigator, the user locally runs several utilities 55 in support of E-Metro Community activities. These specific applications may be DLLs (Dynamic Link Libraries), Java applications, applets and scripts, or some other code of a similar nature that supports specific E-Metro Community activities. As mentioned earlier, however, in almost all cases, additional subsystems and DLLs should not be necessary.

Figure 9:
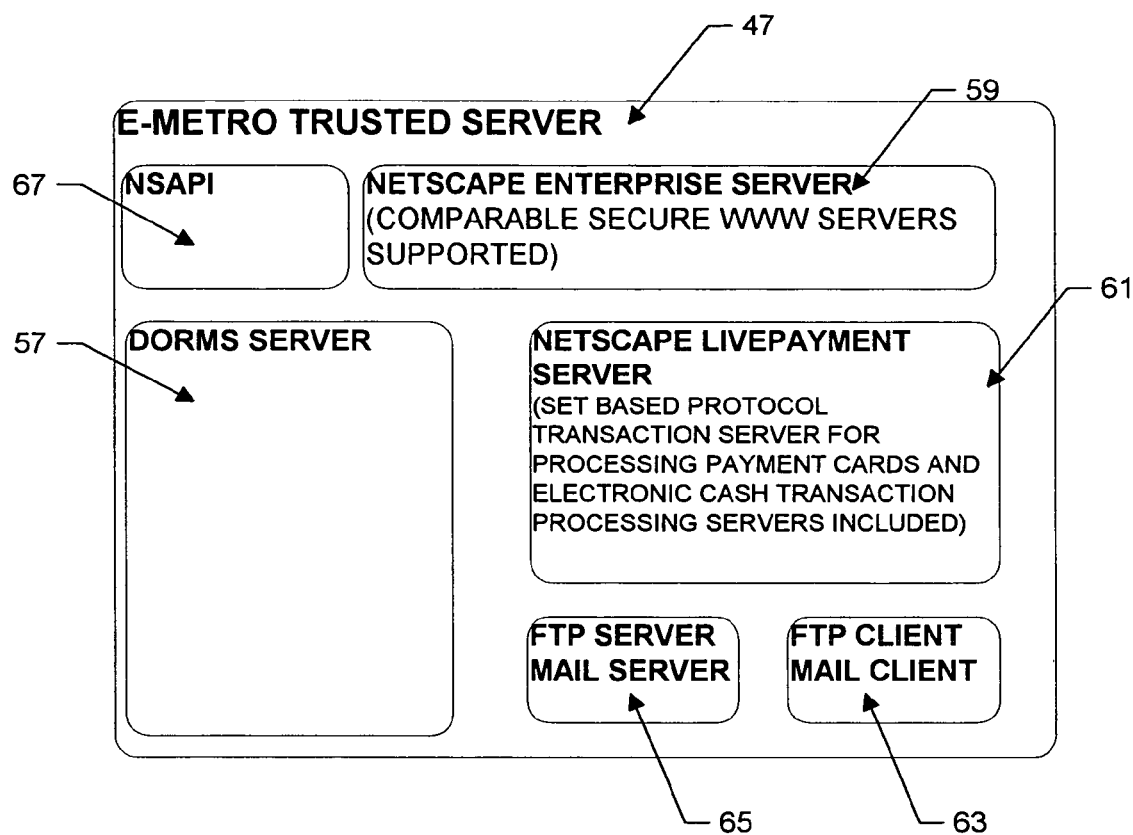
FIG. 9 shows the architecture of the E-Metro Trusted Server.

The heart of the preferred embodiment is the Web site E-Metro Community system 47, which operates on the network servers 11. A top level view of the Web site E-Metro Community system 47 architecture is shown in FIG. 9. The system comprises the Distributed Object Resource Management System (DORMS) 57, which is shown in more detail in FIG. 10, a Netscape Enterprise Server 59, the Netscape Application Programming Interface 67, a LivePayment payment card transaction processor 61, an FTP server 65, and an FTP client 63. Each of these system components will be individually discussed below, and then their interaction explained, but first the important consideration of security will be addressed.

Figure 24:
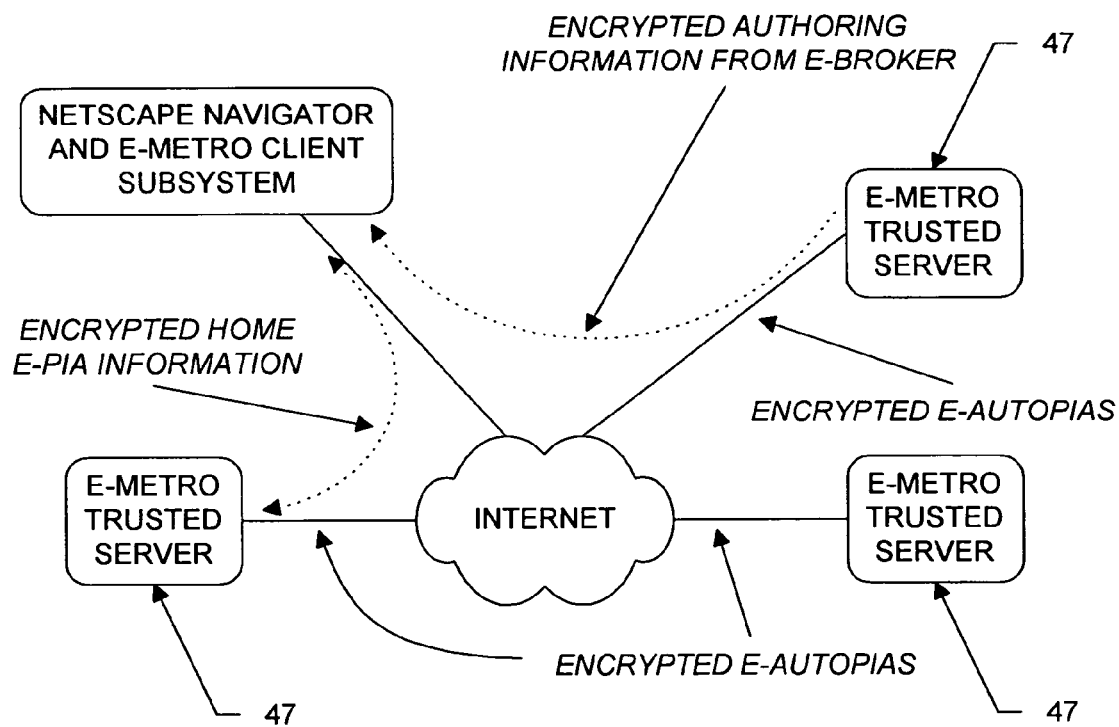
FIG. 24 shows that the communication external to an E-Metro Community are all done with RSA-type security and encryption.

Strict security is necessary in order to ensure that only intended communications and information dissemination occurs. Security can be divided generally into two categories: 1) security mechanisms to assure that eavesdroppers or accidental recipients cannot access information, and 2) security measures to assure that information is only released to a trusted entity. The first type of security is accomplished by using cryptographic techniques to transfer data between entities. Referring to FIG. 24, several Web site E-Metro Community systems 47 and a user accessing the preferred embodiment with the Netscape Browser are shown. Each Web site E-Metro Community system 47 is operating on a network server as a secure process. It is expected that anyone skilled in the art of process security can create a local secure process for each Web site E-Metro Community system 47. For inter-community communications, each Web site E-Metro Community system 47 maintains its own private key and public key for encryption use.

When a source E-Metro Community wants to communicate with another target E-Metro Community, such as when an E-PIA is transferred, a double encryption technique is employed. The source E-Metro Community encrypts the message using the public key of the target E-Metro Community. The source E-Metro Community then encrypts the now encrypted message again, but this time with its own private key. Each E-Metro Community is aware of all other E-Communities and their public keys. When the target E-Metro Community receives a message, it first decrypts the message with the public key of the source E-Metro Community and then it decrypts the message with its own private key. This "double" encryption assures the target E-Metro Community that the source E-Metro Community was indeed the source E-Metro Community mentioned in the message and also assures the source E-Metro Community that only the target E-Metro Community will be able to decrypt the message intended for it. Similar security measures are used for communications from an E-Metro Community 47 to a user.

Another important security aspect concerns assuring the source of an E-PIA or E-AutoPIA. This assurance of origin is shown through the use of a Certificate 150 and Trusted-Token 159. Certificates are held by all E-PIAs and E-AutoPIAs, and contain the name of the person or entity represented and their associated public key. Since the personal information held by an E-PIA or E-AutoPIA has been encrypted by the private key of the person or entity represented, if the public key in the certificate matches the published public key, and the personal information correctly deciphers, then there is certainty that the E-PIA or E-AutoPIA originated from the stated source. The Certificate, then, is to assure that a being represents who they say they represent and the information was originally encrypted by that representative. The TrustedToken represents a necessary privilege to perform an Interaction, given by an E-Broker at E-PIA or E-AutoPIA authoring time. Each Interaction that needs to be secured will require that a TrustedToken be issued. Before an E-Broker will act on a requested Interaction, it will check to see that the requesting E-PIA has the necessary to assure that the E-Broker had granted privilege to perform the Interaction previously. Each TrustedToken will be associated with a specific Interaction and will be encrypted by the requesting E-PIA's private key. By using the requesting E-PIA's known public key, the TrustedToken can be decrypted and compared to the expected value, thus giving assurance that the ability to request the Interaction was actually granted specifically to the requesting E-PIA.

The second security mechanism assures that information is only released to trusted entities. When an E-PIA gives some of its personal information to another, the personal information given is still secured and owned by the original E-PIA, so subsequent dissemination can be controlled. The mechanisms concern initial release of information and subsequent dissemination by others. The initial release of information is controlled by having both the Web site E-Metro Community administrator and the individual set rules which must be met before information can be released. The E-Metro Community administrator can set rules that generally apply to all potential exchanges in the Web site E-Metro Community, allowing the E-Metro Community to maintain control on the types of acceptable transactions. Also, the individual can assign a rule to each piece of personal information in their E-PIA. By setting these rules, the E-PIA will only share information in a trusted environment with a trusted being. A more difficult issue relates to control over subsequent dissemination of information. In fact, if the receiver of the information, in turn, passes the information on to a third E-PIA, the preferred embodiment still retains knowledge of the original owner of the personal information and continues to police access to the information. This subsequent security is set by Transitive Privilege Rules declared by the original E-PIA. The transitive privilege rules create a transitive trust such that: If A trusts B with information X, and B trusts C with information X, then A trusts C with information X. This important concept assures to A that its information is never passed on to an entity which it does not trust according to the Transitive Privilege Rules it has declared for the data it has submitted. Information is always passed as a version of the E-PIA which submitted its information. For example, suppose an E-PIA contains a rich set of information which includes birth date, address, phone number, etc. Further, suppose it wishes to release only its phone number to another during an interaction. The receiving entity will actually receive an E-PIA object informational E-PIA, which contains only the phone number. More specifically, the E-PIA object received is a version of the original E-PIA which represents how the submitting E-PIA wishes to be perceived by the receiving entity. FIG. 6 depicts the collection of versions 40 of E-PIAs by a traveling E-AutoPIA. The versions of E-PIA objects is the only manner in which information is exchanged in the preferred embodiment.

The Distributed Object Resource Management System (DORMS) is central to the operation of the Web site E-Metro Community system 47. As shown in FIG. 9, the DORMS 57 handles several core activities for the system, including storing of E-Metro Communities, E-Brokers, and members, E-PIAs maintaining a directory of all E-Metro Communities on the Internet, holding auto beings, and handling the interaction between E-PIA and between E-PIAs and E-AutoPIAs. Each of these activities will be discussed below.

Figure 10:
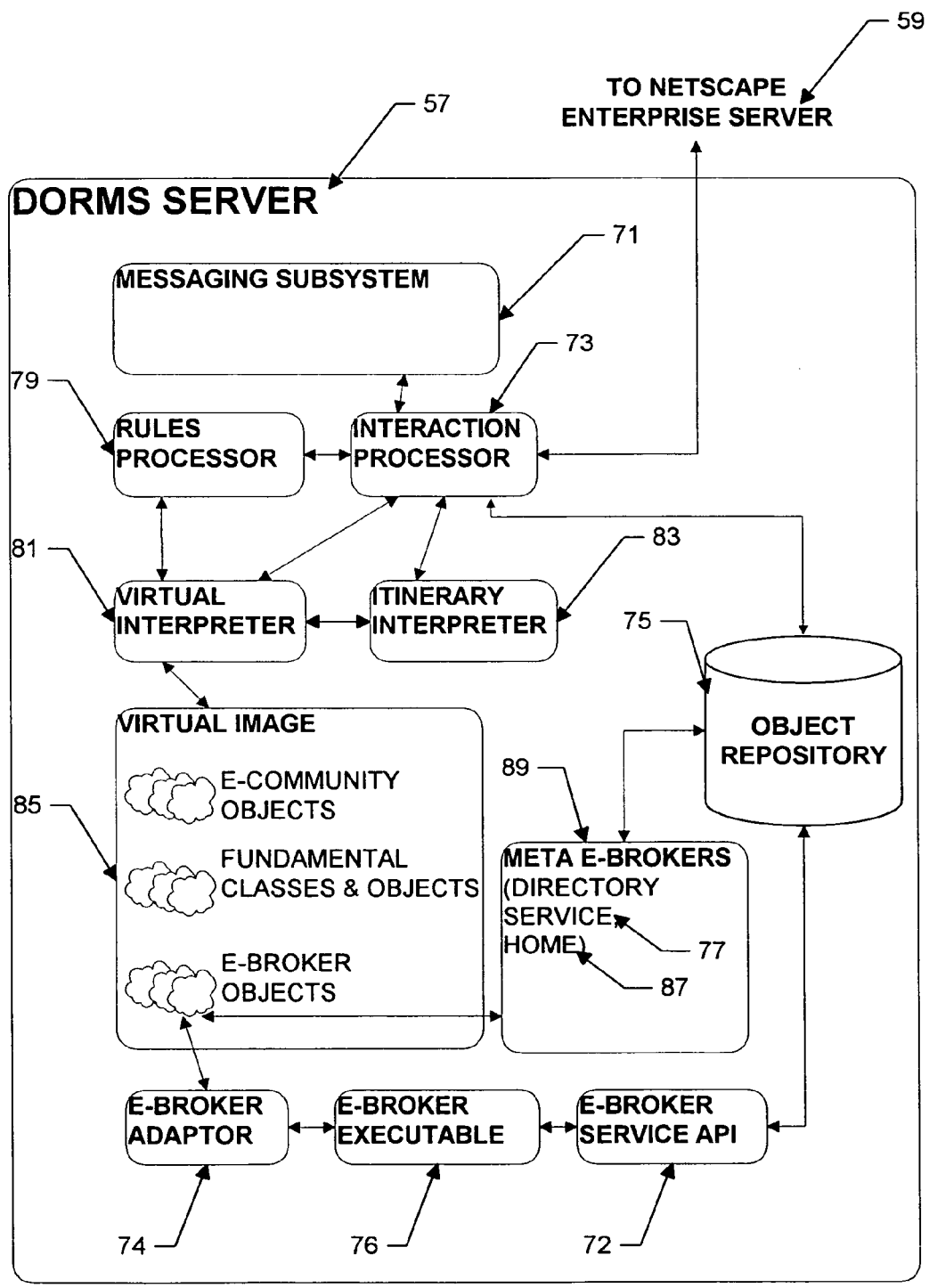
FIG. 10 details the DORMS subsystem in the E-Metro Trusted Server, which is shown in FIG. 9.

The activities of the DORMS 57 are implemented with a series of interrelated subsystems, as diagrammed in FIG. 10. The interaction processor 73 is the key subsystem for the DORMS 57, and is responsible for all external communication and most internal decisions. Once the interaction processor 73 decides on a particular course of action, the action is implemented by the use of an E-Broker process. There are several E-Brokers available to do specific, reoccurring tasks. The operation of the interaction processor is discussed in detail in a later section, but first the other DORMS functions and individual subsystems will be addressed.

The DORMS is responsible for the storage of the E-Metro Communities, E-Brokers, and E-PIAs. Although each of these items is quite different, they are all stored in a common structure within the Object Repository 75. The Object Repository 75 employs a simple object oriented interface over a relational database. The relational database can be any that operates on the network server, such as the popular Oracle Database system.

Figure 11:
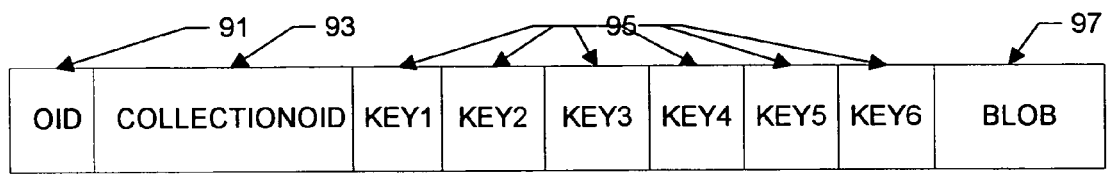
FIG. 11a-d detail the storage mechanism for several objects used in the preferred embodiment.
Figure 11:
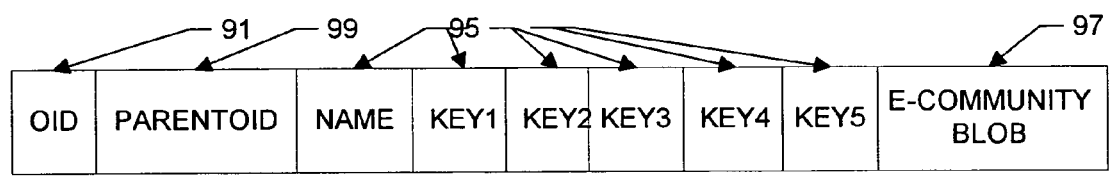
Figure 11:
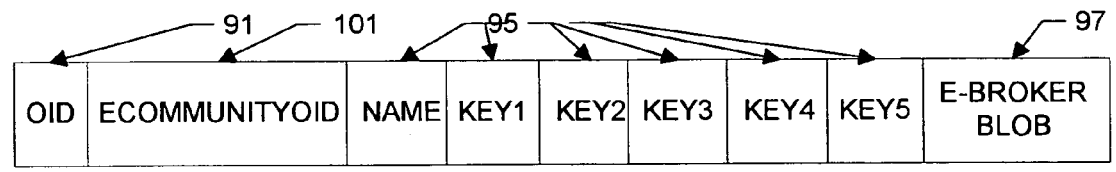
Figure 11:
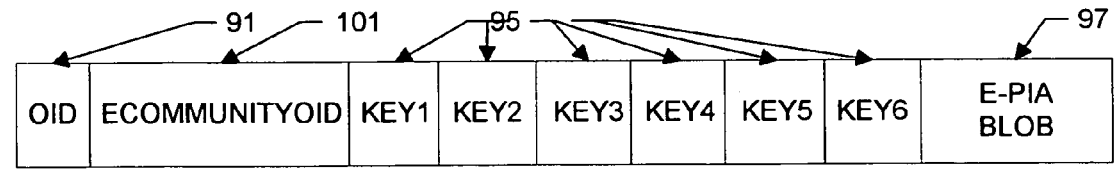

E-Metro Communities, E-Brokers, and E-PIAs are all objects in the preferred embodiment, with each instance of an E-Metro Community, E-Broker, or E-PIA assigned a unique Object Identifier, or OID 91. The characteristics are then stored with the OID 91 in the form shown in FIG. 11*a*. This figure shows the structure of each row of a table within a relational database. Referring to the figure, the OID 91 is in the first field. The next field, the CollectionOID 93 identifies if this object is included in any other object, allowing for the creation of relationships between objects. Using a common CollectionOID 93, for example, several E-Brokers, E-PIAs, or even other E-Communities can be associated with a single E-Metro Community. The CollectionOID 93, then, is the preferred embodiment's method for tracking the hierarchical relationships between E-Communities, and the method for tracking E-Broker and E-PIA assignment within a particular E-Metro Community. Following the CollectionOID 93 are several key fields 95 that contain selected information about the object. These fields are "keys" that may be used for search and selection criteria by the database program. In the preferred embodiment, six key fields 95 are allowed for each row in the database table.

Of course, more or fewer keys could be used, or alternate search techniques are clear to those skilled in the art. The specific identity of the keys is left to the E-Metro Community administrator to assign, thus allowing E-Metro Community needs to direct the most effective fields for efficient searching. The last item in the row is the object itself, which is stored in BLOb (Binary Large Object) format. BLOb format is a standard database storage structure that allows a single field in a database to hold multiple pieces of discrete information and is unaffected by the content of each piece of information. Thus, the DORMS can search the key fields 95 in the object repository 75 to quickly select appropriate objects, then extract and view the objects themselves from the BLOb format, a much slower operation.

As stated above, E-Metro Communities, E-Brokers, and E-PIAs use this common row structure. Each, however, uses a slightly different naming convention. The convention used by the E-Metro Community is shown in FIG. 11*b*. Notice the CollectionOID 93 references a parent E-Metro Community by the ParentOID 99, if any. In this manner the preferred embodiment maintains the hierarchical structure for the E-Metro Communities. The only additional difference is that the first key field 95 is assigned to hold the name of the E-Metro Community. Since the database engine often will use the name of the E-Metro Community for searching, it is appropriate that the name be a dedicated key for all E-Metro Community objects.

The row structure for an E-Broker is shown in Fig 11*c*. Just as with the E-Metro Community, the first key field 95 is a name, in this case it is the name of a specific E-Broker. However, the CollectionOID 93 field contains the OID of the E-Metro Community that "owns" this E-Broker, thus associating a particular E-Broker with a specific E-Metro Community using a CommunityOID 101. This association method allows an efficient method to know which E-Brokers are allowed to operate in an E-Metro Community. Additionally, this same association method is carried through with the row structure for the E-PIA, which is shown in FIG. 11*d*. In the E-PIA, the CollectionOID field contains the Metro CommunityOID 101, thus associating a particular E-PIA with a specific E-Metro Community. As can be seen in FIG. 11*d*, all six keys are undefined in the E-PIA row structure, allowing the E-Metro Community administrator the flexibility to define each field to meet specific E-Metro Community needs.

Referring again to FIG. 10, the DORMS 57 also maintains a current directory of all E-Communities on the Internet. This directory is maintained by a special E-Broker in the E-Metro Community called the Directory Broker 77, with every E-Metro Community having a Directory Broker 77. The Directory Broker 77 tracks all E-Communities on the Internet and their address. Additionally, the Directory Broker 77 holds information on all other E-Brokers in all other Internet E-Communities. Information held includes the E-Broker's name, rules, and other information the E-Metro Community administrator desires to keep about other Internet E-Brokers. To keep the directory information current, an E-Metro Community's Directory Broker 77 will periodically inquire to see if its E-Metro Community has added, deleted, or changed any E-Brokers or E-Communities, and if so, the directory E-Broker 77 will launch an E-AutoPIA. This E-AutoPIA will be sent to all other E-Communities to interact with their Directory Broker, updating each E-Metro Community with the changes. The frequency of this update will vary, but most likely a schedule of once-per-day updating will be sufficient to support accurate E-Metro Community interaction.

Figure 12:
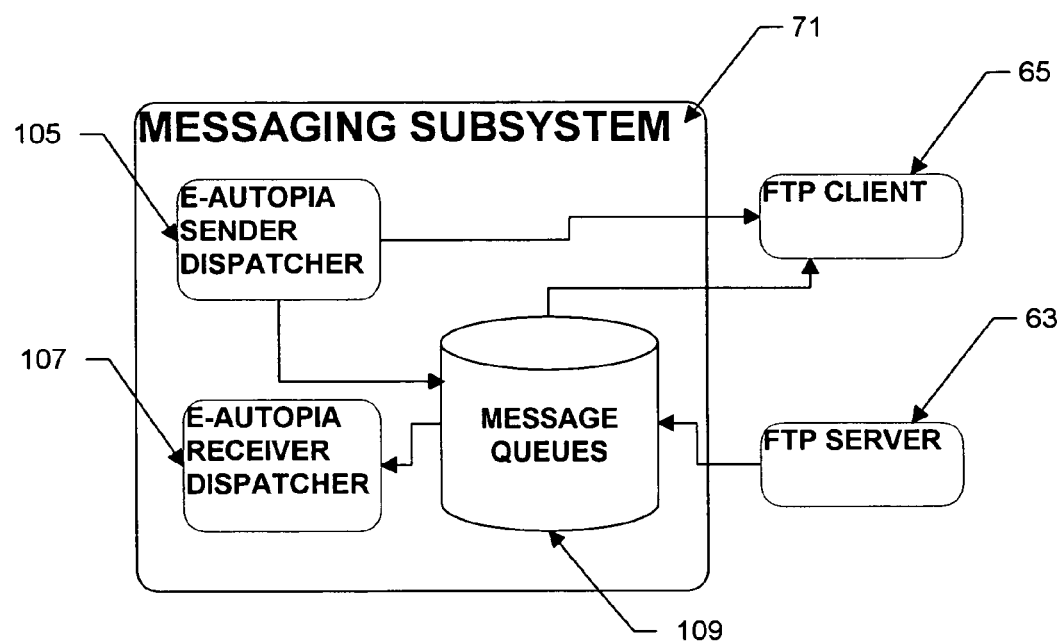
FIG. 12 details the messaging subsystem used in the DORMS subsystem, which is shown in FIG. 10.

The DORMS 57 also contains a Messaging system 71 that allows the E-Metro Community to send an E-AutoPIA to another E-Metro Community. As can be seen from this figure, the DORMS 57 communicates with other remote E-Communities through the FTP client 63 and the FTP server 65. Although the FTP processes are shown connected directly with the Messaging subsystem 71, all actual communication is controlled by the interaction processor. A more detailed diagram of the Messaging Subsystem is shown in FIG. 12. As discussed earlier, the Messaging subsystem 71 uses the FTP protocol to conveniently send and receive messages from or to the Web site-based E-Communities. This Messaging subsystem is employed exclusively for transporting E-AutoPIAs from one E-Metro Community to another. When an E-AutoPIA is sent to another remote E-Metro Community, the interaction processor 73 first retrieves the address of the remote E-Metro Community using the directory E-Broker 77. The interaction processor 73 then bundles the E-AutoPIA with the remote address and forwards the bundle to the sender dispatcher 105. The sender dispatcher 105 places the message in the message queue 109 and notifies the FTP client 65 that a message (an auto-being bundled with an E-Metro Community address) is ready to be sent. At a convenient time, the FTP client 65 sends the message (the auto being bundled with the address) to the FTP server of the receiver E-Metro Community and subsequently erases the outgoing message for the message queue 109. For an in-coming E-AutoPIA, FTP server 63 accepts the message and places the message in the message queue 109. The receiver dispatcher 107 monitors the message queue 109, and when a new message is seen, it unbundles the message, revealing an E-AutoPIA. The receiver dispatcher 107 then notifies the interaction processor 73 that a new E-AutoPIA has arrived, and the interaction processor 73 determines what next to do with the E-AutoPIA. The incoming message in the message queue 109 is not deleted until the E-AutoPIA in that message has completed its tasks within the E-Metro Community and has left the E-Metro Community. Saving the incoming messages assures that the E-AutoPIA's assigned tasks will be completed, even if the DORMS server should shut down in error and lose the E-AutoPIA currently active in the network server. When the network server is restarted, the E-AutoPIA can be restarted from the original message and its tasks completed. The message queue 109 itself is a standard FTP file system which may comprising an incoming message file and an outgoing message file. It will be clear to those skilled in the art that other transfer methods may be substituted for the FTP process described above.

The Virtual interpreter 81 is a software subsystem that provides the ability to execute the script language and rules language of the preferred embodiment. The Virtual Interpreter 81 plays a major part in the use of the rules processor 79 and the Itinerary processor, both which are discussed in a following section.

The DORMS 57 contains a Rules processor 79, which is an important subsystem for ensuring that information is securely distributed. A member or the E-Metro Community administrator uses rules to set the limitations and controls on the distribution of personal information. The rules are actually a series of strings, written in the programming language chosen for the preferred embodiment, that defines the requirements under which information will be released. It is possible to make the rules as simple or as complex as needed. The E-Metro Community administrator may provide minimum rules that will apply to all transactions, and allow the member to adjust rules for their particular needs. Although the preferred embodiment uses an application to set rules, those skilled in the art will recognize several alternative methods for a user or administrator to input rules.

As discussed earlier, requests for a member's personal information may come from either of two sources: another E-PIA member or an E-AutoPIA via Online Interaction mode or Batch Interaction Mode, respectively. If an E-AutoPIA enters an E-Metro Community and requests a member's information, the interaction processor 73 will start an E-Broker process to handle the request. The process to handle such a request is detailed in a later section after all subsystems have been describe, but generally, the E-Broker takes the rules that define the E-AutoPIA's request criteria and sends them through the virtual interpreter 81 and into the rules processor 79. The rules processor 79 converts the request into a standard database query request, such as a standard SQL SELECT command, and runs the query to select E-PIAs from the object repository 75. The E-Broker then accesses each selected E-PIA's rules, sends then through the virtual interpreter 81, to the rules processor 79, and the rules processor 79 compares the requirements set by the member E-PIA to the characteristics of the E-AutoPIA, and if the requirements are met, the E-Broker sends the requested information from the E-PIA to the E-AutoPIA.

If another member of the same E-Metro Community requests information on another member, the process is similar, although much simpler. In this case the interaction processor 73 again starts an E-Broker process, and the E-Broker sends each E-PIAs' rules through the virtual interpreter and finally to the rules processor 79. The rules processor compares the rules for each member and determines what, if any, information may be disseminated.

As previewed earlier, an E-AutoPIA is instantiated from a user's E-PIA and includes an itinerary. The itinerary is a set of instructions that direct the activity of the E-AutoPIA. Thus, the E-AutoPIA acts as an agent for the user. The itinerary, like the rules, can be a program written in Java, or other convenient language chosen for the preferred embodiment. As with the rules, those skilled in the art will recognize several alternative methods to creating an itinerary to direct an E-AutoPIA.

The Virtual Image 85 is used to improve the performance of the preferred embodiment by placing selected information in local RAM (Random Access Memory) for quick access. Since the system can access information in RAM much faster than it can retrieve information from a data base located on a hard drive, such as the Object Repository 75, the system runs more efficiently. Once an E-Metro Community, E-Broker or E-PIA is needed by the preferred embodiment, an E-Broker selects the needed entity from the object repository 75 and places a copy of the entity in the virtual image 85. From then on, the system uses the copy in the virtual image 85 rather than the original in the object repository 75.

As can be understood from a previous discussion, E-Brokers are processes that execute on the network server and are used within an E-Metro Community to assist in the orderly and efficient functioning of that E-Metro Community. Each E-Metro Community has at least one E-Broker, but may have more. Two special E-Brokers exist in the preferred embodiment, but there may be more. The first one is the mandatory directory E-Broker 77 and was discussed earlier. The second one must be present in E-Communities that require secure modification access to the E-PIAs and is called the Home E-Broker 87. The home E-Broker is responsible for assuring that only the owner of an E-PIA has edit access to his home E-PIA. The home E-Broker may be set to require very strict security access, such as having the member use a secure card, passwords, and challenge system, or may be set up with weak security, such as just having the member supply a proper member identification name.

Each E-Broker is a custom built executable that runs in the Web site. Each E-Broker executable 76 implements a specific set of E-PIA interaction choices provided by the E-Metro Community it resides in. When an E-PIA requests a specific interaction, the Interaction Processor 73 invokes the E-Metro Community's E-Broker and tells it to attempt the requested interaction. In order for the Interaction Processor 73 to communicate with each E-Broker executable with a unified communication protocol, E-Broker Adaptors 74 are employed. Thus, the Interaction Processor 73 actually communicates with an E-Broker Adaptor 74 specially built for the E-Broker executable which, in turn, communicates with the E-Broker executable 76. Thus, the E-Broker Adaptor 74 acts as a "bridge" for communication between the Interaction Processor 73 and an E-Broker executable. This adaptor mechanism is necessary since E-Brokers constructed from C, C++, Java, Visual Basic, PowerBuilder, or other development environment may require different means for invocation and information transfer.

As a means to assist the construction of all necessary activities that an E-Broker executable may need to perform, the E-Broker Service API DLL is provided as part of the DORMS server subsystem. E-Brokers must be capable of calling APIs in a DLL to employ these helpful services. Some services that have been identified are: 1) input a set of rules and output a list of E-PIAs in the current E-Metro Community that satisfy the rules; 2) interact with the Transaction Server to perform credit card processing; 3) bill a credit card; 4) validate a Security Card that is entered on-line. It should be clear to those skilled in the art that other APIs may be added as needed.

Referring to FIG. 9 again, so far the DORMS 57, FTP client 63, and FTP server 65 portions of the Web site E-Metro Community System 47 have been discussed, with the LivePayment Server 61, Netscape Enterprise Server 59, and Netscape API 67 yet to be detailed.

The LivePayment Server 61 is a commercially available application from Netscape that handles payment card transaction processing, event logging, and settlement. The LivePayment Server 61 will be customized to handle E-Metro payment card transactions. Anytime a transaction by an E-Broker involves the transfer of money or value, the E-Broker sends the information to the Interaction Processor 73, and the Interaction Processor 73 forwards the data to the customized LivePayment Server 61. Additionally, when the customized LivePayment Server 61 needs to send information to an E-Broker, as for credit card approval notification, the customized LivePayment Server 61 sends the data to the Interaction Processor 73, and the customized LivePayment Server 61 forwards the information to the proper E-Broker. Individual E-Brokers and E-PIAs can define their own billing policies, allowing a member or the E-Metro Community administrator to collect fees for the release of information. As an example, the E-Metro Community administrator could set a charge of $1.00 per name and telephone number released, but an individual could add a requirement that they receive $0.25, too. This raises the cost to $1.25 if an E-AutoPIA wants to utilize that user's name and phone number. Since the customized LivePayment Server 61 is aware of all financial transactions in the E-Metro Community, it can easily create accurate billing and financial summaries.

The Netscape Enterprise Server 59 is also a part of the Web site E-Metro Community system 47. This server is a standard commercial offering from Netscape, and when run on a network server allows that network server to be a Web site, communicate over the Internet, and efficiently interact with the Netscape Navigator. The Netscape Navigator, as discussed earlier, operates on a user's personal computer and is a client to the Netscape Enterprise Server 59.

The standard Netscape Enterprise Server 59, while providing the basic tools for allowing a network server to be a Web site and gain access to the Internet, must be enhanced to provide the services and tools necessary to support the E-Communities of the preferred embodiment. The Netscape Enterprise Server 59 can be modified using the Netscape API 67 (Application Programming Interface). The Netscape API 67 is a set of commands that can be accessed from any program to perform modified Enterprise Server 59 functions. In the preferred embodiment, the Netscape API 67 is used to modify the standard security measures and method for responding to requests, for example.

Now that all the systems and subsystems have been described, a specific example will be used to demonstrate system interaction. For this example, assume that a remote user has created an E-AutoPIA to enter the example E-Metro Community to retrieve information on selected members of the E-Metro Community. Refer to FIGS. 7, 8, 9, 10, and 12 for the following procedure sequence. For convenience, the steps are organized into preliminary steps that will only be done once to initialize the E-Metro Community, and request handling steps that are repeated each time an E-AutoPIA requests E-Metro Community information.

Preliminary steps:

1. An E-Metro Community administrator loads the preferred embodiment on a network server 11. This administrator employs an E-Metro Community administration tool to install the E-Metro Community. The administrator also creates several E-Brokers for handling tasks such as requests from E-AutoPIAs or transacting financial business. The E-Brokers may be constructed by modifying an existing E-Broker or by writing a new E-Broker process in any programming environment that can be "adapted" with the E-Broker Adaptor mechanism. The administrator additionally defines what services (interactions) to make available to members and creates the screens to present the information to the members. The latter is done with the standard Netscape Enterprise Server 59 or any other tool that can create Web site pages. The administrator either creates or modifies existing admission forms and places the forms in a forms-object repository 13. The forms repository 13 can be on the same network server 11 as the E-Metro Community, or may be placed on any available remote network server 11. Finally, the E-Metro Community administrator brings the E-Metro Community on-line and begins announcing the presence of a new E-Metro Community. The E-Metro Community is now ready for members.

2. Internet users or members of other E-Communities become aware of the new E-Metro Community and access the E-Metro Community's Web site address to get more information. Using the Netscape Navigator 49 Browser on their personal computer 45 they join an E-Metro Community. They can access admission forms and submit the requested information. At this point, the administrator may manually check the admission forms for completeness and minimum E-Metro Community requirements, or more likely, the administrator will have an E-Broker automatically check the form for the minimum requirements and set an in-person appointment with the user if the forms are acceptable. Depending on other requirements set by the E-Metro Community Administrator, the user may then be notified to come down to the E-Metro Community administrator's office or some other trusted authority and present sufficient identification and records to convince the administrator that the user is who they say they are. If E-Metro Community requirements dictate that security measures be maintained, then the user may be issued passwords, a secure-card, or other security mechanism. If all is in order, the user will become a member of the E-Metro Community. If the member has chosen the E-Metro Community to be his/her Home E-Metro Community, they must input a complete personal and professional profile, including compiling records held by others, such as medical and legal records. When the E-Metro Community is not the member's Home E-Metro Community, only a subset of information needs to be submitted and should be directly derived from the new member's Home E-PIA wherever it may reside. Several other users may also become members of this E-Metro Community.

3. At this point there is a going-concern E-Metro Community with active members. Members can take advantage of E-Metro Community services, communicate with other members, or create an E-AutoPIA that can go out and browse other E-Communities. The member may also define the rules for releasing personal and professional information, including the ability to charge for such release, or even require that the other side release similar information. There is such flexibility because the member creates the rules by writing a program in a language compatible with the E-Metro Community. Forms are available in the forms repository 13 to assist in the creation of rules, and the E-Metro Community administrator may even provide a default set of rules that simply need to be modified. Also, the E-Metro Community administrator is likely to create a set of minimum rules that will apply to all transactions to assure that an E-AutoPIA meets certain minimum standards and all transactions within the E-Metro Community are conducted in a proper manner. These minimum rules that apply to everyone can be called the E-Metro Community rules. Request Handling:

4. Suppose that at this point an E-AutoPIA arrives at the FTP server 65 from another E-Metro Community. The server places the message in the Message Queue 109 and subsequently the Receiver dispatcher 107 recognizes that a message was received. The receiver dispatcher 107 notifies the interaction processor 73 that an E-AutoPIA message is waiting in the message queue 109 and retrieves the message containing the E-AutoPIA, but does not erase the original copy from the message queue 109. The Interaction Processor will retrieve the message from the receiver dispatcher and unbundle the E-AutoPIA from the message. The interaction processor 73 then starts an E-Broker process to handle the interaction requested by the E-AutoPIA. Since the E-AutoPIA is encrypted, the E-AutoPIA must be decrypted using the public key of the source DORMS server and private key for the local DORMS server. If the E-AutoPIA was intended for this E-Metro Community, it will properly decipher. Each E-AutoPIA also contains a Certificate to assure that the owner of the E-AutoPIA actually initiated the sending of the E-AutoPIA, which was discussed in an earlier section.

While the E-AutoPIA is present in the E-Metro Community, the E-Broker places it in the virtual image 85 for easy access. The E-Broker then collects the rules from the E-AutoPIA, and using the virtual interpreter 81 and the rules processor 79 checks the rules against the E-Metro Community rules to see if this E-AutoPIA should be allowed to interact with members. If not, the E-Broker will send the E-AutoPIA to the sender dispatcher 105, and the sender dispatcher 105 will send the E-AutoPIA back to its Home E-Metro Community. However, if the E-AutoPIA satisfies the E-Metro Community rules, the E-AutoPIA will be allowed to interact with member E-PIAs. Additionally, the E-AutoPIA may be holding E-PIA data that is intended to be E Communicated or shared. If so, the transitive privilege rules of each E-PIA is checked in a similar manner, assuring that the E-PIA will only be shared if the transitive privilege rules taken from the original E-PIA are met.

5. If the transaction has progressed to this point, the E-AutoPIA has a high probability of originating from where it says it does, and the E-AutoPIA meets the general rules for further engagement. Now, the preferred embodiment begins to analyze each requested interaction. The E-AutoPIA sends its first request and a TrustedToken to the E-Broker, where the E-Broker verifies that the E-AutoPIA holds the TrustedToken for the specific requested interaction. If the TrustedToken passes this test, the request is retained and moves on to step six; if not, the request is discarded.

6. The E-Broker takes the request and again processes the rules for the E-AutoPIA with the rules processor 79, but this time to create a query into the object repository 75 to find E-PIAs that meet the criteria set by the E-AutoPIA. Once the rules processor 79 develops this search, a SQL query, the E-Broker process runs the query on the object repository 75 and places the selected E-PIAs in the virtual image 85.

7. The E-Broker now collects the rules from each E-PIA, sends the rules through the virtual interpreter 81 and to the rules processor 79. The rules processor 79 then compares the E-PIA's rules and characteristics, the E-AutoPIA's rules and characteristics, and the E-Metro Community's rules and reports to the E-Broker what, if any, information can be exchanged between the E-AutoPIA and the E-PIA. Once notified, the E-Broker then sequentially collects the necessary information, including any transitive privilege rules and billing information, from each E-PIA, and creates an informational-being. Each E-PIA contains the certificate from the original being, the selected personal information, and the transitive privilege rules. The informational beings are then passed to the collecting being. If any billing information is collected, or credit card authorization is needed, the E-Broker interacts with the LivePayment Server 61 to satisfy these needs. The above process is repeated for each selected E-PIA, or, if the E-AutoPIA has a rule that only allows a set number of interactions, until that number is met.

8. After collection of the information, the E-AutoPIA's tasks at this E-Metro Community are completed, so the E-Broker removes the selected E-PIAs from the virtual image 85. The E-Broker looks at the itinerary from the E-AutoPIA, and using the itinerary interpreter 83 and the virtual interpreter 81 determines the E-Metro Community where the E-AutoPIA should next be sent. The Interaction Processor contacts the directory E-Broker 77 to find the address associated with the next E-Metro Community, and the directory E-Broker 77 retrieves the address from the E-Metro Community directory in the object repository 75, and answers the address to the Interaction Processor. The Interaction Processor then bundles the E-AutoPIA and the address into a message. The Interaction Processor passes this message to the sender dispatcher 105, and the sender dispatcher 105 places the message in the message queue 109 and notifies the FTP client 65 that there is a message waiting to be sent. The FTP client 65 retrieves the message form the message queue 109 and sends the message. Since the E-AutoPIA has been sent out of the E-Metro Community, the sender dispatcher 105 now removes the original incoming message from the message queue 109. With the E-AutoPIA successfully handled, the Interaction Processor's current session ends.

Now that the interactions of all processes and objects in the preferred embodiment are understood, it is important to describe a specific and important example of an implementation of a type of E-Metro Community known as the "E-Bazaar." The focus of the example is the E-Broker implementation because it is an E-Broker that contains all of the machinery and maintains the behavior of an E-Metro Community. This E-Bazaar E-Broker maintains unique properties that are original to the extent that they are included in the claims of the invention.

E-Broker Example: The E-Bazaar

The E-Bazaar is a type of E-Metro Community that offers three useful commercial scenarios or case studies. While serving as an example E-Broker, the E-Bazaar E-Broker is also very complex. The three case studies are general privacy enabled commerce, semi real-time auction, and large quantity sales. In all three cases, the salient objects are E-PIAs acting as sellers, E-PIAs acting as buyers, and an E-Broker. Note that an E-PIA may also be an E-AutoPIA in this context. The E-Broker handles various public services and Interactions directly on behalf of the E-Bazaar, as well as mediate the Interactions between E-PIAs. An important purpose of the E-Broker is to validate that commercially interacting parties satisfy each others privilege rules for interacting. In the context of this document, the term trade shall be used to refer to a generic notion of either "buy" or "sell." Additionally, the term advertiser shall be used to refer to someone who publicizes a desire to trade. The term shopper shall be used to refer to someone who browses advertisements and who may eventually place an order to trade.

The privacy enabled commerce case provides a means for both buyers and sellers to:
advertise a desire to trade
actively place an order for a trade
fulfill an order for a trade.

When the trading interaction occurs, it is guaranteed to be performed securely and in privacy between buyer and seller according to all the privilege rules configured by both parties. The actual trade activity is what is privacy enabled.

The semi real-time auction case is the same as the privacy enabled commerce case except that a seller or buyer has decided to advertise an electronic auction. In this case, the goods or services are typically advertised along with the current bid so other potential bidders know what to beat. However, auctions may be performed with secret bid.

The large quantity of sales case is also the same as the privacy enabled commerce case except that a seller or buyer has decided that it won't trade unless it can trade a certain quantity of goods or services. Therefore, a placed order may not be fulfilled immediately.

It will be shown that the E-Bazaar is able to perform each of these three case studies with the identical framework in the invention, the subject of a later discussion. It will be shown that the primary distinguishing feature between each scenario is the manner in which an order for buying or selling is fulfilled.

E Bazaar Activity Model

Figure 34:
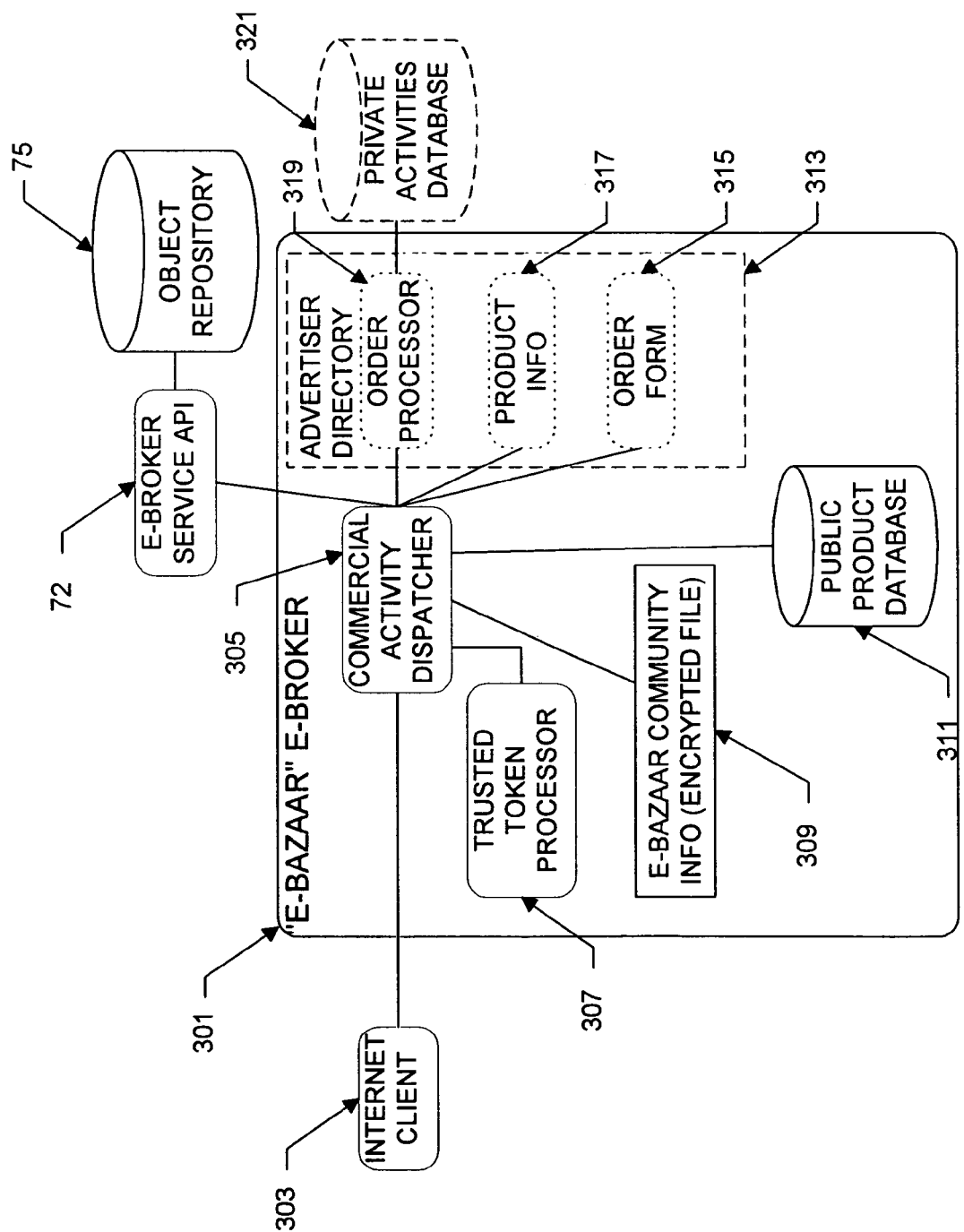
FIG. 34 details the E-Bazaar E-Broker subsystem.

An overview of E-Bazaar activities is best described by presenting the activities lifecycle of an E-Bazaar when employed in E-PIA Online Interaction mode. An enumeration of the Online mode activities in the lifecycle are listed below. Refer to FIG. 34.

1. An Internet Client 303 (as E-PIA) interested in buying or selling a product interacts with the E-Bazaar E-Broker 301 by submitting all of the information about the product so that the E-Bazaar can make the information public to other buyers and sellers.

2. An Internet Client 303 (as E-PIA) browses the product and service offerings at the E-Bazaar.

3. ProductInfo 317 for a specific E-PIA advertiser's product can be obtained upon request.

4. An Internet Client 303 (as E-PIA) obtains the OrderForm 315 for a product it is interested in from the E-PIA advertising the product.

5. An Internet Client 303 (as E-PIA) fills out the OrderForm 315 and submits the filled out form to the E-PIA advertising the product.

6. The filled out form is processed by a process designated by the advertising E-PIA known as the OrderProcessor 319. The process may or may not complete the order immediately. The client E-PIA is either immediately notified of a fulfilled order or notified of an order which is in progress. Such an order is said to be fulfilled asynchronously at some later point in time.

7. For asynchronous order fulfillment, the client E-PIA is notified of a fulfilled order or otherwise when the client E-PIA requests order status later, or receives e-mail regarding status.

For E-AutoPIA Batch Interaction mode, the activities are identical except that the sequence of Interaction activities would be performed according to the E-AutoPIA's Itinerary. For an E-AutoPIA advertiser, the E-AutoPIA would submit product information to the E-Bazaar E-Broker as part of its Itinerary and typically proceed to another E-Metro Community. However, for an E-AutoPIA shopper, the Interaction sequence in the E-Bazaar would typically be quite different. Since E-AutoPIAs tend to automate Interactions, it would be most likely that it already has a copy of order forms it needs. It just needs to submit filled in order forms. Thus, the E-AutoPIA would avoid browsing and a request for an order form and simply place orders. For asynchronous fulfillment orders, the E-AutoPIA can check on status in its Itinerary later, or the person representing the E-AutoPIA can wait for Internet e-mail.

E-Bazaar E-Broker Administration Tool

The E-Bazaar Administration Tool primarily provides the following "birth" features:

1. The E-Bazaar Administration Tool is used to deploy an empty E-Metro Community representing the E-Bazaar in a WebServer containing the preferred embodiment.

2. The E-Bazaar Administration Tool is used to configure the empty E-Bazaar.

The E-Bazaar Administration Tool assists an Administrator in getting an E-Bazaar ready for commerce. The primary task is to decide on which attributes are the most important for all goods and services that will be traded in the E-Bazaar. Such attributes are known as the E-Bazaar's public attributes. For example, some attributes such as brand (advertiser E-PIA name) and price are always of interest. The E-Bazaar Administration Tool will suggest always including these attributes. Other attributes may only be interesting to a particular kind of E-Bazaar. For example, an E-Bazaar that deals exclusively with wine bottles would typically include year as a public attribute. However, if the E-Bazaar deals with many different products where year is not appropriate for all of the products, then a wine product in the same E-Bazaar would have to employ a private attribute assigned only to the wine product. Note that all attributes may be associated with any rule expression governing type restrictions or other general restrictions such as value ranges.

The E-Bazaar may also assist in configuring the product list before commerce commences. Products are organized by category and type. A category represents a group of products that have similarities. For example, in a "Milk" category one might find product types such as quarter gallons of milk, half gallons of milk, gallons of milk, as well as possibly cream or even cheeses. In this example, the milk, cream, and cheeses are product types within the product category. Finally, each product has its own productId, a number assigned by the E-Bazaar Administration Tool. An InteractProtocol exists on the E-Bazaar E-Broker so that products may be added at runtime.

E-Bazaar E-Broker Subsystem Architecture

As mentioned earlier, an E-Broker 301 executable may be any subsystem which can execute in the preferred embodiment. In the E-Bazaar E-Broker case, the executable is very complex consisting of databases, files, and dynamically changing subsystems depending on the E-PIA being interacted with. In the actual implementation, the subsystems may be an EXE which invokes several DLLs, a Java Application, or any other alternative which maintains the suggested subsystem architecture presented below.

FIG. 34 primarily depicts the subsystem architecture of the E-Bazaar executable. It also shows a simplified view of the Internet Client/E-Bazaar executable interaction. The Internet Client actually communicates with the DORMS Server via HTTP which, in turn, invokes a series of Rules processing and interpretation, as well as security verification. After such processing, the E-Broker executable is finally invoked.

As shown in FIG. 34, the architecture of the E-Bazaar executable is such that there is an E-Bazaar Community Info Encrypted File 309, a Commercial Activity Dispatcher 305, a TrustedToken Processor 307, a "Public Product Database" 311, and other "Runnables" (contained in the Advertiser Directory 313) for each Advertiser where each Advertiser has its own OrderProcessors 319, ProductInfos 317, and OrderForms 315 which it maintains to trade its products. Finally, each Advertiser will need to maintain its own "Private Activities Database" 321.

The E-Bazaar Community Info file 309 contains information to manage various aspects of the E-Bazaar. During actual development, this file may be found to be a convenient place to store additional information.

The Commercial Activity Dispatcher 305 is the main subsystem of the E-Bazaar. It handles all incoming Interaction requests, which involves processing and controlling the flow of information from and to all subsystems, files, and databases as necessary. More specifically, it processes many of the requested Interactions with the E-Bazaar E-Broker 301 proper, and it is also responsible for invoking the necessary E-Broker Service APIs 72 for specific E-PIA Interaction determination.

The TrustedToken Processor 307 remembers public keys of E-PIA visitors, issues TrustedTokens, and validates TrustedTokens presented by those E-PIAs attempting to do business.

The Public Product Database 311 primarily consists of one Table with one Record per product which has been submitted to be publicized. The columns of the table correspond to the public attributes that have been configured by the E-Bazaar Administration Tool for all products in the E-Bazaar. Meanwhile, there is a BLOb column in the table containing a Dictionary of each product's private attributes. The Table of Products is meant to be browsed and queried.

The three special Runnables are stored in a root file directory called the Advertiser Directory. The Advertiser Directory 313 then has one subdirectory for each Advertiser. When one of the three is needed, the Advertiser is known so that the Commercial Activity Dispatcher 305 knows which subdirectory to obtain the needed Runnable. The E-Broker 301 itself has its own subdirectory as well.

The Private Activities Database 321 provides the means for an Advertiser to store pending orders if it needs to, store its inventories, or whatever other information it needs to maintain in order to carry out commerce in the E-Bazaar. It should be possible to maintain such private activity databases wherever the Advertiser desires. This just means that the OrderProcessor 319 will need to access information external to the WebServer where the E-Bazaar is running. Such external information should be able to reside in an external Database Server or even a mainframe. In either case, it should be possible for the external database to reside locally or remotely as needed.

The E-Bazaar should be provided with a variety of simple OrderProcessors 319, as well as ProductInfo 317 and OrderForm 315 templates so that an Advertiser may quickly and easily become an advertising participant in an E-Bazaar. With the simple OrderProcessors, a simple database may also be configured to reside in the WebServer or even tables within the same database as the Public Product Database 311 (as long as the database provides per table security).

E-Bazaar E-Broker InteractProtocols

When the E-PIA Internet Client communicates with the DORMS Server via HTTP, the requests get converted into Interaction requests submitted to an E-Metro Community E-Broker. In this section, the available Interactions that can be requested are presented in detail. This complete list and description of E-Bazaar Interactions intends to provide a full understanding of all the possible and important activities that can take place in a fully functioning E-Bazaar E-Metro Community.

As is obvious from the discussion thus far, the E-Bazaar E-Broker is the heart of a running E-Bazaar E-Metro Community. The InteractProtocol names that the E-Bazaar E-Broker provides are listed in the table below. These InteractProtocols are available at runtime. The "Seller" column denotes who the Seller E-PIA interacts with when it initiates the Interaction while the "Buyer" column denotes who the Buyer E-PIA interacts with.

| InteractProtocol | Overview Description | Seller | Buyer |
|---|---|---|---|
| getSummary ( ) | Get runnable body of code that | w/E-Broker | w/E-Broker |

-continued

| InteractProtocol | Overview Description | Seller | Buyer |
|---|---|---|---|
| | summarizes E-Bazaar. | | |
| | Get runnable body of code that summarizes advertiser's product offerings. | w/Buyer | w/Seller |
| getPublicProduct-AttributeTemplate ( ) | Get Dictionary of public attribute names associated with their rules. | w/E-Broker | w/E-Broker |
| putProductToTrade-Info ( ) | Put a new product in the E-Bazaar to advertise publicly. | w/E-Broker | w/E-Broker |
| getProductToTrade-Info ( ) | Get all of the information about an existing product in the E-Bazaar. | w/E-Broker | w/E-Broker |
| getProducts ( ) | Query the E-Bazaar's list of E-PIA advertisers for products matching the query conditions. | w/Buyer | w/Seller |
| getPrivateProduct-Attributes ( ) | Given a productId, get Dictionary of private attribute names associated with their values. | w/Buyer | w/Seller |
| getProductTrade-Form ( ) | Given a productId, get a runnable body of code representing an order form that can be filled in. | w/Buyer | w/Seller |
| putProductTrade-Order ( ) | Given a filled in order form to submit to the advertising E-PIA, obtain either an indicator of order acceptance or an OrderNumber for a "to be fulfilled" order. | w/Buyer | w/Seller |
| cancelProductTrade-Order ( ) | Given an OrderNumber of a "to be fulfilled" order, cancel the order so that it will not be fulfilled. | w/Buyer | w/Seller |
| getProductTrade-OrderStatus ( ) | Given an OrderNumber, obtain current status information about the order. | w/Buyer | w/Seller |
| getOrderHistory ( ) | Get a list of OrderRecords of all orders submitted to the E-PIA satisfying a Query given | w/E-Broker | w/E-Broker |

The next table describes the precise subsystem activities that must be performed by each InteractProtocol implementation. This will assist the reader in understanding the relationship of the subsystems for various Interaction requests.

| InteractProtocol | Design |
|---|---|
| getSummary ( ) | Obtain "ProductInfo" Runnable from the E-Broker subdirectory to present Summary of E-Bazaar to Internet Client. The getSummary ( ) request is submitted along with Rules that specify a single E-PIA Advertiser. When the Advertiser is determined, its subdirectory is searched for the "ProductInfo" Runnable to present the summary to the Internet Client. |
| getPublicProduct-AttributeTemplate ( ) | The E-Bazaar E-Metro Community Info File is read to obtain the public attribute information. |
| putProductToTrade-Info ( ) | A new Record in the Public Product Database Table is INSERTED or UPDATED. The Runnables associated with the Record are stored in the corresponding Advertiser Directory. If the product is new and has a new Advertiser, a new subdirectory must be created. In this case, the Advertiser's name and its subdirectory name association must be stored in the E-Bazaar E-Metro Community Info File. |
| getProductToTrade-Info ( ) | The Record of the product specified is read -- its public attributes and private attributes BLOb is read, and its Runnables are retrieved from its Advertiser's subdirectory. The public attributes and Runnables are assembled into a single Dictionary. The Dictionaries may be presented to the Internet Client and the Runnables executed on an as needed basis. |
| getProducts ( ) | A submitted Query is performed on the Public Product Database Table. The same two Dictionaries described above are returned FOR EACH product satisfying the Query. |
| getPrivateProduct-Attributes ( ) | For the specified product, return the BLObbed private attribute Dictionary. |
| getProductTradeForm ( ) | Return the OrderForm Runnable so that it can be presented to the Internet Client. |
| putProductTradeOrder ( ) | Submit a Dictionary of the OrderForm fields with their associated "filled in" values to the OrderProcessor Runnable so that the Order can be processed by the Advertiser's private order processing subsystem in any way he chooses. A Boolean and String regarding immediate order status are returned. The Boolean indicates whether or not the order was immediately fulfilled. The Boolean value and String contents may be presented to the Internet Client. |
| cancelProductTrade-Order ( ) | The Commercial Activity Dispatcher must determine which Advertiser E-PIA to submit the cancellation to by Rules submitted with the request. When the Advertiser is determined, the OrderNumber is submitted to the Advertiser's private OrderProcessor. A String concerning cancellation status is returned which can be presented to the Internet Client. |
| getProductTradeOrder-Status ( ) | The Commercial Activity Dispatcher must determine which Advertiser E-PIA to submit the status request to by Rules submitted with the request. When the Advertiser is determined, the OrderNumber is submitted to the Advertiser's private OrderProcessor. A String concerning cancellation status is |

-continued

| InteractProtocol | Design |
|---|---|
| | returned which can be presented to the Internet Client. |
| getOrderHistory ( ) | The Commercial Activity Dispatcher knows that the requester is the Advertiser in question. The Query is submitted to the Advertiser's private OrderProcessor so that the OrderRecords containing Orders which satisfy the Query may be returned. These may then be presented to the Internet Client. |

The InteractProtocol interfaces will now be described. Before describing the interfaces in detail, it is important to present the fundamental object framework employed by the InteractProtocols. These objects are presented below. After the fundamental object descriptions, the InteractProtocols are discussed in detail denoting which parameters are input, which are output, and their types based on the types described in the fundamental object framework. This should provide the reader a maximum amount of detail with regard to the flow of data into and out of the E-Bazaar, how data is employed to interact with advertisers and shoppers in the E-Bazaar, as well as when specific objects or data is presented to an Internet Client.

Runnable—A Dictionary of names associated with executable bodies of code which can themselves be instances of Runnable. The Dictionary comprises all of the executable "pieces" necessary to run a particular subsystem. Some useful subclasses are ExeApp, Dll, JavaAppelet, and Html. The Commercial Activity Dispatch knows how to download all of the executable bodies contained in a Runnable down to the Internet Client so it can execute them appropriately. A Runnable with a single Html Document is the simplest case.

ProductInfo—A Runnable whose purpose it is to present product information to a shopper.

Query—A String representing a SQL SELECT.

PublicAttributes—A Dictionary of names associated with values representing the values of the public attributes of a product. An example is shown below.

| Name | Rule | example |
|---|---|---|
| activity | this.isKindOf(String) && (this == "buy" \|\| this == "sell") | "sell" |
| advertiser | this.isKindOf (String) | "Dad's" |
| productCategoryName | this.isKindOf (String) | "sodas" |
| productTypeName | this.isKindOf (String) | "root beer" |
| productInstanceName | this.isKindOf (String) | "Dad's Root Beer" |
| productId | this.isKindOf (String) | "D-RB10014" |
| pricePerUnit | this.isKindOf (Money) && this > 0 | .79 |
| unitSize | this.isKindOf (Integer) && this > 0 | 48 |
| productInfo | this.isKindOf (Runnable) | Html Document |
| orderForm | this.isKindOf (Runnable) | Html Document |
| orderProcessor | this.isKindOf (Runnable) | Java Application |

PrivateAttributes—A Dictionary of names associated with values representing the values of the private attributes of a product.

OrderForm—A Runnable that presents an order form for a person to fill fields with values.

FilledOrderForm—a Dictionary of OrderForm fields names associated with values of the fields that are filled in.

OrderProcessor—A Runnable that processes OrderForms. Typically this Runnable must perform processing on a private database.

ProductId—a String that uniquely identifies a product.

OrderNumber—a String that uniquely identifies an order that has been placed.

OrderRecord—a structure is with the format shown below. Note that it may be desirable to allow the structure of OrderRecords to be authorable on a per advertiser E-PIA basis.

| Name | type |
|---|---|
| productId | String |
| numberOfUnits | Integer |
| when | Time |
| price | Money |
| fulFilled | Boolean |
| comment | String |

The InteractProtocol interface descriptions below explain how to use the InteractProtocols and what data is expected to be input and output.

getsummary(out Runnable aSummary)—Obtain aSummary which can be executed to present a Summary of the E-Bazaar or the Summary of the Advertiser, depending on rules chosen.

getPublicProductAttributeTemplate (out Dictionary aListOfPublicAttributeRules)—Obtain aListOfPublicAttributeRules, a Dictionary of attribute names associated with their rules.

putProductToTradeInfo(in String aProductId, in Dictionary aListOfPublicAttributes, in Dictionary aListOfPrivateAttributes)—Enter a new product into the Public Product Database or modify an existing one. If attempting to enter a new product, then aProductId must be 0, otherwise it is its existing productId. aListOfPublicAttributes and aListOfPrivateAttributes comprise all of the attributes of the product to be newly entered or modified.

getProductToTradeInfo (in String aProductId, out Dictionary aListOfPublicAttributes, out Dictionary aListOfPrivateAttributes, out String aGeneralStatus)—Obtain all of the information about an existing product in the Public Product Database aProductId is a String representing the productId of the existing product. aListOfPublicAttributes and aListOfPrivateAttributes comprise all of the attributes of the product. aGeneralStatus is a String with some human readable status information.

getproducts(in String aQuery, out OrderedCollection aListOfProductIds, out OrderedCollection aListOfListOfPublicAttributes, out OrderedCollection aListOfListOfPrivateAttributes)-Obtain all of the information about more than one existing product. The products to obtain information on are the ones satisfying the Query aQuery. Three OrderedCollections are returned in the out parameters: aListOfProductIds, aListOfListOfPublicAttributes, and aListOfListOfPrivateAttributes.

getPrivateProductAttributes (in String aProductId, out Dictionary aListOfPrivateAttributes)—Obtain all of the private attribute values of the product with productId aProductId. The private attributes are returned in the Dictionary aListOfPrivateAttributes.

getProductTradeForm(in String aProductId, out Runnable anOrderForm)—Obtain a Runnable anOrderForm representing the OrderForm of the product with productId aProductId.

putProductTradeOrder (in Dictionary aFilledOrderForm, out String anOrderNumber, out Boolean fulfilled, out String aStatus)—Place an order with the Dictionary aFilledOrderForm. A String anOrderNumber is returned representing a unique order number for the order placed. The Boolean fulfilled is returned indicating whether or not the order was fulfilled immediately (TRUE) or if it will be fulfilled later (FALSE). Also returned is a general status string indicating any other fulfillment information.

cancelProductTradeOrder(in String anOrderNumber, out String aStatus)—The order anOrderNumber which has currently not been fulfilled is canceled so that it will never be fulfilled. aStatus is returned indicating any other cancel information.

getProductTradeOrderStatus (in String anOrderNumber, out Boolean fulfilled, out String aStatus)—The order anOrderNumber is submitted to obtain current status information about the order. If fulfilled is TRUE, then the order has been fulfilled already, else it has not been fulfilled yet. aStatus is a String containing further status information.

getorderHistory(in Query aQuery, out OrderedCollection aListOfOrderRecords)—Obtain all of the OrderRecords for Orders for products from an E-PIA which satisfy the SELECT in aQuery. The OrderRecords are returned in the OrderedCollection aListOfOrderRecords. A useful example using the Query is to employ the expression "fulfilled==TRUE" to obtain only those OrderRecords which correspond to actual trades performed.

Commercial Scenarios Using the E-Bazaar Framework

As presented, any E-PIA can participate as an advertiser in an E-Bazaar by providing its own implementations of OrderProcessor, ProductInfo, and OrderForm Runnables. This framework allows an advertising E-PIA to maintain a very general capability for performing its necessary commerce. Additionally, the framework provides the means for efficient trading scenarios not possible without an electronic commerce system and which is not possible without special attention to privacy, security, and privilege which the invention provides so well. Additionally, E-PIAs and E-AutoPIAs may also participate as shoppers using this unified framework and receive the same benefits of efficiency, privacy, security, and privilege. Efficiency in this context applies to the effort in connecting with trading partners as well as the efficiency in the cost to do business.

As mentioned at the start of the E-Bazaar discussions, the primary distinction between the three case studies is their implementation of the OrderProcessor. This single distinction was intentional so that a single E-Bazaar Framework could successfully implement all three cases. The three cases that the E-Bazaar can handle are now discussed below.

The "Privacy Enabled Commerce" scenario allows for any desired commerce to take place securely and privately. The model for ordering and fulfilling orders is meant to be general. Thus, there is really nothing to expound on since the framework itself is able to accomplish this case due to its intended generality. The Semi Real-time Auction and Large Quantity Sales cases are, therefore, members of the "Privacy Enabled Commerce" case due to this generality. Note that Internet E mail may be a useful tool for notifying shoppers of asynchronously fulfilled orders.

The "Semi Real-time Auction" case requires certain processing and functionality in the ProductInfo as well as the OrderProcessor Runnables. The ProductInfo Runnable should not only advertise product information as is done normally, but should also display the current bid and any other real-time parameters of the auction that are deemed necessary to present to a shopper.

The processing of Orders is interesting because most will be canceled eventually. However, totally adhoc order fulfillment is possible if the OrderProcessor is coded to allow it. For example, it could allow the auctioneer to examine the Order history. The auctioneer could decide at any time to extend the time of the auction, cut it short, fulfill the non-highest bid (order), fulfill multiple bids (order), or cancel all bids (orders). The behavior of the auction is governed by the OrderProcessor.

Internet E mail will be very useful in Semi Real-time Auctions. For example, orders may be placed with a request to be notified of important bid updates in the future may be requested. However, it should be possible to build a Semi Real-time auction system which allows Online E-PIA clients to realize periodic updates from the E-Bazaar periodically.

The "Large Quantity of Sales" case mostly requires certain processing in the OrderProcessor Runnable. All orders for a product will typically maintain a "pending" unfulfilled status. At some point in time, however, the aggregate order quantity for a certain product exceeds its predetermined threshold for invoking order fulfillment. However, a real OrderProcessor for the Large Quantity Sales case must allow premature fulfillment in the scenario where it is taking too long for a certain quantity of orders to come in. Premature cancellation of all or some orders should also be possible.

It may also be desirable to allow real-time price adjustments. In this case, an Advertiser may find it desirable to maintain a hybrid of an auction along with a large quantity of sales scenario. The Advertiser who finds that he can trade product for less because there are enough Orders and still make sufficient profit, should be able to go ahead and invoke order fulfillment rather than wait and possibly be left with a large unwanted expensive inventory.

Some Advertisers may desire to display real-time information in the ProductInfo Runnable such as the current quantity ordered and the total quantity desired.

E mail can be used for notification of sudden changes in order status, just as in the other commercial scenarios.

Specific Objects

Since the preferred embodiment is designed to be implemented with an object-oriented programming language, we now turn to the design of the individual objects.

Figure 22:
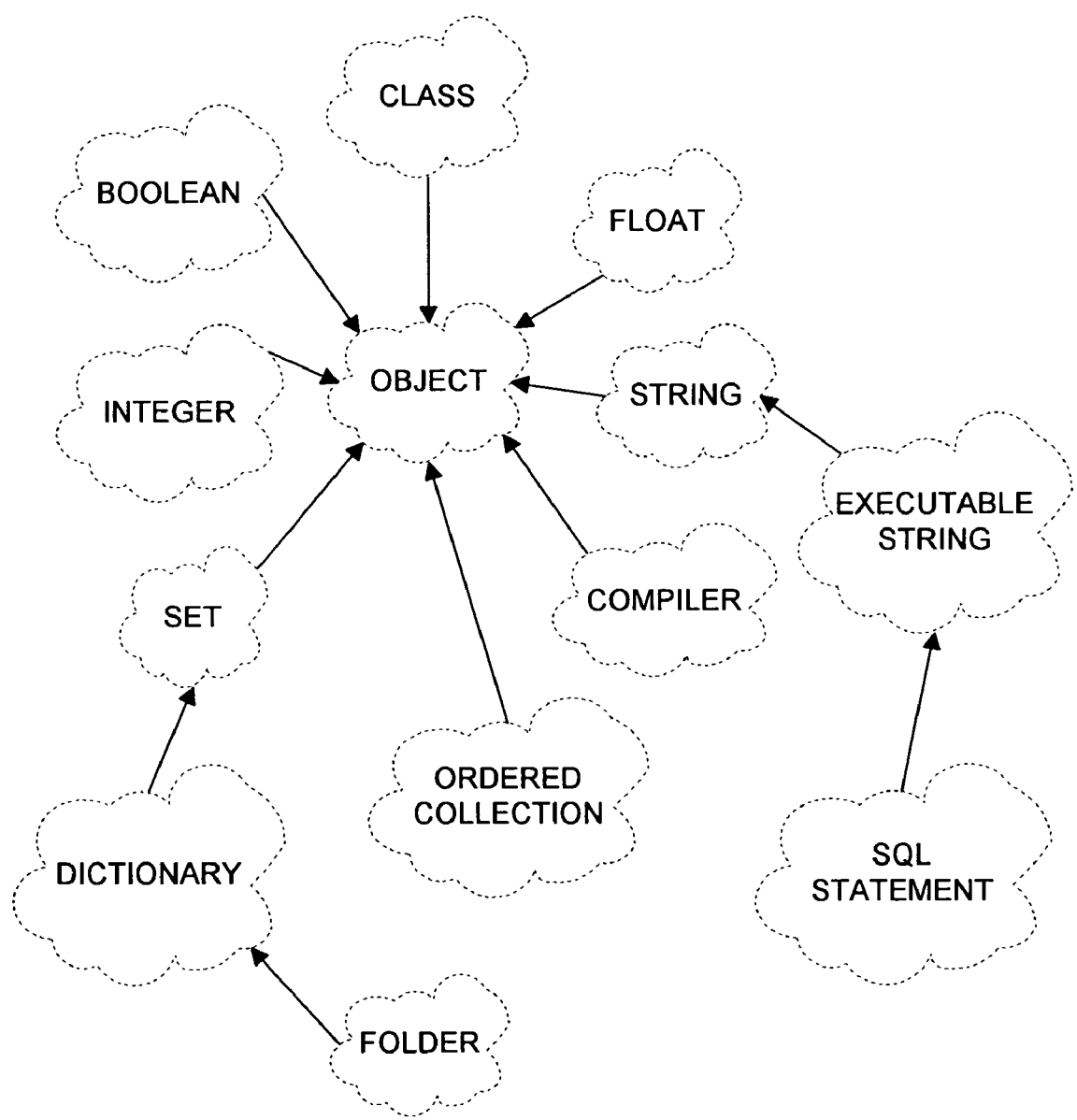
FIG. 22 describes the relationship of the various classes of objects used within the preferred embodiment.

Before continuing with each of the objects in the preferred embodiment, the fundamental object classes that make up the preferred embodiment objects that will be presented are listed below. Most of these object classes are commonplace in fundamental object oriented frameworks and should be familiar to those skilled in the art of object orientation. See FIG. 22.

| Type | Description |
| --- | --- |
| Object | abstract Class for which is the superclass of all Classes such as the ones listed below. |
| Class | a Class whose instances represent each of the Classes defined in the system. |
| Integer | Number |
| String | Characters |

-continued

| Type | Description |
|---|---|
| Float | Number |
| boolean | Expression |
| Collection | an abstract Class which is the superclass of all Classes that represent collections of Objects |
| Ordered Collection | a Collection subclass that represents a list of Objects that are ordered in a set sequence. |
| Set | a Collection subclass that represents a list of Objects in no particular order |
| Dictionary | A list of keyed objects. |
| Folder | Can store objects using hierarchically arranged keys. |
| SQL Statement | Provide fast lookup for information. |
| Executable String | A piece of code that can be passed around as an object, interpreted when it needs to be, and executed. |
| Compiler | a Class whose instances each represent an executable body of code that translates a String into an OrderedCollection of Codes that are interpretable by a runtime interpreter. |
| Extended Classes | Other classes will need to be defined for individual E-Metro Community needs, such as for video, sound, etc. |

Figure 15:
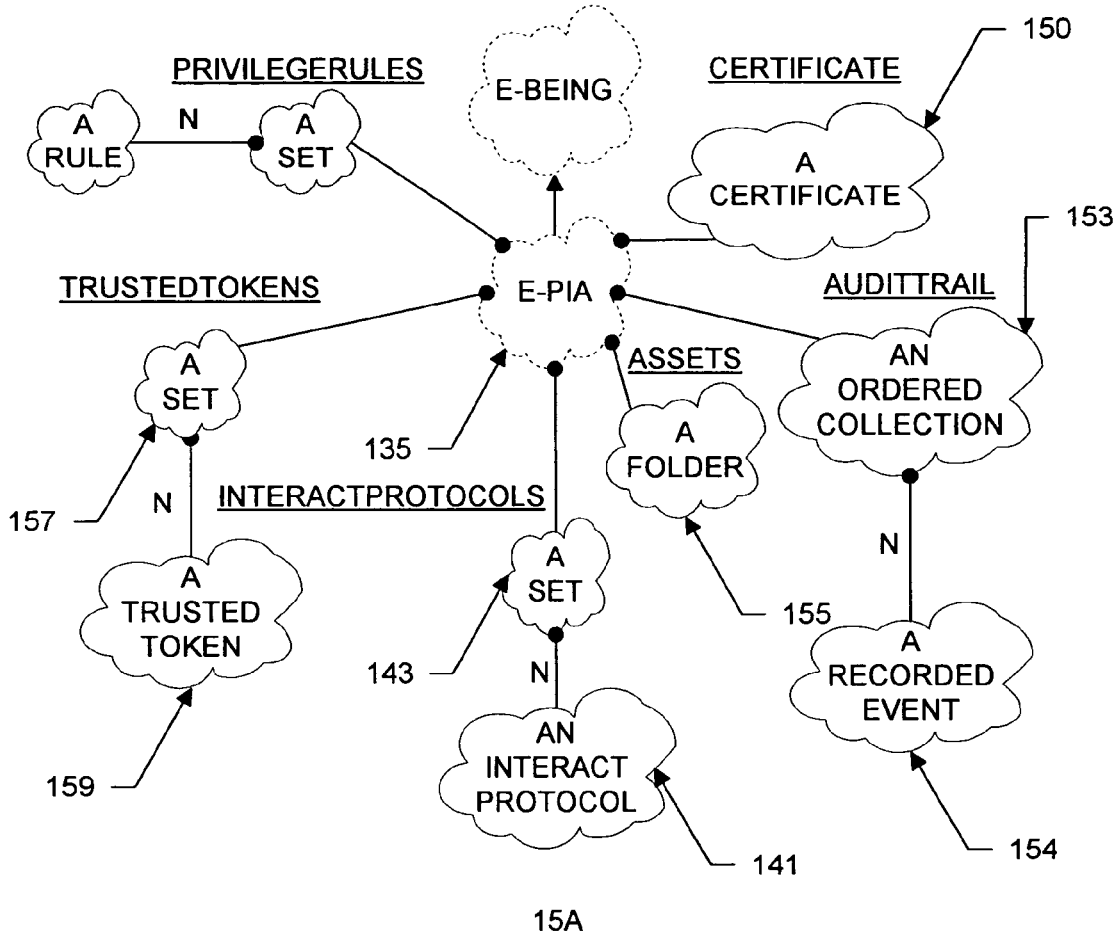
FIG. 15a is a Booch diagram of the E-PIA object.
FIG. 15b is a Booch diagram of the informational E-PIA object.
Figure 15:
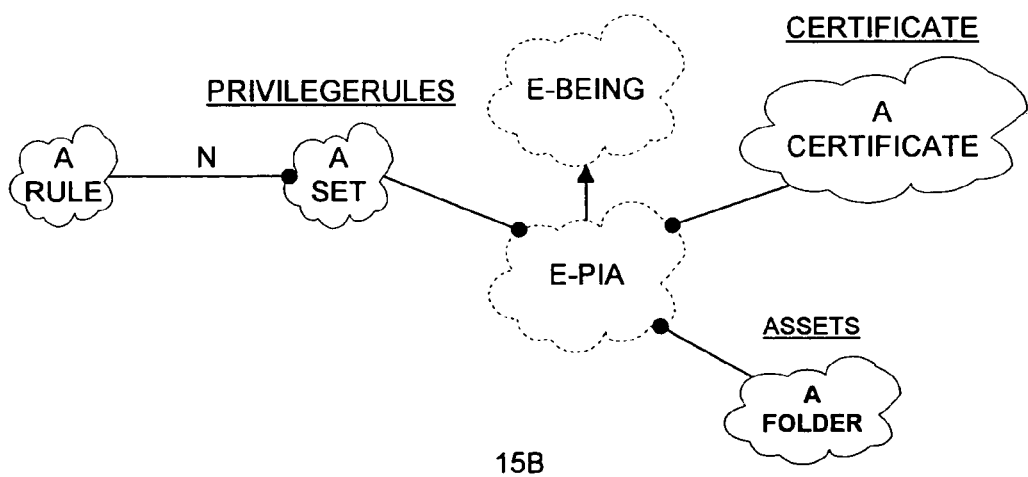

The E-PIA object 135, shown in FIG. 15A. The E-PIA encapsulates the personal data and data processing rules or behavior of a real individual or an entity by storing information assets and releasing them under the rules established by the owner of the E-PIA. FIG. 15B shows an E-PIA that is created to pass informational assets. The asset folder will contain the approved subset of informational assets, and the rules will contain the transitive rules (from the interact protocol) of the original E-PIA, thus providing a limit on the subsequent dissemination of the informational assets in the folder. The certificate helps assure subsequent users of the information that the informational assets originated from the original E-PIA.

| Items in the E-PIA Object | No. | Type | Description |
|---|---|---|---|
| auditTrail | 153 | Ordered Collection | An OrderedCollection of RecordEvents 154 that chronicle the history of an E-PIA. |
| assets | 155 | Folder | All the informational assets known about the E-PIA are stored in an unstructured folder. Information may be input into the folder using the forms retrieved from the forms repository. |
| interactProtocols | 143 | Set | An E-PIA may contain several interact protocols stored in a set. |
| trustedTokens | 157 | Set | The E-PIA will collect trusted-tokens to give to E-Brokers to assure the integrity of any transactions. |
| privilegeRules |  | Set | The E-PIA has a set of rules that must always be met for any interact protocol to be performed. |
| certificate | 150 | Certificate | The certificate contains the name and public key of the entity the E-PIA represents. |

Figure 19:
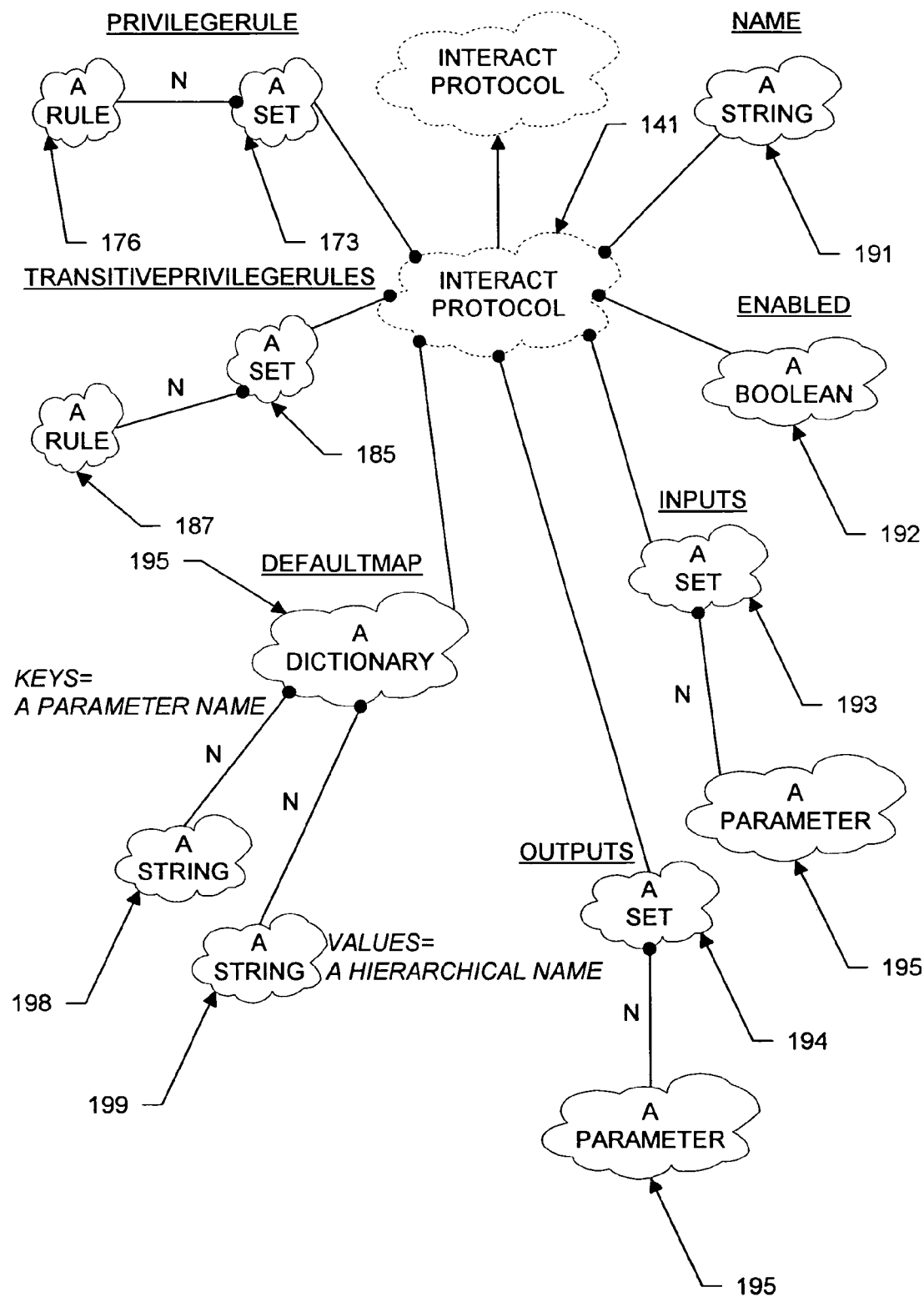
FIG. 19 is a Booch diagram of the Interact Protocol object.

The InteractProtocol Object 141 is depicted in FIG. 19. The InteractProtocol defines the name, input parameters, output parameters, and the conditions that must be met in order for the interaction to occurs. An E-Broker actually implements the interaction. InteractInstructions cause InteractProtocol invocations. InteractInstructions are detailed in a later section.

| Items in the Interact Protocol Object | No. | Type | Description |
|---|---|---|---|
|  | 141 | Interact Protocol | Inherits |
| name | 191 | String | Each protocol must have a name. |
| PrivilegeRules | 185 | Set | Already described in a previous table. |
| MaxInstructions | 193 | Integer | See corresponding description in the interact instruction above |
| transitivePrivilegeRules | 185 | Set | See corresponding description in the interact instruction above |
| defaultMap | 197 | Dictionary | Since the interact instruction must be "filled in" before execution, the default map can provide defaults to assist in completing the interact instruction. |
| Inputs | 197 | Set |  |
| outputs | 198 | Set | What informational assets will be stored in the information E-PIA if the subsequent interact instruction is successfully executed. |
| Enabled | 192 | boolean |  |

Figure 20:
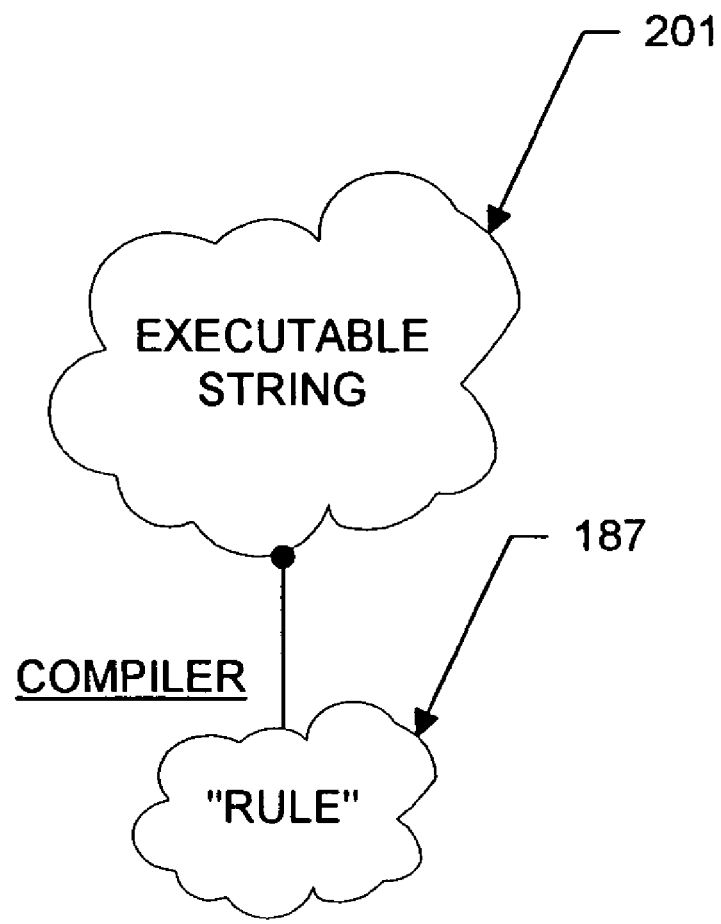
FIG. 20 is a Booch diagram of the rule object.

The Rule object 201 is shown in FIG. 20.

| Items in the Rule Object | No. | Type | Description |
|---|---|---|---|
| a Rule object is actually just an ExecutableString object | 201 | Executable String | an Executablestring representing a user defined Rule |
| compiler | 187 | String | name of compiler which is always "Rule" |

Figure 21:
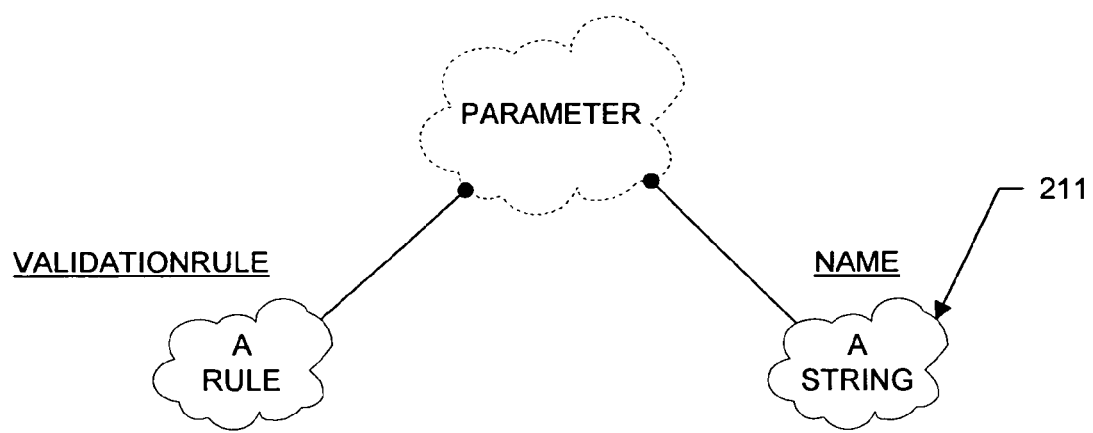
FIG. 21 is a Booch diagram of the parameter object.

The Parameter object 195 is shown in FIG. 21.

| Items in the Parameter Object | No. | Type | Description |
|---|---|---|---|
| name | 211 | String | name of parameter |
| validationRule | 187 | Rule | an ExecutableString whose compiler is "Rule" |

Figure 16:
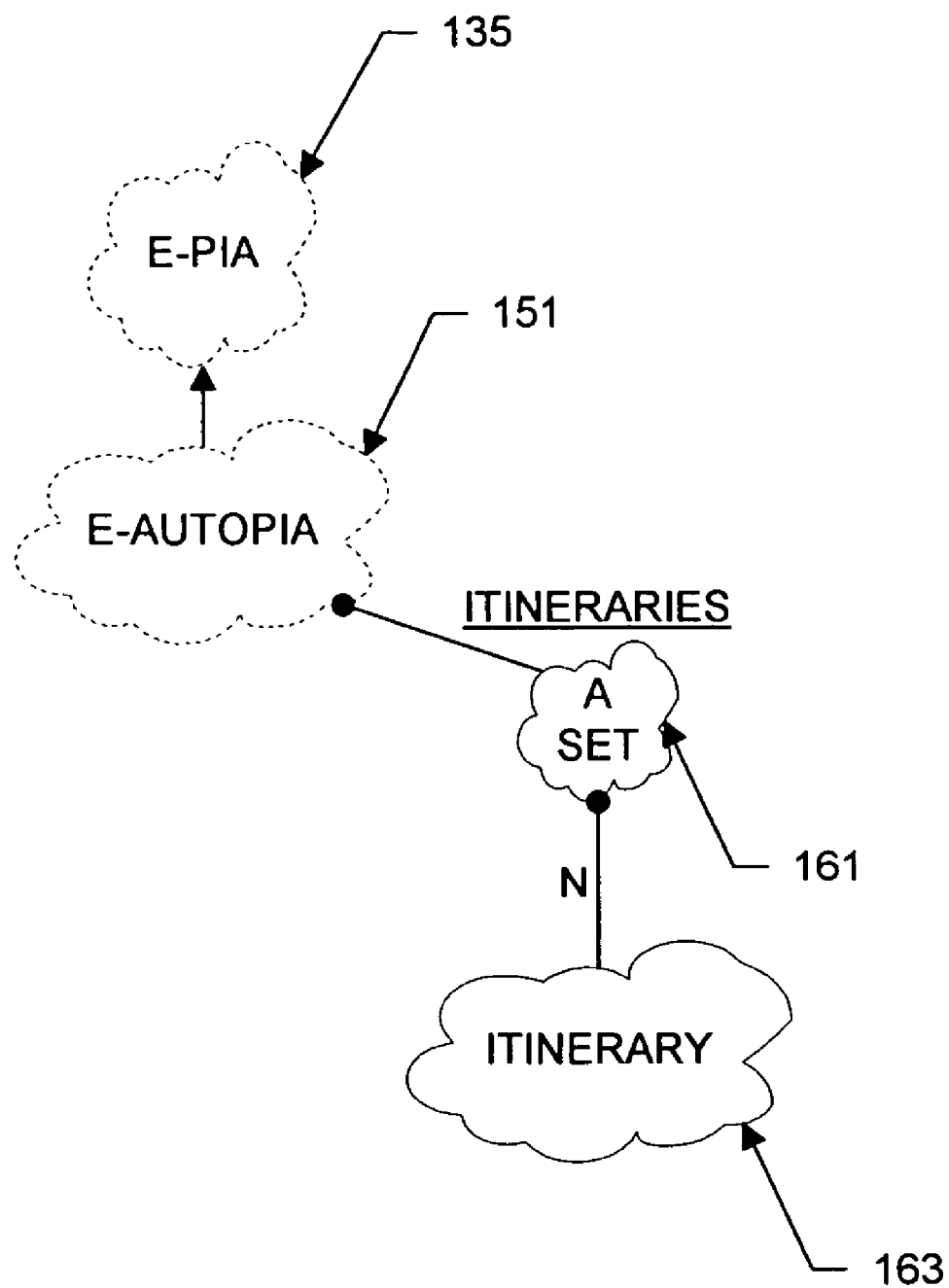
FIG. 16 is a Booch diagram of the E-AutoPIA object.

The E-AutoPIA 151 object is shown in FIG. 16. The E-AutoPIA is an intelligent agent that employs an Itinerary to perform specific tasks assigned by the owner. Itineraries are detailed in a later section. Only the original E-PIA may launch an E-AutoPIA, but the original E-PIA may launch several E-AutoPIAs and have them active at one time.

| Items in the E-AutoPIA Object | No. | Type | Description |
|---|---|---|---|
| itineraries | 161 | Set | An E-AutoPIA may have several itineraries hierarchically callable Itinerary objects 163. |

Figure 17:
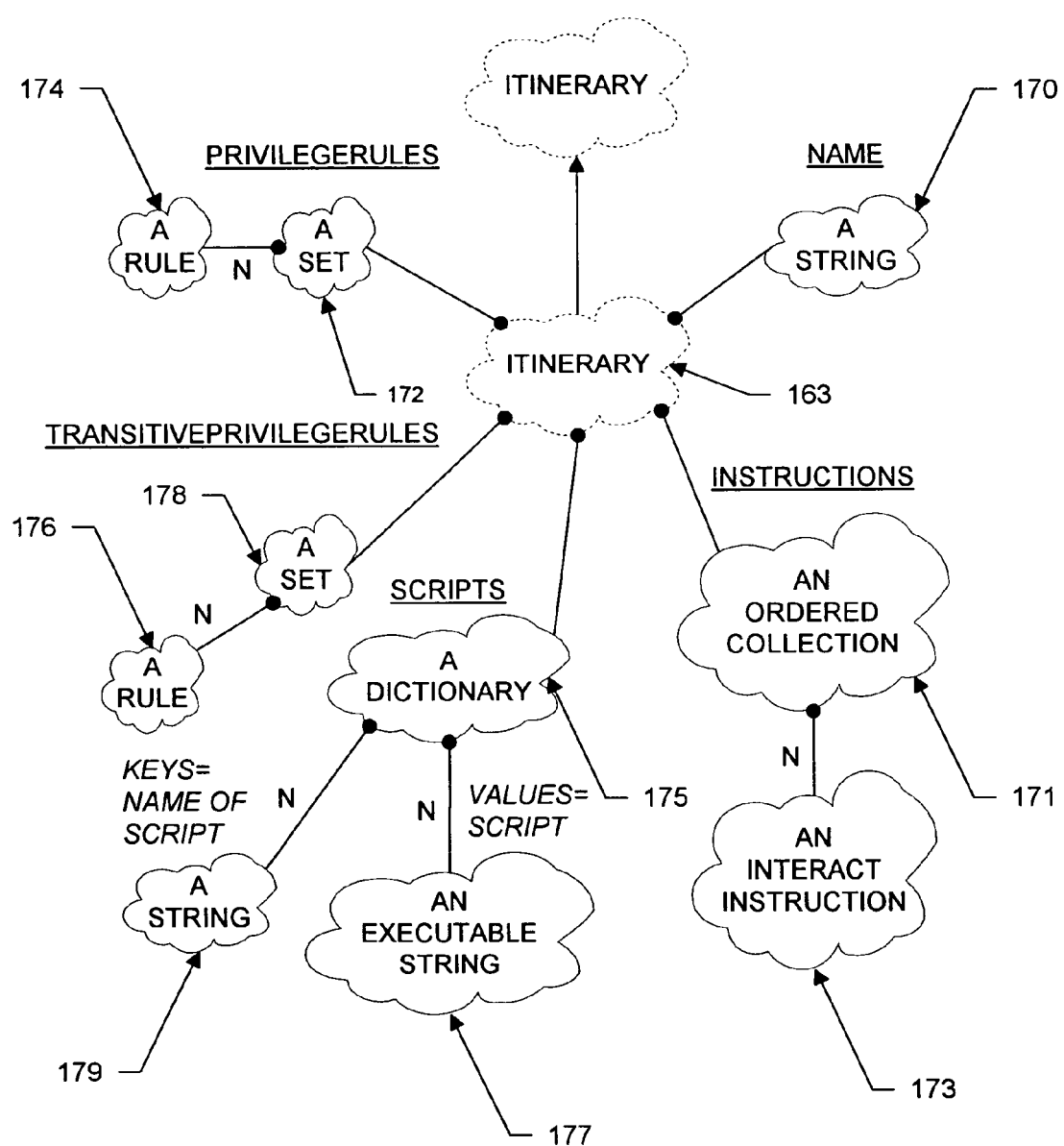
FIG. 17 is a Booch diagram of the itinerary object.

The Itinerary Object 163 is shown in FIG. 17.

| Items in the Itinerary Object | No. | Type | Description |
|---|---|---|---|
| name | 170 | String | An itinerary must have a name. |
| instructions | 171 | Set | The itinerary may contain several interact instructions. If there are several instructions, and there is no script, the instructions are performed sequentially. |
| scripts | 175 | Dictionary | Scripts are stored in a dictionary object, which allows an executable string to be referenced by a name. |
| TransitivePrivilege-Rules | 178 | Set | Already described in a previous table. |
| privilegeRules | 172 | Set | Already described in a previous table. |

Figure 18:
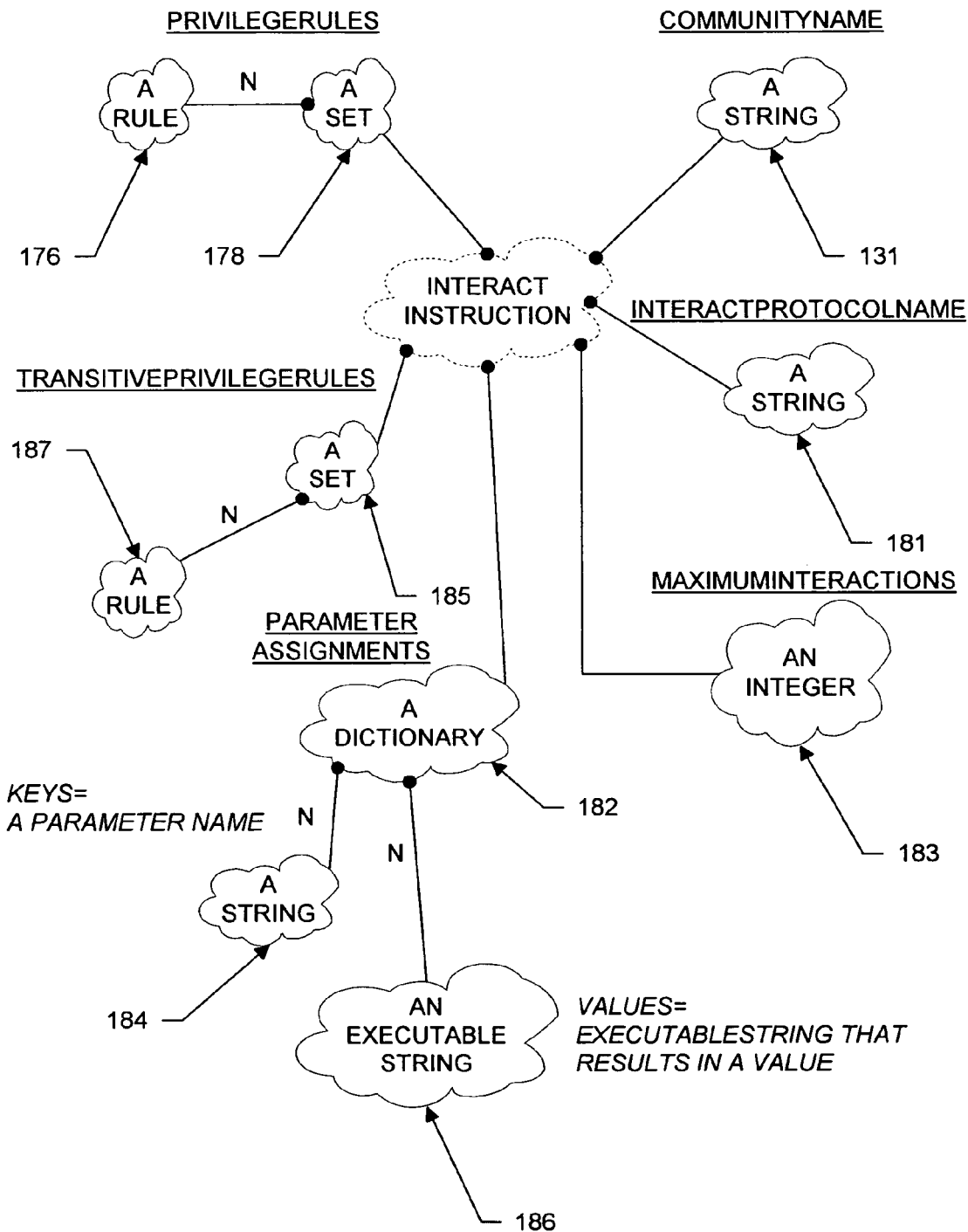
FIG. 18 is a Booch diagram of the Interact Instruction object.

The Interact Instruction 173 object is shown in FIG. 18. InteractInstructions cause interactions between E-PIAs and E-AutoPIAs. Each InteractInstructions names the InteractProtocol that will be performed and the actual parameters for the interaction as well as the rules under which it can occur. The end result of a successful InteractInstructions is the creation of an informational E-PIA as shown in FIG. 15B. Each item of information held by the informational E-PIA is encrypted using the private key of the original E-PIA, thus providing subsequent users authenticity of the information when using the E-PIA's public key.

An InteractProtocol maintains essentially a template relationship to an InteractInstruction. An InteractProtocol is represented by a signature of parameters to be filled in, while the InteractInstruction counterpart is the same except with parameters filled in. InteractProtocols and Interact Instructions are both authoring time entities. The InteractProtocols represent the services provided by an E-Broker and are authored along with the E-Broker. InteractInstructions are authored during the construction of an Itinerary for an E-AutoPIA. Each InteractInstruction represents the call of a requested interaction or InteractProtocol. The inputs, outputs, and the default map are removed from the InteractOrotocol when constructing the corresponding InteractInstruction.

| Items in the Interact Instruction Object | No. | Type | Description |
|---|---|---|---|
| interactProtocol-Nname | 181 | String | Each protocol has a name. |
| CommunityName | 131 | String | The name of the E-Metro Community where the E-AutoPIA's original E-PIA resides. |
| PrivilegeRules | 185 | Set | Already described in a previous table. |
| MaxInstructions | 183 | Integer | The maximum number of E-PIAs that will have this instruction used on. This number can be infinity. |
| ParameterAssignments | 182 | Dictionary | |
| transitivePrivilege-Rules | 185 | Set | Already described in a previous table. |

Figure 13:
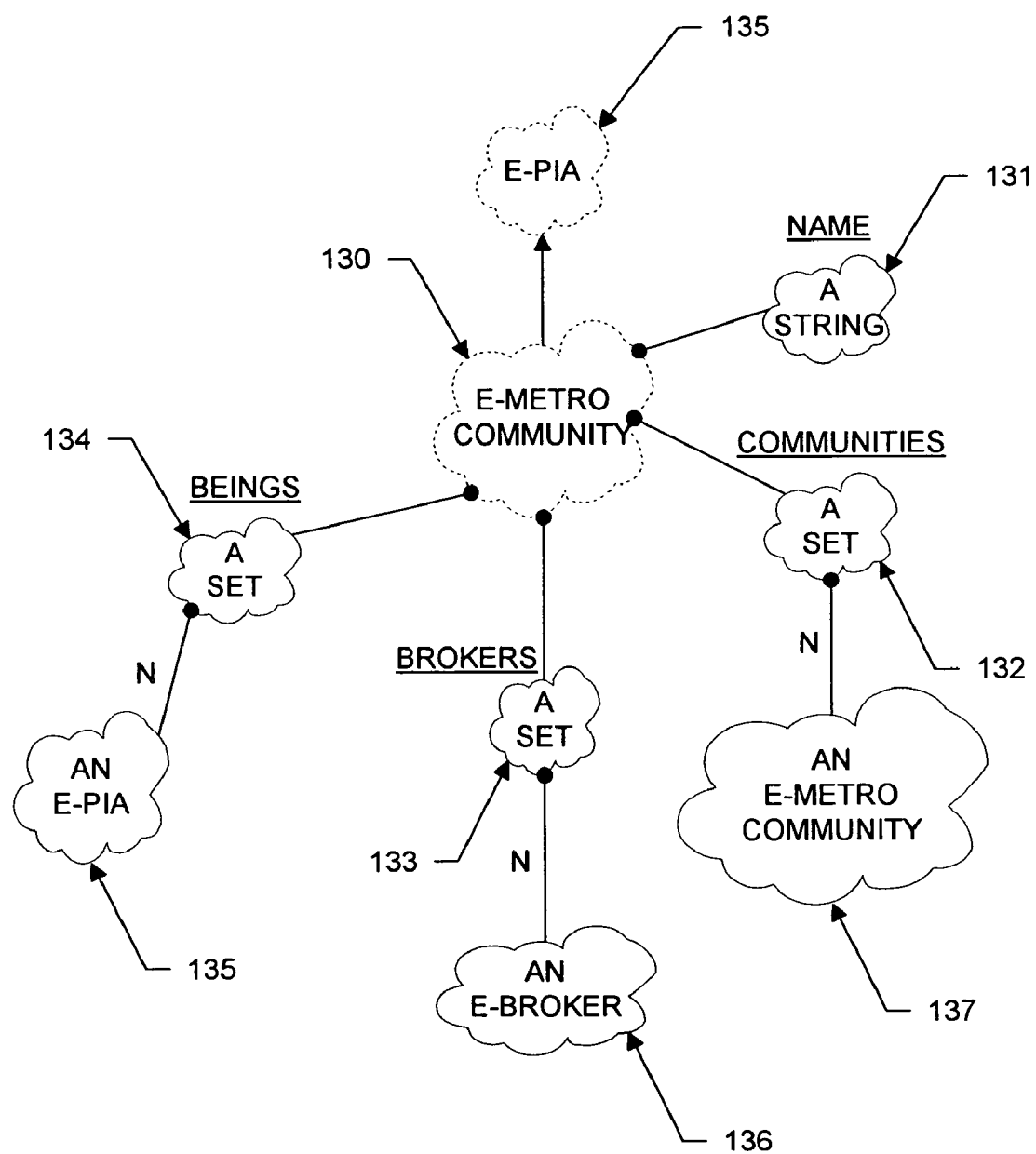
FIG. 13 is a Booch diagram of the E-Metro Community object.

The E-Metro Community Object 130 is shown in FIG. 13. The E-Metro Community object provides a grouping concept for the E-PIAs and other E-Communities.

| Items in the E-Metro Community Object | No. | Type | Description |
|---|---|---|---|
| | 135 | E-PIA | The E-Broker class inherits from the E-PIA class. Thus, an E-Broker is a subclass of E-PIA containing all of the items that an E-PIA contains, but additionally includes: |
| name | 131 | string | Each E-Metro Community must have a name. |
| Communities | 132 | Set | An E-Metro Community 137 may contain other E-Communities in a hierarchical relationship. |
| Brokers | 133 | Set | Each E-Metro Community will need at least one, and likely several E-Brokers 136 to perform specific tasks. The E-Brokers are organized into a set. |
| Beings | 134 | Set | All the E-PIAs 135 in an E-Metro Community are kept in a set. |

Figure 14:
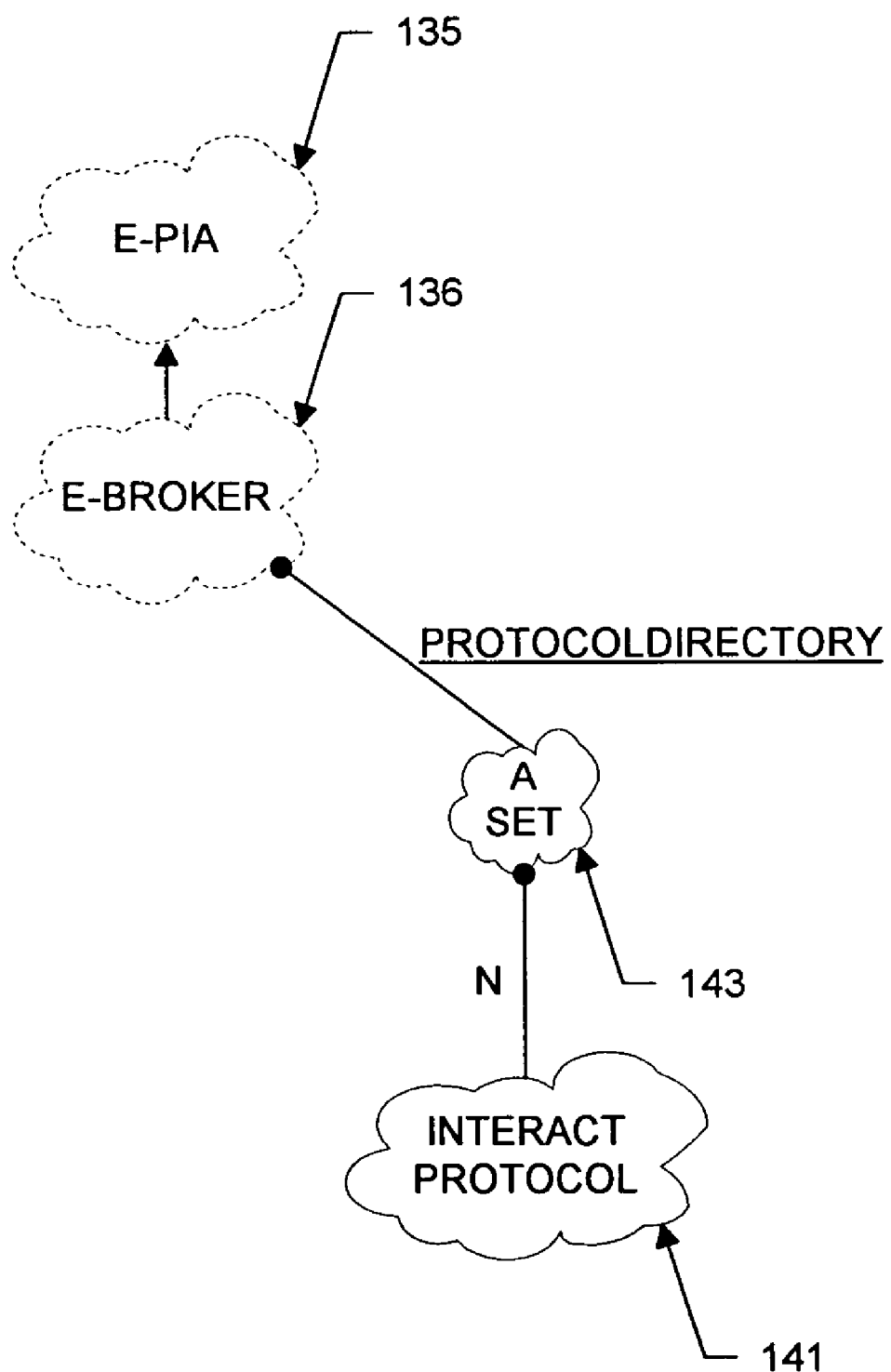
FIG. 14 is a Booch diagram of the E-Broker object.

The E-Broker object 136 is shown in FIG. 14. An E-Broker is required for all E-PIA and E-AutoPIA interactions. It is the E-Broker that assures that information is released only to trusted entities that meet the requirements set by the individual.

| Items in the E-Broker Object | No. | Type | Description |
|---|---|---|---|
| | 135 | E-PIA | The E-Broker class inherits from the E-PIA class. Thus, an E-Broker is a subclass of E-PIA containing all of the items that an E-PIA contains, but additionally includes: |

-continued

| Items in the E-Broker Object | No. | Type | Description |
|---|---|---|---|
| protocolDirectory | 143 | Set | The E-Broker may contain several InteractProtocols 141 stored in a Set. |

Architecture and Design

This next section describes the architecture and design of a personal and private information protection and brokerage system called "E-Metro."

Introduction—Users' E-Metro World

The E-Metro World is the collection of all hardware and software that is being employed to store E-Metro specific objects and/or perform E-Metro activities. The user view of the E-Metro World is achieved primarily through a Netscape Browser, and from that application, the view is that of many E-Communities all connected to each other via the Internet as shown in FIG. 2. Ultimately, the user does not care where the E-Communities are physically located, only that they serve as a logical place for interaction with other E-PIA's with similar interests.

As a facility for building up one's information asset structures, E-Metro Forms Repositories are also available. Forms can be retrieved using the E-Metro Client authoring facility and incorporated into existing or new E-PIA's to add information according to a useful reusable structure. A user may then store his E-PIA into one or more E-Communities.

System Architecture Overview

E-Metro World Machine Configuration

In reality, each E-Community resides on an E-Metro Web site Server. As depicted in FIG. 7, more than one E-Community may reside on one such Server. Furthermore, E-Communities residing in a single Server may be configured to maintain a hierarchical relationship to one another.

Two E-Being—Forms Repositories 13 are depicted in FIG. 7. As indicated by the text in FIG. 7, one E-Being—Forms Repository is implemented by an FTP site, while another is implemented by a Mail Server System. It is even possible that no Forms Repository exists and that the Forms are simply managed as local files.

E-Metro World System Processes Architecture

The Client and Server Processes in an E-Metro World are shown in FIG. 8. The client workstation consists of the Netscape browser and E-Metro specific DLLs, JAVA scripts, or some other client code of similar nature meant to facilitate various E-Metro client activities. FTP Servers are well known staples on the internet while the Netscape Server System is discussed in Netscape's Server documentation. The focus of this document is the shaded E-Metro Trusted Server Systems 47 in FIG. 8. While using E-Metro, the Clients always communicate with an E-Metro Trusted Server. At authoring time, InteractProtocols and InteractInstructions may only be obtained from the correct E-Brokers (Actually, the Forms for InteractProtocols and InteractInstructions may be obtained from Form Repositories if set up to do so, but the required TrustedTokens for these activities may only be obtained from the E-Brokers). At runtime, E-Metro Clients query a user's Home E-PIA at the E-Community, and therefore E-Metro Server, where it resides to see the latest results or status of associated E-AutoPIA's. E-Metro Server Systems actually consist of many processes which will be discussed in the next section.

E-Metro Security Architecture

E-Metro emphasizes security of information assets and trusted interactions. E-Metro guarantees that all information put into the E-Metro World System will be secure and that only those who are trusted to have access to specific information will. The reader is referred to FIG. 24 for a depiction of when and where encrypted transmissions occur in what is essentially the "public" interlinks of the E-Metro World System. All of the necessary cryptographic security is handled by Netscape's SSL communication layer. To maintain the level of security described, the following system attributes are maintained:

1) Each E-Metro Trusted Server Subsystem at a Web site consists of secure processes that nobody can get access to while they are running. It is assumed that an ordinary person skilled in the art of process security on a single machine can achieve this runtime integrity.

2) Each E-Metro Trusted Server Subsystem maintains its own private key and public key. The public key of a specific E-Metro Trusted Server Subsystem is known by all other E-Metro Trusted Server Subsystems via the DirectoryService E-Broker.

3) All E-PIAs and E-AutoPIAs are encrypted when transmitted between E-Metro Trusted Server System Web sites. Encryption is performed with both the public key of the E-Metro Trusted Server Subsystem that is the destination of the transmission as well as the private key of the source of the transmission. This double encryption accomplishes a double guarantee:

a) Only the E-Metro Trusted Server Subsystem (the destination) with the correct private key will be able to decrypt the transmission.

b) This same E-Metro Trusted Server Subsystem (the destination) will be guaranteed that the transmission came from the source E-Metro Server stated in the transmission and not a fraudulent source. See FIG. 24.

4) All interactions between E-PIAs and E-AutoPIAs are performed in private on a single machine within an E-Metro Trusted Server System.

5) When a client requests information contained in its Home E-PIA, the E-Metro Trusted Server Subsystem maintaining the Home E-PIA encrypts the information for the transmission with the Home E-PIA client's public key so that only the receiving client will be able to decrypt the information. When writing information to the Home E-PIA, the information is encrypted with the destination E-Metro Trusted Server Subsystem's public key so only that the correct destination will be able to decrypt the information. Writing information also includes E-AutoPIA and associated itinerary authoring. See FIG. 24.

6) When a client is obtaining authoring information from an E-Broker, the authoring information is encrypted with the client's public key, again so that only the client knows how to decrypt the information. This encryption is important mostly for the transmission of TrustedTokens during authoring which must immediately be encrypted via the client's private key upon reception.

Metro Trusted Server System

FIG. 9 pictures the top level subsystems of an E-Metro Server. The core subsystem that provides the primary services of E-Metro is the Distributed Object Resource Management System Server or DORMS. The five other subsystems are an FTP Server and FTP Client Process and three Netscape Web site Server subsystems that, together, perform the functionality necessary for a complete E-Metro Server.

DORMS Server

As mentioned, the DORMS Server is the heart of the E-Metro system architecture. It essentially governs the trusted storage and brokering of all E-Metro objects and resources with the assistance of the smaller grained objects, namely E-Communities and E-Brokers, that it internally manages. More specifically, the DORMS Server performs the following:

D1. Stores E-Communities

D2. Stores E-Brokers

D3. Maintains an entire E-Metro World Directory of where all Communities and E-Brokers are located and keeps the directory up to date.

D4. Stores or "banks" E-PIAs

D5. Maintains a Messaging Subsystem for E-AutoPIA transport between E-Communities D6. Maintains visiting E-AutoPIAs D7. Drives E-Broker mediation of E-AutoPIA with E-PIA interaction D8. Maintains the Privilege Rules Processor that assists the DORMS' guarantee of secure and trusted interactions.

Netscape Commerce Server

The Netscape Commerce Server is the core subsystem enabling an E-Metro Server to be a Web site and interact over the Internet. Since it uses the open Secure Sockets Layer (SSL) protocol, it provides full Internet security. SSL provides encryption, server authentication, and message integrity using technology from RSA Data Security. When the client makes a request, it always communicates with the Netscape Commerce Server initially. In turn, the Netscape Commerce Server will cooperate with the DORMS Server via the Netscape Server API. This communication with an E-Metro Server via the Netscape Commerce Server is what allows the client subsystem to consist primarily of an HTTP/HTML compliant World Wide Web Browser such as Netscape Navigator. The details of this cooperation are described in the next section.

Netscape Transaction Server

As noted in FIG. 9, the Netscape Transaction Server handles credit card processing, transaction logging, and billing management. The DORMS Server interacts with the credit card processing function when a person wishes to begin using E-Metro services for the first time, or add new capabilities to their E-PIA. The charges for initial or new capabilities are processed automatically by the credit card function of the Transaction Server. The DORMS Server also interacts with the transaction logging function to track what is going on at an E-Metro site and may employ the billing management function as well. It is assumed that an ordinary person skilled in the art of computer programming can easily follow the necessary Netscape manuals to configure the cooperation between the DORMS Server and Transaction Server.

An important E-Metro feature is that individual E-Brokers and E-PIA's can configure their own billing policies. E-Brokers can require the entry of credit card information in order that it submit a required TrustedToken for an InteractProtocol or InteractInstruction. E-PIA's may do the same, but realize that E-PIA's can only do so via an E-Broker implementation. Both credit card and billing APIs are available in the E-Broker Service API which E-Broker implementations may call. This will be discussed later.

Netscape Server API (NSAPI)

The NSAPI works closely with the Netscape Commerce Server in order to provide the means for a Web site to have control over the processing when a normal HTTP compatible request comes in to the Commerce Server. In order to do this, Netscape has identified the following steps in the normal response process:

NS1. Authorization translation

NS2. Name translation

NS3. Path checks

NS4. Object type

NS5. Respond to request

NS6. Log the transaction

The NSAPI provides the ability to override the processing that is performed in any or all of these steps. It is assumed that an ordinary person skilled in the art of computer programming can easily follow the necessary NSAPI manuals to enable the required overriding of these steps. In particular, steps 1, 2, 3, and 5 will need specific E-Metro replacements. An overview of the replacement implementations are enumerated below:

For NS1,

The E-Community privilegeRules necessary for the request can be checked; and

The TrustedToken necessary for the request can be checked.

For NS2,

Paths may refer to hierarchically located E-Brokers or E-Communities. The path submitted is munged by leaving only the relative path corresponding to the E-Broker or E-Community assuming the site portion of the path is correct. For NS3, the E-Broker or E-Community is checked to see if it exists. For NS5, the requested DORMS service is performed. There are several types of requests which are:

1) Client requests to browse the DORM Directory

2) Client requests authoring time information from an E-Broker.

3) Client requests retrieval of owned E-PIA information assets.

4) Client requests to store E-PIA information assets after assets were updated on Client.

5) Client requests to launch an E-AutoPIA.

Note that E-AutoPIA's do not utilize this entrypoint because E-AutoPIA activities are not a Client driven process.

FTP Server and FTP Client

As will be introduced later in the architecture, E-Metro requires a reliable Messaging Subsystem for transporting the E-AutoPIA's from E-Community to E-Community. Since Internet E Mail is not reliable, FTP Servers and FTP Clients are used to implement the transport. E-AutoPIA's are marshalled into a BLOb and transported to remote sites via a file. The file is then uploaded via initiation of an E-Metro Server's FTP Client to another E-Metro Server's FTP Server. The later section describes the details of the use of FTP for the Messaging Subsystem machinery.

Distributed Object Resource Management System (DORMS) Server

FIG. 10 shows the complex arrangement of subsystems within the DORMS Server. The rest of this section devotes portions to discussing each of these component subsystems.

Realize, however, that the Interaction Processor is the focal point because it is the driving subsystem that gets called due to a Client request via the Netscape Commerce Server or due to an E-AutoPIA arrival via the Messaging Subsystem. Another important point to make before continuing is that all service requests are somehow implemented as an interaction with an E-Broker.

Interaction Processor

As mentioned, the Interaction Processor is the focal point of the DORMS Server and it satisfies all requests via an E-Broker. When the Messaging Subsystem submits an E-AutoPIA to the DORMS, it is actually submitting it to the Interaction Processor which is the driving body of code for the whole DORMS Server. When the Messaging Subsystem does this, it assumed that it also has unmarshalled the E-AutoPIA BLOb so that the E-AutoPIA is in a suitable form for the rest of its processing. As enumerated in Tables 1 and 2 below, there is much processing to be done for a client request as well as for a visiting E-AutoPIA. The service requests that the Interaction Processor handles are all the Client requests listed below, as well as the InteractInstructions of incoming E-AutoPIA's. The complete list of requests serviced by the Interaction Processor and an overview of how they are handled is enumerated below.

IP1. Client requests to browse the DORMS Directory—The request is redirected to a special E-Broker known as the "DirectoryService" E-Broker.

IP2. Client requests authoring time information from an E-Broker—The request is redirected to the E-Broker designated to call one of its special authoring time services (InteractProtocols) such as "interactProtocolDirectory" or "getRightsToInteractProtocol."

IP3. Client requests retrieval of owned E-PIA information assets—This request is redirected to a special E-Broker known as the "Home" E-Broker. The special service employed is called "retrieveAssets." This special E-Broker must be present in every E-Community that Home E-PIA's are to be allowed to reside in.

IP4. Client requests to store E-PIA information assets after assets were updated on Client—This request employs the "Home" E-Broker by calling its "storeAssets" service.

IP5. E-AutoPIA requests interaction via current InteractInstruction in its Itinerary—The request is redirected to the (E-Broker, InteractProtocol) 2-tuple corresponding to the InteractInstruction to perform.

IP6. Client requests Interaction with E-Broker—The request is redirected to the (E-Broker, InteractProtocol) 2-tuple corresponding to the InteractInstruction to perform.

IP7. Client requests Interaction with E-PIA(s)—The request is redirected to the (E-Broker, InteractProtocol) 2-tuple corresponding to the InteractInstruction to perform but the Rules are processed to apply the Interaction to only those E-PIA(s) which satisfy the Rules.

IP8. Client requests to launch an E-AutoPIA—This request employs the "Home" E-Broker by calling its "launch" service. IP1 through IP7 are activities that can be performed while the Client E-PIA is in what is known as "E-Broker Online Mode." IP8 is "E-Broker Batch Mode."

When the Interaction Processor performs any of these services, it employs the assistance of all of the other subsystems pictured in FIG. 10. When a Client request arrives, the Interaction Processor performs the steps listed in Table 1. Similarly, the steps listed in Table 2 are the actions invoked by the Interaction Processor when an E-AutoPIA arrives with a request. These two tables are invaluable resources for understanding the operations of the DORMS Server. However, a complete understanding of what happens may only be obtained by reading the rest of the section which describe more details of each step and more details about the assisting subsystem which performs the step.

TABLE 1

A request from the Client application -- the Interaction Processor's steps and use of intra-DORMS subsystems.

| | Subsystem Used | Action |
|---|---|---|
| 1 | Netscape Commerce Server with NSAPI | Receives service request. Decrypt received request with E-Metro Trusted Server System private key. |
| 2 | Interaction Processor and Virtual Image | Request is submitted to DORMS with necessary E-PIA information |
| 3 | Virtual Image with Virtual Interpreter | Look up parent E-Community of E-Broker |
| 4 | Rules Processor with Virtual Interpreter | Validate privilegeRules of E-Community |
| 5 | E-Broker | Call E-Broker |
| 6 | E-Broker Adaptor | Call execute ( ) |
| 7 | E-Broker executable | Invoke executable code to perform service |
| 8 | E-Broker Service API | May need to call service API procedure |
| 9 | Netscape Commerce Server | Return information back. Encrypt the information sent back with requesting client's public key. |

TABLE 2

A request from an E-AutoPIA -- the Interaction Processor's steps and use of intra-DORMS subsystems.

| | Subsystem Used | Action |
|---|---|---|
| 1 | Messaging Subsystem | Receives E-AutoPIA and decrypts it using the private key of the local E-Metro Trusted Server System. |
| 2 | Interaction Processor and Virtual Image | Request is submitted to DORMS with E-AutoPIA |
| 3 | Virtual Image with Virtual Interpreter | Look up E-Community named in E-AutoPIA's InteractInstruction |
| 4 | Rules Processor with Virtual Interpreter | Validate privilegeRules of E-Community |
| 5 | Rules Processor with Virtual Interpreter | Validate the privilegeRules of any transitively exchanged E-PTA versions that are going to be passed as an input or output Parameter. |
| 6 | E-Broker | Validate that E-AutoPIA has necessary TrustedToken by decrypting it with E-AutoPIA's public key obtained from its certificate. |
| 7 | E-Broker Adaptor | Call execute( ) with "getTrustedToken" service and name of InteractProtocol (which will be performed shortly) as parameter. |
| 8 | E-Broker executable | Invoke executable code to generate unique TrustedToken for InteractProtocol named. |
| 9 | Rules Processor with Virtual Interpreter | Construct reduced SQL Statement in preparation for E-PIA selection and collection (see next section) |
| 10 | E-Broker | Call E-Broker |
| 11 | E-Broker Adaptor | Call execute( ) but allow only those inputs that satisfied |

TABLE 2-continued

A request from an E-AutoPIA -- the Interaction Processor's steps and use of intra-DORMS subsystems.

| | Subsystem Used | Action |
|---|---|---|
| | | transitive privileges to be passed. |
| 12 | E-Broker executable | Invoke executable code to perform service |
| 13 | E-Broker Service API, read E-PIA's from Object Repository | Call collectTrustedEPIAs( ) |
| 14 | E-Broker executable | Perform the rest of executable code in E-Broker's service implementation |
| 15 | Virtual Image | Update E-AutoPIA with outputs for which transitive privileges are satisfied. |
| 16 | Itinerary Interpreter | Interpret current script and determine next InteractInstruction to perform. |
| 17 | DirectoryService E-Broker and Virtual Image | Look up FTP address for next E-Community of next Interact Instruction |
| 18 | Messaging Subsystem | Submit E-AutoPIA back to Messaging Subsystem to be transported to next E-Community. Messaging Subsystem must encrypt the information to be transmitted using the public key of the destination. |

Rules Processor

The Rules Processor is a key security enforcement subsystem. It checks privilegeRules, and additionally, the Rule Processor also handles conversions to SQL statements to aid in E-PIA selection.

Validation of privilegeRules requires a fairly complex procedure. In the case of E-AutoPIA's, the privilegeRules can refer to "myself" and "yourself." Each privilegeRules is a Set of Rule objects. Each Rule object must initially be broken into subexpressions which include "myself" references only. These "myself only" subexpressions may be immediately be reduced to TRUE's or FALSE's by executing the Virtual Interpreter on the E-AutoPIA which is the current context.

The remaining "yourself" subexpressions are combined with the results to form a reduced expression. This remaining reduced expression is then parsed and transformed into a SQL SELECT statement which may have an ORDER BY clause if the Rules language provides this. This SELECT statement is used later to collect the E-PIA's that satisfy all the rules so far evaluated up to this point.

Since each E-PIA has its own privilegeRules for the interaction with the E-AutoPIA which is the current context, the collected E-PIA's from the above SELECT must be further filtered. This is accomplished by taking each E-PIA one at a time from the collected set and executing their privilegeRules with the E-AutoPIA as "yourself" and the current E-PIA as "myself." This execution requires the Virtual Interpreter. Note that this portion of the privilege check may have poor performance since the database SELECT is not employed. It is therefore important to construct specific privilegeRules for E-AutoPIA's so that the collected E-PIA sets are as small as possible.

Virtual Interpreter

The Virtual Interpreter is simply the machinery that gives dynamics to the programming language of E-Metro. The programming language may be any language even a new one, but it is suggested that it have similar features to that of Smalltalk. This programming language is the one that must be used in the privilegeRules and the scripts of the Itineraries.

Virtual Image

The Virtual Image is the place where all E-Metro specific classes and objects which are being processed are kept in RAM. The Virtual Interpreter is what gives dynamics to these objects. As shown in FIG. 10, all E-Communities and E-Brokers are kept in the Virtual Image as a performance technique, although each is persistently stored in the Object Repository.

When an E-AutoPIA or E-PIA is processed, they and all of the objects they own are brought into the Virtual Image. The privilegeRules then employ the Virtual Interpreter to process expressions. A special method on Class EPIA is able to check for the existence of a specific TrustedToken.

E-Broker Objects

Each E-Broker object may represent an executable which is essentially external to the delivered E-Metro software which implements their InteractProtocols in a variety of ways. However, if all that is desired is information sharing between an E-AutoPIA and an E-PIA then the E-Broker requires no external executable. Instead, the Interaction Processor will know only that an exchange of data is to occur if the privilegeRules are obeyed. An E-AutoPIA's InteractInstruction should be authored as though only one E-PIA will be involved in the interaction with the E-AutoPIA. The Interaction Processor will automatically construct Sets of size equal to maximuminteractions for the output parameters.

E-Broker Adaptor and E-Broker Executable

All E-Broker objects are accessed using a unified protocol with the Virtual Interpreter. However, the type of each E-Broker executable is possible different. An E-Broker can be a C or C++ EXE, a C or C++DLL, a Visual Basic program, an OLE 2 object, a SOM, or other. The procedure required to invoke the implementation of an InteractProtocol or service in each case is possibly different. Therefore, each new type of executable requires an E-Broker Adaptor which transforms the unified protocol invocations into the mechanism required to communicate the necessary signals and information to and from the E-Broker executable.

The Adaptor is always a DLL which is dynamically loaded and which always supports the following APIs (with signatures undetermined):

start( )—called just after Adaptor DLL loads stop( )—called just before Adaptor DLL is unloaded execute( )—this is the main entrypoint to execute an InteractInstruction. The name of the InteractProtocol must be passed in along with a linked list of all the parameters. The implementation of execute( ) is important because it must contain the code that binds the InteractProtocol name somehow to the executable code body representing the InteractProtocol's implementation. Execute then invokes the executable code body.

E-Broker Service API

As mentioned the E-Broker executable may be any of the executable types mentioned above. In order to facilitate the writing of code to perform the service/InteractProtocol that the E-Broker developer is trying to achieve, APIs are supplied. The executable must be capable of calling C procedures from a C DLL to perform these procedures.

Some of the identified useful procedures (with signatures undetermined) are:

collectTrustedEPIAs( )—This API is the only one that must be called by each E-Broker executable. It is the only way for the executable to get a hold of the "privilege compliant" collection of E-PIA's. This API takes as input, additional Rules to be applied for the collecting of E-PIA's. The Rules Processor is employed to combine the input Rules with the SQL statement formed prior to entry into the E-Broker. This produces the final SQL SELECT statement to be employed. The SELECT statement is performed to obtain the collection of E-PIA's that satisfy the SELECT. The collection is not returned yet, however, until the individual privilegeRules of the E-PIA's in the collection are checked by executing the Rules Processor.

Once the entirely "privilege compliant" collection is returned, the E-Broker executable may do whatever it wants with them before returning from the interaction. Note that in the case of small maximuminteractions values for an InteractInstruction, "order by" rules may be very important.

processCreditCard( )—interacts with the Transaction Server after obtaining credit card information for a purchase of something.

billActivity( )—interacts with the Transaction Server to bill an E-AutoPIA based on an activity name.

validatewithSecureCard( )—requires a specific Electronic Secure Card to be entered into a card reader in order to return TRUE. The specific Secure Card is identified by information and Rules supplied as parameters to this API.

Meta E-Brokers

Since some of the E-Metro System proper is implemented by E-Brokers, these special E-Brokers are known as "Meta" E-Brokers. So far, only two have been identified. More may be needed.

Home E-Broker

This E-Broker primarily needs to validate that the user editing or browsing information assets of a specific Home E-PIA is in fact the person who owns it. While this special E-Broker needs to be present in perhaps many E-Communities, its implementation may be overridden. For example, a one "Home" E-Broker implementation may provide strict security such that a Secure Card is absolutely required. Other "Home" E-Brokers may only require a password. A very loose E-Community may have no security.

DirectoryService E-Broker

This E-Broker attempts to maintain up to date knowledge of the entire E-Metro World. Only one DirectoryService E-Broker is needed per E-Community which is the top level parent at a site. Specifically, it keeps track of the public key of each online E-Metro Trusted Server Subsystem, of all E-Communities and the Internet addresses they are located at, as well as which E-Brokers reside in them and the names of the InteractProtocols each E-Broker owns. The Directory information must persist so it is stored in the Object Repository.

To keep the Directory Information up to date, every DirectoryService E-Broker periodically checks to see if there were any E-Community or E-Broker assignment changes. If there was, the DirectoryService E-Broker launches an E-AutoPIA with an Itinerary to visit each and every other DirectoryService E-Broker to notify them of the changes. The frequency of the period may be something like once per day since such changes are probably fairly infrequent. Note that a new E-Metro Site must obtain a copy of the entire current E-Metro directory upon installation.

Itinerary Interpreter

The Itinerary Interpreter understands that an Itinerary comes in one of two forms. Either the Itinerary has scripts or has no scripts. In either case, the Itinerary must have at least one InteractInstruction in the instructions OrderedCollection. In the case of no scripts, the instructions OrderedCollection is simply executed sequentially. In the case of scripts present, the InteractInstructions don't have to actually have parameters filled in because the script performs the call with parameters. In this case, the OrderedCollection of InteractInstructions merely represents the InteractInstructions that can be called from the scripts. There is no reason to have duplicate InteractInstructions for the scripts present case.

For the no scripts case, the Itinerary Interpreter merely increments an instructionPointer in the E-AutoPIA to keep track of which InteractInstruction in the Itinerary is the current one. When scripts are present, the Itinerary Interpreter must be able to compile and execute scripts. It achieves this only by employing the Virtual Interpreter. Each script is like a Smalltalk method in which the programming language may be employed to perform any general processing. The variables referenced in the scripts bind to the named information within the E-AutoPIA. At any time within a script, an InteractInstruction or even an entire Itinerary may be called by referring to the special variable "Instructions." The syntax for calling an InteractInstruction would be "Instructions at: aProtocolName performwith: aDictionaryOfParameters." In this example, aProtocolName is the name of the InteractProtocol to perform, while aDictionaryOfParameters is a Dictionary keyed on parameter name and valued on the values of the parameters.

Object Repository

The Object Repository is primarily meant to be the place where E-PIA's are maintained persistently. However, E-Communities and E-Brokers are stored there as well.

The Object Repository employs a simple object oriented interface over a relational database implementation (e.g. Oracle). The features of the simple object to relational table row design are as follows:

OR1. Each object is stored in a row of a database table with the row schema depicted in FIG. 11.

OR2. The Object Identifier or OID is an Internet-wide unique numerical identifier which can be used to dereference the object. A technique that guarantees enterprise-wide uniqueness of the OID can be found in the prior art.

OR3. Each Object is considered to be stored in a PersistentMultiKeyedCollection which is just a grouping of rows that each have the same CollectionOID.

OR4. The keys are actually "exposed" information of an Object. When an Object is stored in a row, the Object data that has been identified to be exposed is copied into the appropriate columns of the row. Only the keys so identified can be used for fast E-PIA selection and collection because the database engine can be employed.

OR5. The actual objects themselves are stored in the BLOb column of a row.

An Object Repository is installed for each top level E-Community residing in an E-Metro Server. The database schema includes only three tables, one for E-Communities, one for E-Brokers, and one for the E-PIA's. The PersistentMultKeyedCollection schemas for E-Communities, E-Brokers, and E-PIA's are shown in FIGS. 11b, 11c, and 11d, respectively.

In each of the three tables, the CollectionOID refers to a different grouping concept. In the E-Community table, the ParentOID is a CollectionOID which treats a parent E-Community as a Collection of its children E-Communities. In the E-Broker and E-PIA tables, the ECommunityOIDs is the CollectionOID. The keys have been intentionally unidentified. This is because these keys should be determined by the needs of the E-Community and should be configurable via the E-Community Administration Tool.

It is important to note how access with hierarchical E-Communities is achieved. Suppose a query needs to allow any E-PIA that is a member of an E-Community or any of its children E-Communities to be in a result. First, the OIDs referring to all of the hierarchically reachable E-Communities must be discovered before the query and collected. The SELECT query then can be constructed with a bunch of ORed "CollectionOID=X" expressions.

Remember that most of the E-Community and E-Broker only processing is intended to be done directly in RAM in the Virtual Image. Only E-PIA's will be accessed in the Object Repository regularly.

Messaging Subsystem

As far as the Interaction Processor is concerned, the Messaging Subsystem is solely a source and sink of E-AutoPIA's which will request brokered services. When the service for an E-AutoPIA is complete, the Interaction Processor submits the E-AutoPIA to the Itinerary Interpreter. The Itinerary Interpreter interprets the current script as far as can until it gets to the very next InteractInstruction invocation. This will be immediate if there are no scripts and only a linear Itinerary of InteractInstructions. When the Itinerary Interpreter is finished, the Interaction Processor gets the E-AutoPIA back. The DirectoryService E-Broker is then conferred to see which site the E-AutoPIA needs to go to next. The Interaction Processor then submits the E-AutoPIA back to the Messaging Subsystem so it can be transported to its next destination. The details of the Messaging Subsystem are presented in the next section.

Messaging Subsystem

The Messaging Subsystem is employed exclusively for transporting E-AutoPIA's from one remote E-Community to another reliably. The messaging machinery pictured in FIG. 12 is fairly simple. The Messaging Subsystem primarily relies on E-AutoPIA's arriving and being sent out of the Message Queue with the assistance of the external FTP Client and FTP Server. The E-AutoPIA Dispatchers are the primary interfacers to the DORMS Server. Note, however, that FTP is not required as the Messaging Subsystem implementation. Rather, any reliable means for sending information can be employed. Each of these subsystems are described in detail below.

E-AutoPIA Sender Dispatcher

When an E-AutoPIA is being sent to a remote E-Community, its FTP Internet address will have already been looked up by the Interaction Processor. Note that there is one FTP Internet address per top level E-Community. The Interaction Processor calls the E-AutoPIA Sender Dispatcher by handing off the E-AutoPIA to be sent along with this address.

The E-AutoPIA Sender Dispatcher puts the E-AutoPIA into an outgoing MessageQueue and then invokes the FTP Client to send the E-AutoPIA to its destination. If for any reason the FTP Client cannot send the E-AutoPIA right away, the FTP Client will read the entries in the outgoing Message Queue later and attempt to send the outgoing E-AutoPIA's then.

Message Queue

The Message Queue is really just an FTP file system. There is a single outgoing Message Queue and one incoming MessageQueue which can be two distinct FTP file directories.

E-AutoPIA Receiver Dispatcher

When the E-AutoPIA Receiver Dispatcher observes an arrived E-AutoPIA in the incoming Message Queue, it unmarshals the E-AutoPIA from its file format and then immediately calls up a new Interaction Processor server process to handle it. The E-AutoPIA file in the incoming Message Queue is not deleted until the E-AutoPIA is submitted to the outgoing Message Queue. This is required for recovery in case the DORMS Server crashes. Since only so many such server processes may be running simultaneously, a backlog of E-AutoPIA can build up in the incoming Message Queue. If the incoming Message Queue becomes empty, the E-AutoPIA Receiver Dispatcher may go to sleep and wake up periodically to check if anything has arrived. If there is a way for the FTP Server process to signal the E-AutoPIA Receiver Dispatcher, then the sleeping process can be asynchronously awakened on an as needed basis.

FTP Client

The FTP Client process really needs to perform a few more tasks than what a vanilla FTP Client does. It must delete the E-AutoPIA file in an outgoing Message Queue once it has successfully transferred the E-AutoPIA file to its next destination. Again, FTP is employed for transport since it is reliable. If errors occur during transmission, the FTP Client will know about it because transmission is directly point to point. The FTP Client will know that it must keep the failed E-AutoPIA in the outgoing Message Queue and try the transmission again later.

FTP Server

The FTP Server does not need to do anything special. It just stores incoming E-AutoPIA file transfers to the requested FTP directory. As mentioned the FTP directory designated represents the incoming Message Queue for one of the top level E-Communities at the local E-Metro Site.

Object Model Overview

Figure 23:
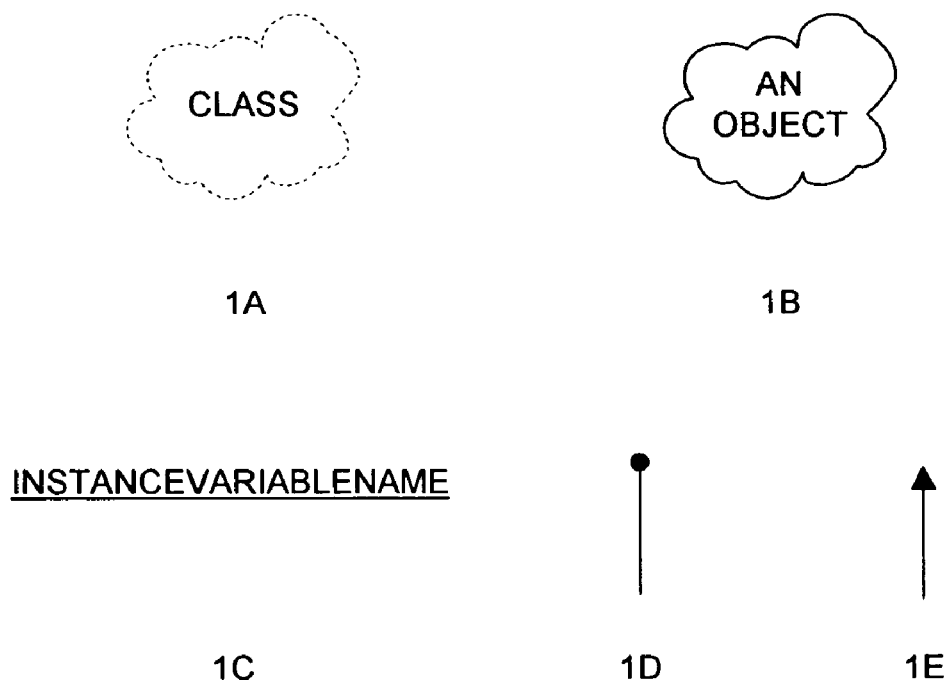
FIG. 23 shows the basic Booch symbols employed in the object model descriptions within the preferred embodiment.

This section describes the object model of a cyber-community based personal and private information protection and brokerage system called "E-Metro." The object model focuses on the user's view of objects in E-Metro. This object model provides a detailed description of how objects behave and how they relate to each other at the user level. In some cases the objects and classes at the user level will not map to an object or class in the target programming language. However, the transition from OOA objects to OOD objects is, for the most part, very smooth. The object oriented Booch notation is employed in the diagrams of this document as a means to communicate relationships of objects visually. FIG. 23 depicts the basic notational symbols used and their meaning. The "uses for implementation" symbol is largely used for instance variables to denote that a Class needs the object in its implementation.

Foundation Objects

At the highest level of description of the E-Metro object model, there are E-Beings, E-Communities, and E-Brokers. An E-Being is the cyber-being concept mentioned previously. This is like a virtual person since it is supposed to "be" the person it represents, but in cyberspace. E-Beings reside in E-Communities in order to keep their information assets secure. Meanwhile, E-Brokers are the actual mediators of all E-Being interactivity in order to maintain the security provided by the E-Community as well as any designated personal (E-Being specific) security measures.

An E-Community is a cyber-community which is secure and trusted. An E-Community guarantees security in that only E-Beings with the proper E-Community privileges may enter or reside there. Security is also maintained within an E-Community in that the information assets of the E-Beings residing in it are only shared with those that have the proper personal privileges. An E-Community is trusted in that it guarantees that its contained E-Beings and visiting E-Beings will interact according to the rules that each E-Being has established, thus maintaining "trusted only" interactivity.

There exists at least one E-Broker per E-Community whose purpose it is to actually mediate privileged information sharing and interaction. In fact, both E-Being information sharing and interaction may only occur via an E-Broker.

E-Beings as Personal Information Agents

There are two primary subclasses of E-Beings in E-Metro. They are E Personal Information Agents (E-PIA) and E Auto Personal Information Agents (E-AutoPIA). The term "Personal Information Agent" exemplifies the purpose of the E-Beings in that they manage the electronic information assets of a real person. An E Corporate Information Agent (E CIA) representing a real corporation is also a possible subclass of E-Being that may be useful.

It is the E-PIA that shares its owned information while residing in an E-Community. However, such "passive" sharing may only occur with a more "active" E-PIA known as an E-AutoPIA. Only an E-AutoPIA with the proper privileges established by the perused E-PIA may interact with the E-PIA and enjoy the information sharing. An E-Broker 39 assigned to the E-Community 35, where the E-PIA 37 resides, mediates the privileged information sharing as shown in FIG. 5. Note that only an E-AutoPIA 41 may initiate an activity.

If an E-AutoPIA desires to initiate interactions such as engaging in secured information sharing with other E-PIA's, requesting secured services from other E-PIA's, or performing secured transactions with other PIA's, the E-AutoPIA must visit the proper E-Broker for each specific activity. The list of interactions to be carried out by an E-AutoPIA is known as its Itinerary. As with E-PIA's residing at E-Communities, E-AutoPIA's are secured by an E-Broker and may only interact with other E-PIA's or E-AutoPIA's via an E-Broker. All information sharing and other general forms of interaction always occur via InteractProtocols. While the E-AutoPIA in FIG. 6 is shown visiting several E-Brokers each located at a distinct E-Community, it is possible that multiple E-Brokers are present at a single E-Community and that they are each visited by a single E-AutoPIA depending on its desired activities.

Security and Transitivity of Trust

The reader should note the continual use of the qualifier "secured." Security is key in E-Metro as the chief means for maintaining the integrity of intended interactions between persons represented by E-PIA's. Strict security is necessary in order to ensure the intended E-PIA Interrelationships and to maintain the confidence of E-Metro users that only those who are meant to see specific information, can.

When an E-PIA gives some of its personal information to another E-PIA, the personal information given is still secured and owned by the original E-PIA. In fact, if the receiving E-PIA, in turn, passes another E-PIA's information on to a third E-PIA, E-Metro still knows the original owner of the personal information and continues to police access to the information according to Transitive Privilege Rules declared by the original E-PIA. This security paradigm pioneered by E-Metro is known as Transitivity of Trust. Transitivity of Trust means that:

If A trusts B with information A',
and B trusts C with information A',
then A trusts C with information A'.

This important concept guarantees to A that its information is never passed on to an entity which it does not trust according to the Transitive Privilege Rules it has declared for the data it has submitted.

It is easy for E-Metro to tell which E-PIA owns the information, because information is always passed as a version of the E-PIA which submitted its information. For example, suppose an E-PIA contains a rich set of information which includes birth date, address, phone number, etc. Further, suppose it wishes to submit only its phone number to another E-PIA during an interaction. The receiving E-PIA will actually receive an E-PIA object which contains only the phone number. More specifically, the E-PIA object received is a version of the original E-PIA which represents how the submitting E-PIA wishes to be perceived by the receiving E-PIA. FIG. 6 depicts the "collection" of versions of E-PIAs 40 by a traveling E-PIA 41. The versions of E-PIA objects is the only manner in which information is maintained by E-PIAs in E-Metro. FIG. 6 also depicts a version of the traveling E-AutoPIA that has been given to a non-traveling E-PIA 39 in one of the E-Communities.

Subsystem Model

Before presenting the details of object behavior and relationships, it is important to understand the subsystems that various users are aware of while using E-Metro. This section describes the activities of the major client and server subsystems.

Modes of Use

Authoring Time

E-PIA

E-PIA's have only two authorable items: their information assets and their interactprotocols. The assets need to be authored by employing some sort of hierarchical GUI. This GUI must allow for any data to be entered in a field and the field given a name. The GUI must also provide a means to create hierarchical structures by adding a sub-Folder concept. Hopefully, this hierarchical presentation is possible with some aspect of the HTML Form protocol.

InteractProtocols are strictly secured and may only be obtained from one of the E-Brokers residing in the same E-Community of the E-PIA being authored. A person may browse an E-Broker in an E-Community to obtain its protocolDirectory in HTML format. The returned HTML text includes an HTML Form representing the means to request obtaining one or more of the InteractProtocols listed. Actually obtaining a specific protocol may require some validation and/or paying a fee. When the InteractProtocol is actually obtained, it is stored in the E-PIA. However, the InteractProtocol has privilegeRules and a defaultMap which may be used as is or modified via HTML Forms.

E-AutoPIA

E-AutoPIA's have only to author their itineraries. This is because an E-AutoPIA is always instantiated from an E-PIA. To author an Itinerary, browsing an E-Broker for InteractProtocols is performed in the same manner as with E-PIA's. However, instead of retrieving an InteractProtocol, an InteractInstruction with parameters to fill in is obtained.

Forms Repository

Since the structure of E-PIA information is likely to be reused again and again, the HTML Forms necessary for filling out the information of various E-PIA structures can be stored in shared locations known as Forms or E-Being Repositories. These repositories can be simple FTP sites or possibly even Netscape Server Systems. It is also possible to store the HTML Forms associated with InteractProtocols, InteractInstructions, and Itineraries. However, as will be described later, E-PIA's employing these objects during runtime must have specific TrustedTokens associated with each of these objects in order to actually perform their intended activity.

Runtime

At runtime, a person who owns an E-PIA or E-AutoPIA does not see anything happening because all interactions are processed by E-Metro servers. However, to see progress or the latest results of interactions, an owner may retrieve his information assets and audit trail contained in his E-PIA(s) or E-AutoPIA(s). Note that a person may have multiple E-PIA's but that one is designated to be the Home E-PIA (more will be said about the home E-PIA later). As always, the presentation employs HTML text. In some cases, the state of an E-PIA may indicate that someone is waiting for further action on the owner's part to take place before the waiter can continue.

E-Community Administration Time

The E-Community Administrator needs to maintain, fix, and upgrade E-Brokers in an E-Community. The E-Community Administrator also needs to be able to have privilege to everything within an E-Community's boundaries (i.e. contained E-Communities) in order to make sure everything is running smoothly or find out where problems are. Backup and recovery functions must also be performed.

E-Metro Administration Time

An E-Metro Administrator employed by E-Metro who simply has access to everything does not exist. Each E-Community maintains and administrates its own assets autonomously according to the rules set up by the E-Community. This is a key ownership concept in E-Metro.

Client and Server Subsystems

User Perspective

The user's world consists only of E-Communities and the E-Brokers that belong to them, Forms Repositories, and the Netscape World Wide Web Browser. The user is aware that all of the E-Communities are attached to each other via the Internet and that they can be connected to via an "http://www." address. In the previous section it was mentioned how all of the data in E-Metro is transformed into an HTML format before being presented to the user. This transformation occurs on the server so that only the Netscape Client and an existing HTML conversant Client programming systems (e.g. C++ and NCAPI, or JAVA) are needed on the client workstation. Note that separate E-Communities may or may not actually be located at the same site in reality, but that this physical location consideration is irrelevant to the user.

Users may also want to use an Electronic E-Metro Secure Card to store E-PIA information assets. This may be needed for user validation while using some services, but may also be another way a person wishes to store his assets. It may be the only place a person wants to keep his assets at certain time—it is totally a decision of the person owning the E-PIA where, when, and how their information assets are to be stored and/or shared.

Community Administrator Perspective

An E-Community Administrator employs the E-Community Administration Tool to manage one or more E-Communities on a single E-Metro World Wide Web Server. While each E-Community Administrator is aware of his E-Communities and their corresponding E-Brokers created by the E-Communities' development team, one E-Community Administrator designated the "E-Community Site Administrator" is also aware of the E-Metro and Netscape server processes which may need to be monitored and/or configured. Due to strict security measures required in E-Metro, the Administration Tool client application requires a direct log in directly to the E-Metro server rather than via any Internet protocols. Note that this restriction does not exclude remote login. An E-Community Administrator may also install a Forms Repository on the server if this is desired.

Detailed Object Model

A major feature of the E-Metro Object Model is that the first-class objects, namely E-PIA's, are not instances of Classes (at the user level), but rather just instances. Instead, they are dynamically assigned behavior at any time via protocol assignments. This provides a facility which adds behavior incrementally or subtracts behavior decrementally. It is believed that this facility is necessary for the everyday changing needs and desires of a person desiring to do or explore different activities.

E-Being

B1. Purpose of E-Being—An E-Being represents a "life" in the cyberworld of E-Metro. This life, or E-Being, must have at least one desire or one goal to interact with other E-Beings in order to exist on-line in E-Metro.

B2. An E-Being may represent the life of anything—Note that "life" in cyberspace can be given to objects that normally would not be considered to have "life." For example, dead persons can be represented. While the primary goal of E-Metro is to have E-Beings represent real living people, they can also represent real animals, real corporations, real organizations, real inanimate objects, or even real objects that are stored or kept alive in electronic forms outside of E-Metro. Dead as well as totally fictitious (non-real) analogies of all of the above may also be represented.

B3. An E-Being is essentially an abstract root class, there are no direct instances of E-Beings.

Fundamental Information Objects

I1. Purpose of Fundamental Information Objects—Information Objects hold data in E-Metro and are instances of Classes. It is important to mention fundamental data since the user interacts with various fundamental data types frequently.

I2. The base Classes are:

Class
Integer
String
Float
Boolean
OrderedCollection
Set
Dictionary
SQLStatement
Folder
ExecutableString
Compiler I3. The base Classes have default protocol—the default protocol corresponds to the methods of the Classes. For example, methods that obtain the size of an OrderedCollection, Set, and Dictionary are needed as well as specific indexes of OrderedCollections and specific keys of Dictionaries.

I4. An ExecutableString represents a piece of code that can be passed around as an object, interpreted when it needs to be, and processed—ExecutableStrings require input arguments. Zero, one, and two argument ExecutableStrings should be supported. Each ExecutableString identifies the name of its Compiler/Interpreter. This allows the names referenced in the ExecutableSring to bind to information in different contexts controlled by the Compiler.

I5. SQLStatements are intended to provide a vehicle for fast look up of information while being able to reference E-PIA information—since a reference to E-PIA information is hierarchical and, thus, not SQL compliant, SQLStatement Objects do not support SQL exactly. The references get fixed up by a special compiler provided by E-Metro.

I6. A Folder is able to store Objects using hierarchically arranged keys.

I7. An extended set of Classes will have to be provided to support the various standard object protocols—some examples are OLEObject, OpenDocObject, and SOMObject. This is needed since some information asset data will be desired to be stored in such formats by persons.

I8. An extended set of Classes will have to be provided to support various multimedia—some examples are Audio, Video, Picture.

I9. The very important Dictionary object appears as simply a list of keyed objects to the client of a Dictionary—The keyed objects are frequently referred to as the "values" of the Dictionary. A key is used to look up a value or object in the Dictionary. Keys are typically Strings or Symbols (as in Smalltalk) and are used as names for the objects so keyed. But keys can be any object the programmer sees as useful as a key. The values can be any object as well. An example Dictionary is shown below.

| keys | Values |
| --- | --- |
| "FirstName" | a String object |
| "Height" | a Float object |
| "Street" | a String object |

E Personal Information Agent (E-PIA)

PIA1. Purpose of E-PIA—An E-Being which represents a real person and maintains the real person's information assets that are intended to be shared in a secured fashion.

PIA2. An E-PIA may exist on an Electronic E-Metro Secure Card.

PIA3. Each E-PIA consists of an unstructured Folder that is created and edited at authoring time—the editing is to be accomplished with HTML forms which is facilitated by the E-Metro client subsystem.

PIA4. Each E-PIA may be assigned a Set of InteractProtocols by the E-PIA's owner at authoring time—E-PIA's share information at runtime only via an InteractProtocol and only one protocol at a time.

PIA5. An E-PIA contains a Set of Privilege Rules which must be checked and satisfied on all InteractProtocol executions.

PIA6. An E-PIA contains a Set of TrustedTokens which it obtains from E-Brokers at authoring time—some or all of these may be used anytime the E-PIA interacts.

PIA7. An E-PIA contains an audit trail of all interactions that occur with it—each RecordedEvent stores the information about an interaction that is interesting (e.g. time started, time completed, any access violations, etc.)

For an E-PIA, everytime an InteractProtocol is performed on it, a RecordEvent object is added to its auditTrail. For an E-AutoPIA, everytime an InteractInstruction is performed in its Itinerary, a RecordEvent object is added to its auditTrail. The contents of the RecordEvent objects needs to be determined based on audit trail needs during E-Metro development. Additionally, filtering of certain RecordEvents may not wish to be recorded for performance or disk space reasons. Finally, the point of the audit trail is to allow the owner of the E-PIA or E-AutoPIA to look back on what has been done.

PIA8. An E-PIA may exist in multiple E-Communities simultaneously.

PIA9. A Home E-PIA must be designated if there are more than one E-PIA's for a given person—The Home E-PIA contains the E-Community names where the other E-PIA's are located.

PIA10. Only the Home E-PIA may be modified at authoring time.

PIA11. Each E-PIA contains a Certificate with its the name of the person it represents and that person's public key—it is assumed that at any time a process can validate the (name, public key) pair by querying the appropriate certificate authority.

PIA12. A Version of an E-PIA is constructed at runtime when information from an E-PIA is supplied in an information interaction—an E-PIA version contains only:

certificate assets privilegeRules.

The possibility of including an auditTrail should be considered. Note that versions of E-PIAs typically represent a subset of information actually contained in a source E-PIA, so that assets may be a copy of only a small part of the original assets folder. The certificate assists in validating that the information actually originated from the E-PIA whose name is stated in the certificate. This is important as the information can be passed on in "transitively trusted" third party information sharing. Additionally, each individual piece of information in the original E-PIA assets Folder is encrypted with the E-PIA's private key when assembled at the E-PIA owners personal workstation. By using the public key in the certificate in a version of an E-PIA, another E-PIA may have the data decrypted and know for sure that the version of the E-PIA is, in effect, "signed" by the owner.

TrustedToken

TT1. Purpose of TrustedToken—A TrustedToken is obtained at authoring time from an E-Broker along with some other object in order to secure use of the object, typically an interaction or service, that the E-Broker brokers. The TrustedToken grants the new owner a primary and necessary privilege (but not necessarily sufficient privilege) to performing the secured interaction.

TT2. When a TrustedToken is given to an E-PIA author, it is encrypted with the E-PIA author's private key at his local machine—the E-Broker then remembers the E-PIA author's public key.

TT3. When a secured interaction is requested, the E-Broker must be given the E-PIA's name and the encrypted TrustedToken. From this pair, the TrustedToken can be decrypted with the public key obtained from a previous authoring session—the E-Broker knows that the E-PIA requesting interaction is trusted only if the TrustedToken can be decrypted successfully.

InteractProtocol

SP1. Purpose of InteractProtocol—An InteractProtocol object designates specific named information and the conditions which must be true in order for the specific information to be shared. The shared information is packaged in the form of a version of an E-PIA. The version of the E-PIA is specifically defined by the outputs of the InteractProtocol.

SP2. An InteractProtocol must have a name.

SP3. An InteractProtocol consists of a 5-tuple of
1) Set of input Parameters
2) Set of output Parameters defining which information to store in version of E-PIA that will be shared
3) Default parameter mapping
4) Set of Privilege Rules for immediate sharing to occur
5) Set of Transitive Privilege Rules for sharing of version of E-PIA to occur by third parties (transitive sharing). At runtime, these rules are copied and placed in the privilegeRules of the version of E-PIA that will be shared.
6) Enable boolean—an Interact may be disabled SP4. Execution of an InteractProtocol creates a version of the E-PIA based on the runtime outpu parameter values. This version of the E-PIA is what is given and shared with the E-AutoPIA that is interacted with—however, if ALL output parameter values are previously obtained E-PIA versions, then an E-PIA version is not created. Instead the information is passed along in the originally obtained E-PIA forms.

NOTE: Consideration to passing data as raw data in some situations, rather than always as a version of an E-PIA, should be investigated. Perhaps passing data as an E-PIA version or raw data can be a choice during InteractProtocol and InteractInstruction authoring.

SP5. The version of E-PIA that is shared, has each of its pieces of fundamental information encrypted with the E-PIA's private key—this encryption occurs at the E-PIA's personal client workstation when the information for the Home E-PIA is assembled. Later, another E-PIA or process can decrypt the information by using the public key of the version of the E-PIA found in its certificate.

Note that since private keys are never located in servers, the input or output parameters used to pass data in an E-PIA version may need to be severely restricted in expression richness, since in general, an expression result would require re-encryption with the private key.

SP6. An InteractProtocol's Default parameter mapping is a Dictionary showing the name of zero or more Parameters and a hierarchical name that each listed parameter is associated with.

SP7. An InteractProtocol may inherit an existing InteractProtocol—the subclassing InteractProtocol inherits the 4-tuple to which it may add more Parameters and Rules.

SP8. An E-PIA may overwrite privilegeRules in any or all of the InteractProtocols assigned to it.—the authoring time E-PIA facility must provide this ability.

SP9. The default map is meant to act as an assistant to the construction of a corresponding InteractInstruction—Since InteractInstructions must "fill in" the parameters of an InteractProtocol with ExpressionStrings, it might be nice to fill in some or all of the parameters with the commonly expected defaults. The table below shows an example default map.

| Parameter name | default value |
|---|---|
| "FirstName" | FirstName |
| "Height" | profile.physicalAttributes.height |
| "Street" | address.street |

The analogy in C/C++ would be the function prototype:
processSuperficialInfo(String*FirstName, Float*Height, String*Street)

that would be automatically filled with the default call:

processSuperficialInfo(firstName, profile.physicalAttributes.height, address.street)

Realize that the default parameters reference variables that reference (and hence, bind to) the E-AutoPIA's Folder.

Parameter

P1. Purpose of Parameter—A Parameter is a named "passageway" for an InformationObject to either be input to an interaction or be output from an interaction.

P2. Each Parameter is a 2-tuple of (name, validation Rule)—the validation Rule may be used to verify type at runtime. For example, the expression "isKindOf: aClass" determines whether the runtime parameter value is an instance of aClass or one of its subclasses. A more complex example would be the combination of a type validation and a general expression such as:

(myself isMemberOf: Float) & (myself>203500.00).

Rule

R1. Purpose of Rule—A Rule is assigned to some activity and describes the conditions under which the activity will occur. Otherwise the activity does not occur. It is important to note that the Rule grammar needs to be multiple party centric.

R2. Rules are ExecutableStrings representing expressions that evaluate to TRUE or FALSE.

R3. The Rule expression grammar must recognize multiple contexts—in the most interesting case, two E-PIA's can meet so we are interested in two contexts. The two contexts are the sharer and the sharee.

R4. To facilitate reference to two objects that meet, the keywords "myself" and "yourself" will be established in the grammar—myself refers to the sharer (sharing E-PIA) while yourself refers to the sharee (E-PIA that meets with sharer).

R5. To facilitate reference to more than one object that meet, the keyword "yourselves" shall be established in the grammar—yourselves refers to the Set of sharees (E-PIA's that meet with sharer). Indexes can be used to refer to specific sharees. Yourself is always the same as yourselves at index 0.

R6. References are used to refer to a hierarchically positioned piece of data in an object—a Reference may use names separated by spaces to denote hierarchical access.

EXAMPLE

To restrict an activity to only those over 6 feet tall a sharer's rule might be yourself profile physicalAttributes height>6

R7. Rules are meant to be interpreted at runtime—therefore, only some errors are intended to be found at authoring time.

E Auto Personal Information Agent (E-AutoPIA)

APIA1. Purpose of E-AutoPIA—E-AutoPIA's are intelligent agents that do work on behalf of a Home E-PIA. An E-AutoPIA is an E-PIA which initiates tasks intending to interact with other E-PIA's in local or remote E-Communities.

APIA2. An E-AutoPIA is an E-PIA which has at least one Itinerary assigned to it.

APIA3. An E-AutoPIA may only be launched, i.e. execute an Itinerary, from a Home E-PIA.

APIA4. A Home E-PIA may launch multiple E-AutoPIA's.

Itinerary

I1. Purpose of Itinerary—An Itinerary consists of a list of InteractInstructions that are to be performed.

I2. An Itinerary must have a name.

I3. An Itinerary contains a Set of Privilege Rules—these Rules must be satisfied for all InteractInstructions and are in addition to the Set of Privilege Rules defined for the E-AutoPIA.

I4. An Itinerary contains a Set of Transitive Privilege Rules—these Rules govern transitive sharing of any E-PIA versions (or E-AutoPIA versions in this case) that are shared by InteractInstructions within the Itinerary. The Transitive Privilege Rules are in addition to any Transitive Privilege Rules defined for an individual InteractInstruction itself. At runtime, these Rules are copied and placed in the privilegeRules of the version of E-PIA that will be shared.

I5. An Itinerary contains a Set of zero or more Scripts—a Script is just an ExecutableString written in some programming language. Scripts can control when and how InteractInstructions are to be performed. Thus, Scripts are just general programming code to do whatever processing a programmer wants to do. However, a Script can call an InteractInstruction by its name and pass it any variables as parameters that are within scope. Only the InteractInstructions of an Itinerary or superclassed Itinerary may be called from the Scripts that are attached to the same Itinerary object. The net affect is that the InteractInstructions can get called in any order. InteractInstructions are only called in sequence when no Scripts are present in the Itinerary.

I6. An Itinerary consists of one or more InteractInstructions—if there are no Scripts, then the InteractInstructions are executed sequentially.

I7. An Itinerary may inherit an existing Itinerary—the subclassing Itinerary inherits the Rules, Scripts, and Itinerary of the parent Itinerary.

InteractInstruction

II1. Purpose of InteractInstruction—InteractInstructions are the single point in the whole system that cause interactions between E-PIA's (actually, E-AutoPIA and E-PIA) to take place. Each InteractInstruction describes the interaction that will occur and the rules under which it can occur. It is also important to note that is the execution of an InteractInstruction that is the only way to exchange information assets.

II2. Each InteractInstruction is a 5-tuple of
1) E-Community name
2) InteractProtocol name
3) Parameter assignments
4) Set of Privilege Rules for immediate sharing to occur
5) Set of Transitive Privilege Rules for sharing of version of E-AutoPIA to occur by third parties (transitive sharing).
6) Maximum number of interactions II3. Execution of an InteractInstruction creates a version of the E-AutoPIA based on the runtime input parameter values. This version of the E-AutoPIA is what is given and shared with E-PIA that is interacted with—however, if ALL input parameter values are previously obtained E-PIA versions, then an E-AutoPIA version is not created. Instead the information is passed along in the originally obtained E-PIA forms.

II4. The version of E-AutoPIA that is shared, has each of its pieces of fundamental information encrypted with the E-AutoPIA's private key—this encryption occurs at the E-AutoPIA's personal client workstation when the information for the Home E-PIA is assembled. Later, another E-PIA or process can decrypt the information by using the public key of the version of the E-PIA found in its certificate.

Note that since private keys are never located in servers, the input or output parameters used to pass data in an E-AutoPIA version may need to be severely restricted in expression richness, since in general, an expression result would require re-encryption with the private key.

II5. The privilegeRules must be satisfied for the InteractInstruction to be performed—they are in addition to the Set of Rules for the Itinerary as well as the Set of Rules for the executing E-AutoPIA.

II6. The transitivePrivilegeRules are copied and placed in the privilegeRules of the version of E-PIA that becomes shared due to the InteractInstruction's execution.

II7. Only maximuminteractions of E-PIA's will participate in the execution of an InteractInstruction—this value may be infinity.

II8. An InteractProtocol must be able to generate an HTML Form representing an InteractInstruction with Parameters ready to be filled in.

II9. There is a special "Update Home" InteractInstruction which updates the latest information in the E-AutoPIA into its Home E-PIA—an implicit "Update Home" InteractInstruction is executed at Itinerary termination. Note that this special InteractInstruction requires the E-AutoPIA to physically visit its Home E-PIA.

Clarifying the Relationship between InteractProtocols and InteractInstructions.

An InteractProtocol maintains essentially a template relationship to an InteractInstruction. An InteractProtocol is represented by a signature of parameters to be "filled in," while the InteractInstruction counterpart is the same except with parameters "filled in."

InteractProtocols and InteractInstructions are both authoring time entities. The InteractProtocols represent the services provided by an E-Broker and are authored along with an E-Broker. InteractInstructions are authored during the construction of an Itinerary for an E-AutoPIA. Each InteractInstruction represents the call of a "requested interaction" or InteractProtocol.

Also, shown in FIG. 19 are privilegeRules that are part of InteractProtocols. Each privilegeRules is a Set of Rule objects. As described previously, each Rule is an ExpressionString which employs the Rule Compiler to process. In order for an InteractProtocol to execute all of the Rules in the privilegeRules must be true. As mentioned previously, the Rules can reference both myself (the provider of the InteractProtocol interaction) and yourself (the E-AutoPIA requesting interaction). It was also shown that Parameter objects have validation Rule objects. These Rules are applied only to the actual parameter being passed in.

FIG. 18 also shows InteractInstructions as having privilegeRules. Such Sets of Rules may be added by an E-AutoPIA author as he is constructing an Itinerary and has decided that certain Rules should be maintained regardless of the InteractProtocol's privilegeRules that the InteractInstruction refers to.

E-Community

C1. Purpose of E-Community—An E-Community provides a grouping concept for E-PIA's and other E-Communities. In this regard, an E-Community also provides security for the objects it groups.

C2. An E-Community is an E-Being—an E-Community maintains a E-Metro notion of life concept in that it has goals to share information and interact with general E-Beings.

C3. An E-Community must have a name.

C4. E-Communities contain zero or more E-PIA's—the E-PIA's reside together because they share the same goals as far as sharing information. Thus, E-AutoPIA's looking for specific E-PIA's will know which E-Communities to visit.

C5. E-Communities may contain other E-Communities such that they can be arranged hierarchically—The contained E-Communities may, in turn, each contain one or more as well. The hierarchy must be strict, however, in that no E-Community is contained by more than one parent E-Community.

C6. Each E-Community consists of E-Brokers that the E-Community has decided to make available.

C7. Each E-Community contains no InteractProtocols because they may not interact.

E-Broker

BR1. Purpose of E-Broker—An E-Broker is required for all inter-PIA Interactions. E-Brokers guarantee that the all E-PIA's involved in an interaction have the rights based on InteractProtocols to interact in the manner that the interaction is performed.

BR2. Each E-Broker owns one or more InteractProtocols.

BR3. An E-Broker contains the subsystems implementing all InteractProtocols it owns.

BR4. An E-AutoPIA may only interact with an E-PIA in an E-Community which has an E-Broker with the InteractProtocol identified by the E-AutoPIA's current InteractInstruction.

BR5. An E-Broker must generate a unique TrustedToken for each of its InteractProtocols.

BR6. InteractInstructions may only be authored by obtaining the corresponding InteractProtocol from an E-Broker.

BR7. An E-Broker mediates the interaction between an E-PIA and an E-AutoPIA as follows:

1) Validate that the E-AutoPIA satisfies the E-Community's privilegeRules.

2) Validate that E-AutoPIA has a decryptable TrustedToken corresponding to the InteractProtocol being executed.

3) Validate E-AutoPIA's privilegeRules.

4) Validate the E-AutoPIA's Itinerary privilegeRules.

5) Validate the E-AutoPIA's current InteractInstruction privilegeRules.

6) Validate the privilegeRules of any transitively exchanged E-PIA versions that are going to be passed as an input or output Parameter.

7) Call the entrypoint of the E-Broker which corresponds to the InteractProtocol's implementation—only the Parameters that passed validation in (6) of the E-AutoPIA's InteractInstruction are passed in.

8) Determine the specific collection of E-PIA's involved in the interaction—this is based on three items:
  a) Validation Tasks 3 through 5 above.
  b) An additional selection rule supplied via an E-Metro API call within the E-Broker executable.
  c) The privilegeRules of the E-PIA's that are selected based on a) and b)

9) The E-Broker's implementation is executed—if any failures occur, the InteractInstruction is not completed successfully.

10) Only the Parameters that passed validation of the E-PIA's InteractProtocol are passed out.

BR8. Each E-Broker offers an "interactProtocolDirectory" service—this service answers a generated HTML document describing all of the InteractProtocols provided by the E-Broker.

BR9. Each E-Broker offers a "getRightsToInteractProtocol" service—the service answers the InteractProtocol with the TrustedToken. It is important to note that this service can be implemented in any manner by the E-Broker. For example, this service may be where the person desiring rights to an InteractProtocol has to validate who he is and/or pay to obtain privileges. The E-Broker can refuse to answer a TrustedToken for any reason.

BR10. E-Brokers may be directly interacted with without regard to the E-Community privileges of the E-Community they belong to—however, interaction with an E-Broker does require privileges to be obeyed of any parent E-Communities.

Having described and illustrated the principles of our invention with reference to a preferred embodiment, it will be apparent that the invention can be modified in arrangement and detail without departing from such principles. As such, it should be recognized that the detailed embodiment is illustrative only and should not be taken as limiting the scope of our invention. Rather, we claim as our invention all such embodiments as may fall within the scope and spirit of the following claims and equivalents thereto:

We claim:

1. A computer-implemented system for securely exchanging and controlling personal information objects over a distributed, electronic network, comprising:

a plurality of personal information agent software objects capable of being sent over the distributed, electronic network and interacting with one another, each of the personal information agent objects being composed of a set of methods and variables and each of the personal information agent objects securely encapsulating in an encrypted format one or more personal information objects of an owner of the personal information agent object and one or more rule objects containing privilege rules governing the processing of the personal information objects, each of the personal information objects and rule objects being composed of a respective set of methods and variables, the rule objects being bound to and moving across the network with the personal information objects; and at least one server connected to the network executing an electronic broker computer program for providing trusted processing of interactions between the personal information agent objects, the electronic broker computer program including:

means for maintaining the privacy and integrity of the personal information objects and rule objects encapsulated within the personal information agent objects during the processing of the interactions, and means for allowing only a trusted process to securely access each interacting personal information agent object's personal information and rule objects to ensure that the privilege rules are satisfied before permitting any exchange of personal information objects between the interacting personal information agent objects.

2. The computer-implemented system of claim 1, further comprising:

at least one certification authority that asserts and certifies the trustworthiness of personal information asserted by system users and contained in the personal information objects.

3. The computer-implemented system of claim 1, wherein each of the personal information objects corresponds to a respective one of the rule objects, in a one-to-one relationship.

4. The computer-implemented system of claim 1, wherein each of the personal information objects corresponds to a plurality of the rule objects in a one-to-many relationship.

5. The computer-implemented system of claim 1, wherein the privilege rules include at least one transitive rule for restricting interaction with their encapsulating personal information agent object and processing of the bound personal information objects by third parties after transference of the encapsulating personal information agent object to a receiving personal information agent object.

6. The computer-implemented system of claim 1, wherein at least one of the personal information agents includes an itinerary for directing the activities of the at least one of the personal information agents as it moves over the network.

7. The computer-implemented system of claim 1, wherein one of the rule objects contains a privilege rule that retracts interaction with or usage of the owner's personal information agent object and encapsulated personal information objects at a future point in time after an exchange with a receiving personal information agent object.

8. The computer-implemented system of claim 1, wherein interaction with or usage of the owner's personal information agent object and encapsulated personal information objects is denied at a future point in time because one of the privilege rules is no longer satisfied.

9. The computer-implemented system of claim 1, further comprising a community administrator for managing the personal information agent objects and the electronic broker program.

10. The computer-implemented system of claim 1, wherein the personal information agent objects seek to exchange personal information processing privileges for value or benefit.

11. The computer-implemented system of claim 1, wherein at least one of the personal information agent objects securely encapsulates in the encrypted format a certificate object associated with one of the encapsulated personal information objects, the certificate object for affirming the trustworthiness of the personal information contained in the associated personal information object.

12. The computer-implemented system of claim 1, wherein at least one of the personal information agent objects securely encapsulates in the encrypted format an audit trail object for tracking usage of any exchanged personal information objects of the at least one personal information agent object after the electronic broker computer program processes an interaction involving the at least one personal information agent object.

13. The computer-implemented system of claim 12, wherein the audit trail object is securely accessible by the owner over the electronic network while the audit trail object resides at a remote location of a receiving personal information agent object.

* * * * *